(12) United States Patent
Szymanski

(10) Patent No.: US 8,089,959 B2
(45) Date of Patent: Jan. 3, 2012

(54) METHOD AND APPARATUS TO SCHEDULE PACKETS THROUGH A CROSSBAR SWITCH WITH DELAY GUARANTEES

(76) Inventor: Ted Henryk Szymanski, Toronto (CA)

( * ) Notice: Subject to any disclaimer, the term of this patent is extended or adjusted under 35 U.S.C. 154(b) by 926 days.

(21) Appl. No.: 11/802,937

(22) Filed: May 29, 2007

(65) Prior Publication Data

US 2007/0280261 A1 Dec. 6, 2007

Related U.S. Application Data

(60) Provisional application No. 60/808,951, filed on May 30, 2006.

(51) Int. Cl.
*H04Q 11/00* (2006.01)
(52) U.S. Cl. ........................................................ 370/359
(58) Field of Classification Search .................. None
See application file for complete search history.

(56) References Cited

U.S. PATENT DOCUMENTS

| | | | | |
|---|---|---|---|---|
| 5,864,552 A * | 1/1999 | Du et al. | | 370/388 |
| 6,401,189 B1 * | 6/2002 | Corinthios | | 712/13 |
| 6,704,312 B1 * | 3/2004 | Chang et al. | | 370/389 |
| 7,359,384 B2 * | 4/2008 | Kodialam et al. | | 370/395.4 |
| 2003/0058848 A1 * | 3/2003 | Dally | | 370/360 |
| 2003/0227901 A1 | 12/2003 | Kodialam et al. | | |
| 2005/0141804 A1 * | 6/2005 | Yang et al. | | 385/17 |
| 2006/0165070 A1 * | 7/2006 | Hall et al. | | 370/369 |

OTHER PUBLICATIONS

V. Anantharam, N. McKeown, A. Mekittikul, J. Walrand, "Achieving 100% Throughput in an Input Queued Switch", IEEE Trans. Communications, Aug. 1999, pp. 1260-1267, vol. 47, No. 8, IEEE, USA.

T. Weller, B. Hajek, "Scheduling Nonuniform Traffic in a Packet Switching System with Small Propagation Delay", IEEE/ACM Trans. Networking, Dec 1997, pp. 813-823, vol. 5, No. 6, IEEE,USA.
A. Hung, G. Kesidis, N. McKeown, "ATM Input Buffered Switches with the Guaranteed Rate Property," Proc. Symp. Comput. and Commun. (ISCC) Conf., 1998, pp. 331-335, IEEE, USA.

(Continued)

*Primary Examiner* — Yong Zhou

(57) ABSTRACT

A method for scheduling cell transmissions through a switch with rate and delay guarantees and with low jitter is proposed. The method applies to a classic input-buffered N×N crossbar switch without speedup. The time axis is divided into frames each containing F time-slots. An N×N traffic rate matrix specifies a quantized guaranteed traffic rate from each input port to each output port. The traffic rate matrix is transformed into a permutation with NF elements which is decomposed into F permutations of N elements using a recursive and fair decomposition method. Each permutation is used to configure the crossbar switch for one time-slot within a frame of size F time-slots, and all F permutations result in a Frame Schedule. In the frame schedule, the expected Inter-Departure Time (IDT) between cells in a flow equals the Ideal IDT and the delay jitter is bounded and small. For fixed frame size F, an individual flow can often be scheduled in O(log N) steps, while a complete reconfiguration requires O(N log N) steps when implemented in a serial processor. An RSVP or Differentiated Services-like algorithm can be used to reserve bandwidth and buffer space in an IP-router, an ATM switch or MPLS switch during a connection setup phase, and the proposed method can be used to schedule traffic in each router or switch. Best-effort traffic can be scheduled using any existing dynamic scheduling algorithm to fill the remaining unused switch capacity within each Frame. The scheduling algorithm also supports multicast traffic.

26 Claims, 28 Drawing Sheets

OTHER PUBLICATIONS

C.E Koksal, R.G. Gallager, C.E. Rohrs, "Rate Quantization and Service Quality over Single Crossbar Switches", Infocom Conf., 2004, pp. 1962-1973, IEEE, USA.

J.S. Turner, R. Melen, "Multirate Clos networks: 50Th Anniversary of Clos Networks", IEEE Communications Magazine, Oct. 2003, pp. 38-44, IEEE, USA.

S. Andresen, "The looping algorithm extended to base 2' rearrangeable switching networks," IEEE Trans. on Communications, Oct. 1977, pp. 1057-1063, vol. COM-25, No. 10, IEEE, USA.

F.K. Hwang, "Control algorithms for rearrangeable Clos networks," IEEE Trans. Communications., Aug. 1983, pp. 952-954, vol. COM-31, No. 8, IEEE, USA.

J. Gordon, S. Srikanthan, "Novel algorithm for Clos-type networks," Electronic Letters, Oct. 1990, pp. 1772-1774, vol. 26, No. 21, IEE, UK.

Y.K. Chiu, W.C. Siu, "Comment: Novel algorithm for Clos-type networks," Electronic Letters, Mar. 1991, pp. 524-526, vol. 27, No. 6, IEE, UK.

H.R. Ramanujam, "Decomposition of permutation networks," Trans. on Computers, Jul. 1973, pp. 639-643, vol. C-22, IEEE, USA.

M. Kubale, "Comments on 'Decomposition of permutation networks,'" IEEE Trans. on Computers., Mar. 1982, p. 265, vol. C-31, IEEE, USA.

A. Jajszczyk, "A simple algorithm for the control of rearrangeable switching networks," Trans. Communications, Feb. 1985, pp. 169-171, vol. COM-33, No. 2, IEEE, USA.

C. Cardot, "Comments on 'A simple control algorithm for the control of rearrangeable switching networks,'" IEEE Trans. Commun, Apr. 1986, p. 395, vol. COM-34, No. 4, IEEE, USA.

J.D. Carpinelli, A.Y. Oruc, "A Nonbacktracking Matrix Decomposition Algorithm for Routing on Clos Networks", IEEE Trans. Commun., Aug. 1993, pp. 1245-1251, vol. 41, No. 8, IEEE, USA.

A. Jajszczyk, "Nonblocking, Repackable and Rearrangeable Clos Networks: Fifty Years of the Theory Evolution", IEEE Communications Magazine, Oct. 2003, pp. 28-33. IEEE, USA.

C.S Chang, W.J Chen, H.Y Huang, "On Service Guarantees for Input Buffered Crossbar Switches : A Capacity Decomposition Approach by Birkhoff and von Neuman", Proc. iWQoS Conf., 1999, pp. 79-86, IEEE, USA.

W.J. Chen, C.S. Chang. H.Y. Huang, "Birkhoff-von Neumann Input Buffered Crossbar Switches," Proc. Infocom Conf. 2000, pp. 1614-1623, IEEE, USA.

I. Keslassy, M. Kodialam, T.V. Lakshamn, D. Stiliadis, "On Guaranteed Smooth Scheduling for Input-Queued Switches", IEEE/ACM Trans. Networking, Dec. 2005, pp. 1364-1375, vol. 13, No. 6, IEEE. USA.

S.R. Mohanty, L.N. Bhuyan, Guaranteed Smooth Switch Scheduling with Low Complexity, Proc. Globecom Conf. 2005, pp. 626-630, IEEE, USA.

* cited by examiner $$M = \begin{bmatrix} 12 & 0 & 8 & 12 \\ 4 & 8 & 18 & 2 \\ 0 & 17 & 4 & 11 \\ 16 & 7 & 2 & 7 \end{bmatrix}$$

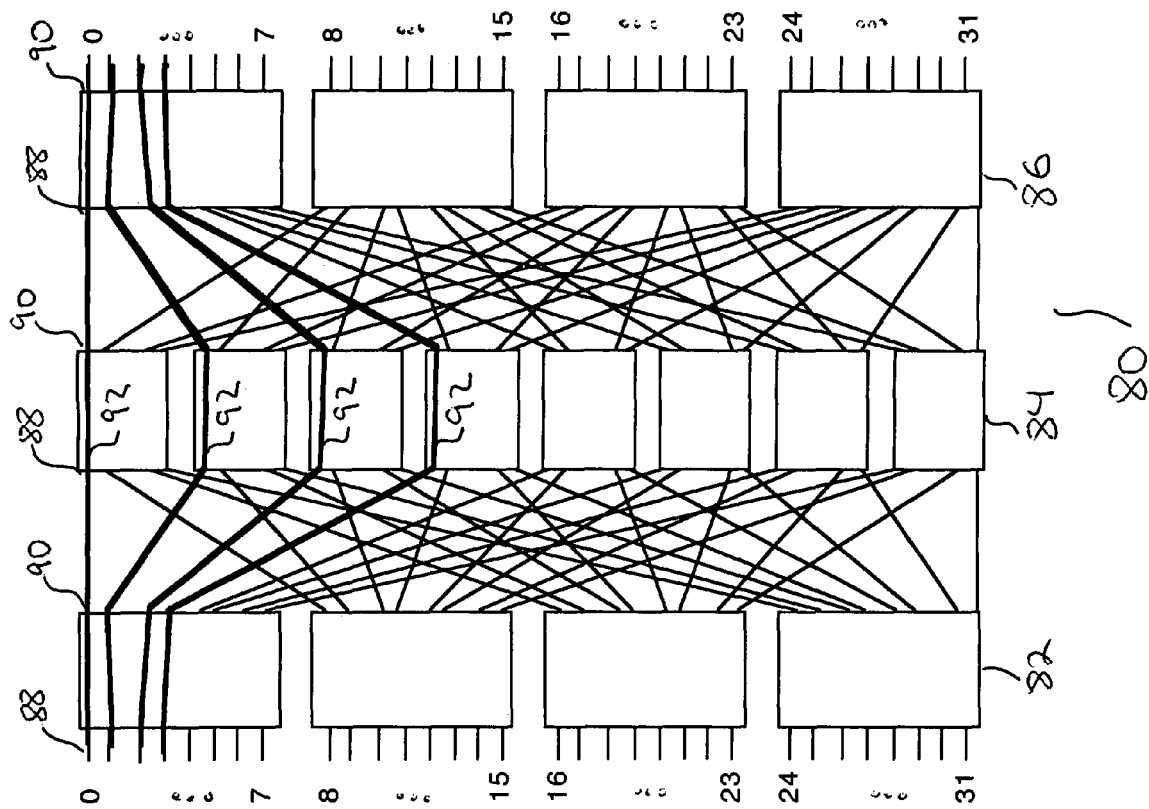

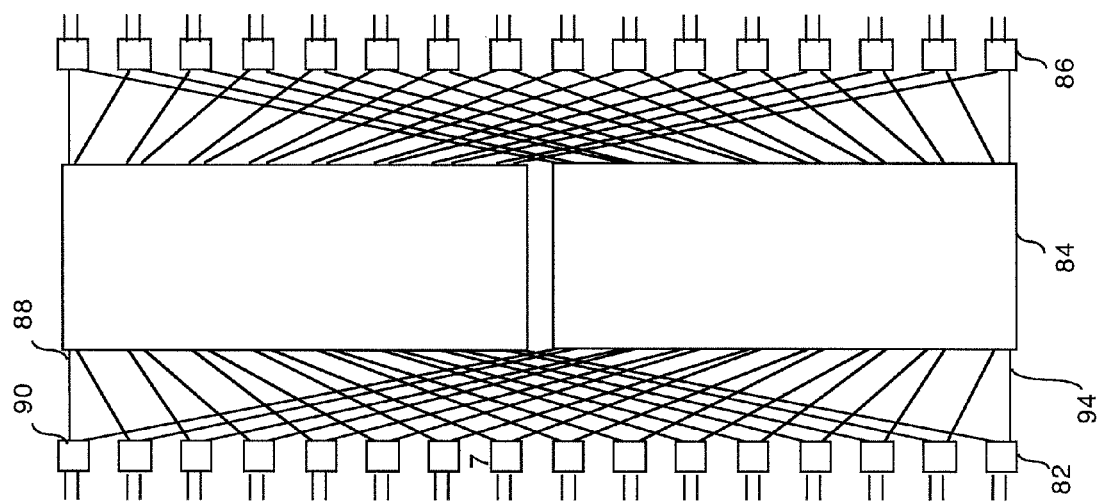

FIG. 10.

$$M = \overbrace{\begin{bmatrix} 6 & 0 & 4 & 6 \\ 2 & 4 & 9 & 1 \\ 0 & 8 & 2 & 5 \\ 8 & 3 & 1 & 4 \end{bmatrix}}^{280}$$

$$= \overbrace{\begin{bmatrix} 3 & 0 & 2 & 3 \\ 1 & 2 & 5 & 1 \\ 0 & 4 & 1 & 2 \\ 4 & 2 & 0 & 2 \end{bmatrix}}^{282} + \overbrace{\begin{bmatrix} 3 & 0 & 2 & 3 \\ 1 & 2 & 4 & 0 \\ 0 & 4 & 1 & 3 \\ 4 & 1 & 1 & 2 \end{bmatrix}}^{284}$$

$$= \left(\underbrace{\begin{bmatrix} 1 & 0 & 1 & 2 \\ 1 & 1 & 3 & 0 \\ 0 & 2 & 0 & 1 \\ 2 & 1 & 0 & 1 \end{bmatrix}}_{286} + \underbrace{\begin{bmatrix} 2 & 0 & 1 & 1 \\ 0 & 1 & 2 & 1 \\ 0 & 2 & 1 & 1 \\ 2 & 1 & 0 & 1 \end{bmatrix}}_{288}\right) + \left(\underbrace{\begin{bmatrix} 2 & 0 & 1 & 2 \\ 0 & 1 & 2 & 0 \\ 0 & 2 & 1 & 2 \\ 2 & 1 & 1 & 1 \end{bmatrix}}_{290} + \underbrace{\begin{bmatrix} 1 & 0 & 1 & 1 \\ 1 & 1 & 2 & 0 \\ 0 & 2 & 0 & 1 \\ 2 & 1 & 0 & 1 \end{bmatrix}}_{292}\right)$$

$$\text{Frame3} = \overbrace{\phantom{xxx}}^{294}$$

$$\underbrace{\begin{bmatrix} 2 & 0 & 3 & 3 & -1 \\ 0 & 2 & 2 & 1 & 2 \\ 1 & 3 & 1 & -1 & -1 \\ 3 & 1 & 0 & 0 & -1 \end{bmatrix}}_{296} \underbrace{\begin{matrix} 0 & 3 & 0 & 2 & -1 \\ 1 & 2 & 2 & 3 & -1 \\ 2 & 1 & 1 & -1 & 3 \\ 3 & 0 & -1 & 0 & 1 \end{matrix}}_{298} \underbrace{\begin{matrix} 0 & 3 & 3 & 0 & 2 \\ 1 & 2 & 2 & -1 & -1 \\ 3 & 1 & 1 & 2 & 3 \\ 2 & 0 & 0 & 3 & -1 \end{matrix}}_{300} \underbrace{\begin{bmatrix} 2 & 0 & 3 & -1 \\ 0 & 2 & 2 & 1 \\ 1 & 3 & 1 & -1 \\ 3 & 1 & 0 & 0 \end{bmatrix}}_{302}$$

FIG. 11

$$M = \overbrace{\begin{bmatrix} 6 & 0 & 4 & 6 \\ 2 & 4 & 9 & 1 \\ 0 & 8 & 2 & 5 \\ 8 & 3 & 1 & 4 \end{bmatrix}}^{280}$$

$$= \overbrace{\begin{bmatrix} 3 & 0 & 2 & 3 \\ 1 & 2 & 5 & 0 \\ 0 & 4 & 1 & 3 \\ 4 & 2 & 0 & 2 \end{bmatrix}}^{283} + \overbrace{\begin{bmatrix} 3 & 0 & 2 & 3 \\ 1 & 2 & 4 & 1 \\ 0 & 4 & 1 & 2 \\ 4 & 1 & 1 & 2 \end{bmatrix}}^{285}$$

$$= \left( \underbrace{\begin{bmatrix} 2 & 0 & 1 & 1 \\ 0 & 1 & 3 & 0 \\ 0 & 2 & 0 & 2 \\ 2 & 1 & 0 & 1 \end{bmatrix}}_{287} + \underbrace{\begin{bmatrix} 1 & 0 & 1 & 2 \\ 1 & 1 & 2 & 0 \\ 0 & 2 & 1 & 1 \\ 2 & 1 & 0 & 1 \end{bmatrix}}_{289} \right) + \left( \underbrace{\begin{bmatrix} 2 & 0 & 1 & 1 \\ 0 & 1 & 2 & 1 \\ 0 & 2 & 1 & 1 \\ 2 & 1 & 0 & 1 \end{bmatrix}}_{291} + \underbrace{\begin{bmatrix} 1 & 0 & 1 & 2 \\ 1 & 1 & 2 & 0 \\ 0 & 2 & 0 & 1 \\ 2 & 0 & 1 & 1 \end{bmatrix}}_{293} \right)$$

$$\text{Frame3} = \overbrace{\phantom{xxx}}^{295}$$

$$\underbrace{\begin{bmatrix} 0 & 2 & 0 & 3 \\ 2 & 1 & 2 & 2 \\ 1 & 3 & 3 & 1 \\ 3 & 0 & 1 & 0 \end{bmatrix}}_{297} \quad \underbrace{\begin{bmatrix} 0 & 3 & 2 & 3 \\ 1 & 2 & 0 & 2 \\ 2 & 1 & 3 & 1 \\ 3 & 0 & 1 & 0 \end{bmatrix}}_{299} \quad \underbrace{\begin{bmatrix} 0 & 2 & 0 & 3 \\ 1 & 3 & 2 & 2 \\ 2 & 1 & 3 & 1 \\ 3 & 0 & 1 & 0 \end{bmatrix}}_{301} \quad \underbrace{\begin{bmatrix} 0 & 3 & 2 & 3 \\ 1 & 2 & 0 & 2 \\ 3 & 1 & 1 & -1 \\ 2 & 0 & 3 & 0 \end{bmatrix}}_{303}$$

FIG. 12A:
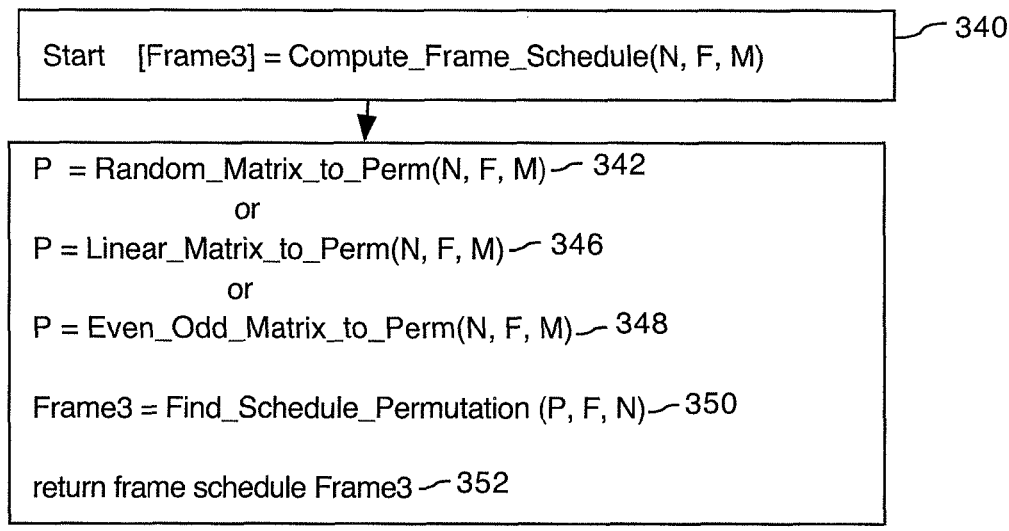
FIG 12B: Flow Chart, Find_Schedule_Permutation (N, F, P)
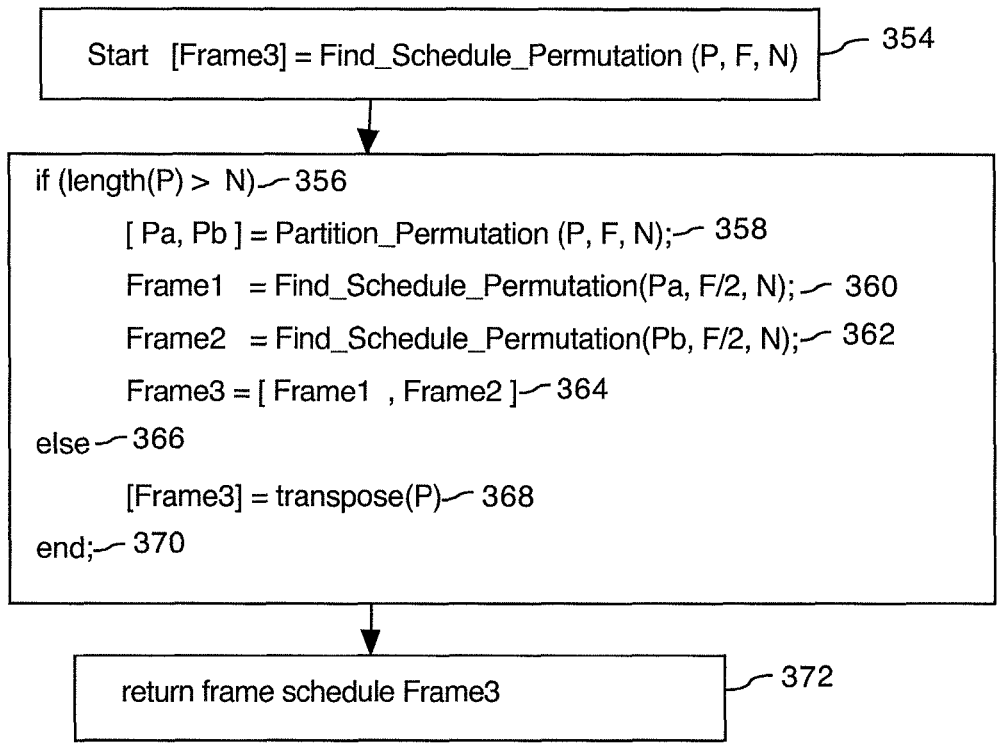

FIG 18

FIG 18A. N=8,F=8, Method Random_Matrix_to_Permutation

| Class | IIDT | Observed IDT | MIN | MAX | Std Dev |
|---|---|---|---|---|---|
| 1 | 8 | 8 | 8 | 8 | 0 |
| 2 | 4 | 4 | 1 | 7 | 1.803 |
| 3 | 2.667 | 2.667 | 1 | 6 | 1.342 |
| 4 | 2 | 2 | 1 | 5 | 1.015 |
| 5 | 1.6 | 1.6 | 1 | 4 | 0.847 |

FIG 18B. N=8,F=8, Method Linear_Matrix_to_Permutation.

| Class | IIDT | Observed IDT | MIN | MAX | Std Dev |
|---|---|---|---|---|---|
| 1 | 8 | 8 | 8 | 8 | 0 |
| 2 | 4 | 4 | 1 | 7 | 1.597 |
| 3 | 2.667 | 2.667 | 1 | 6 | 1.193 |
| 4 | 2 | 2 | 1 | 5 | 0.797 |
| 5 | 1.6 | 1.6 | 1 | 3 | 0.754 |

FIG 18C. N=8,F=8, Method Even_Odd_Matrix_to_Permutation

| Class | IIDT | Observed IDT | MIN | MAX | Std Dev |
|---|---|---|---|---|---|
| 1 | 8 | 8 | 8 | 8 | 0 |
| 2 | 4 | 4 | 1 | 7 | 1.186 |
| 3 | 2.667 | 2.667 | 1 | 6 | 1.322 |
| 4 | 2 | 2 | 1 | 5 | 0.891 |
| 5 | 1.6 | 1.6 | 1 | 3 | 0.618 |
| 6 | 1.333 | 1.333 | 1 | 2 | 0.516 |

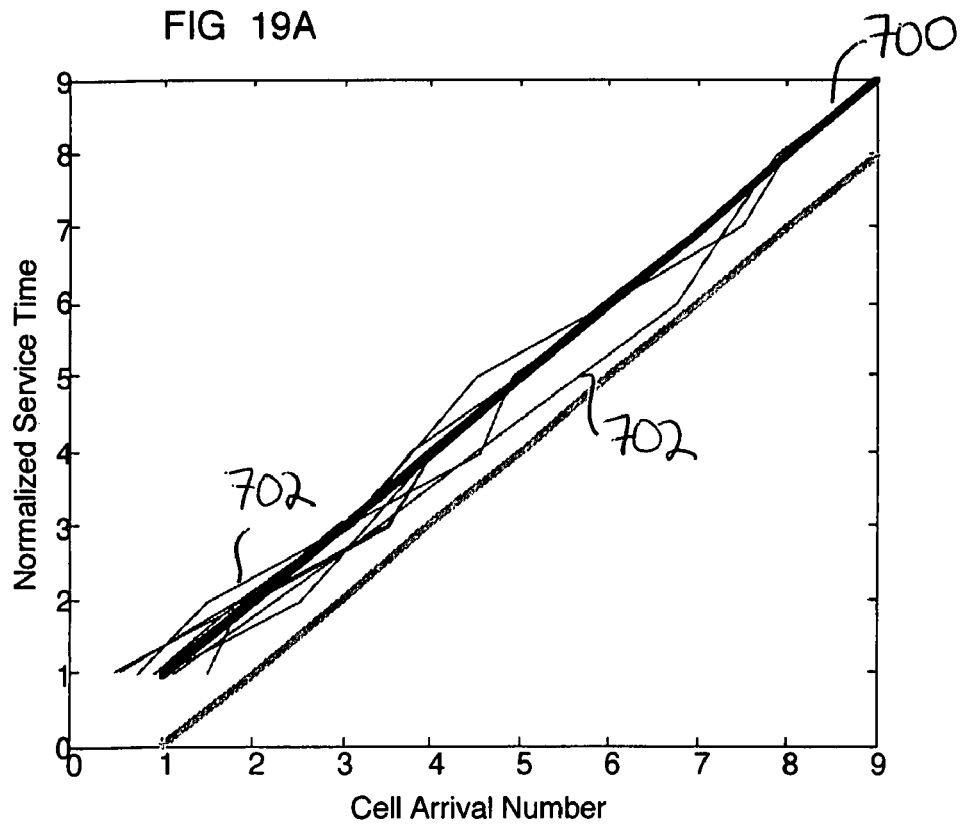
FIG 19A
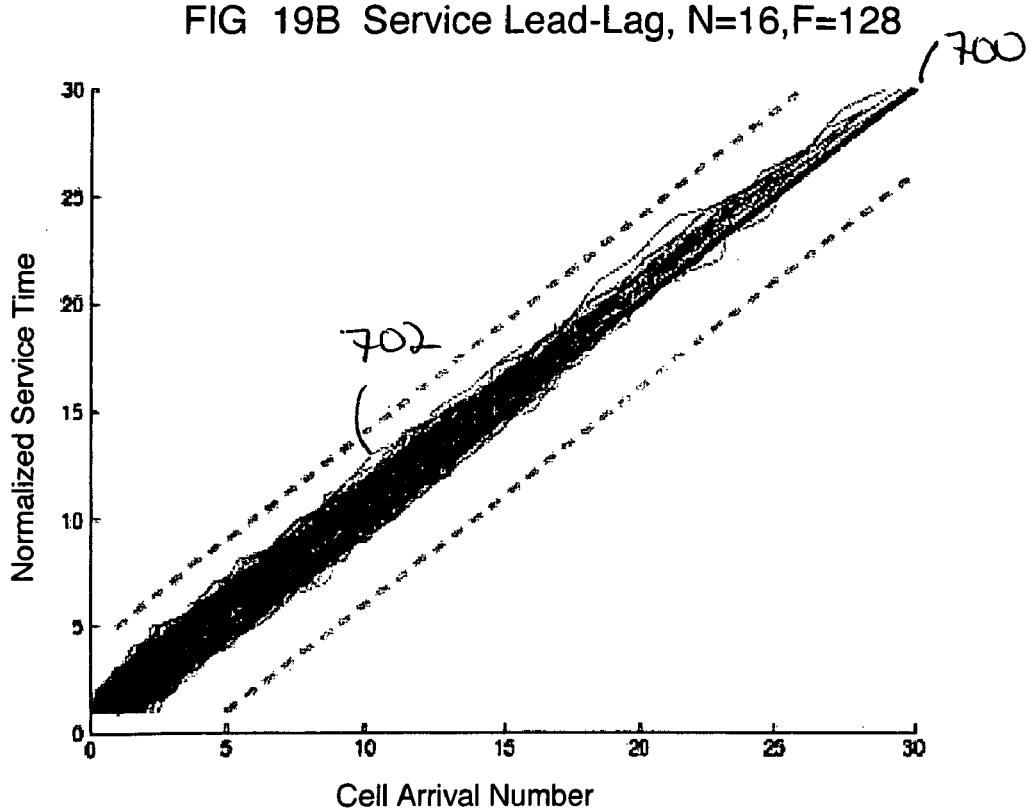
FIG 19B Service Lead-Lag, N=16, F=128

FIG 20A
| IP Router # | E(Nq) | E(Wq) |
|---|---|---|
| 1 | 0.625 | 0.477 us |
| 2 | 1.961 | 1.496 us |
| 3 | 1.086 | 0.829 us |
| 4 | 1.748 | 1.334 us |
| 5 | 2.822 | 2.153 us |
| 6 | 1.287 | 0.982 us |
| 7 | 1.369 | 1.045 us |
| 8 | 1.664 | 1.270 us |
| 9 | 1.406 | 1.073 us |
| 10 | 0.953 | 0.727 us |
| Playback Q | 0.4531 | 0.298 us |
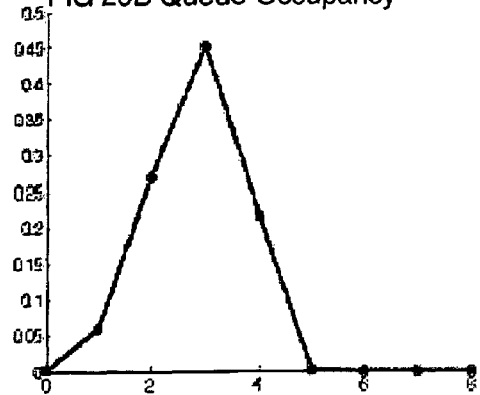
FIG 20B Queue Occupancy
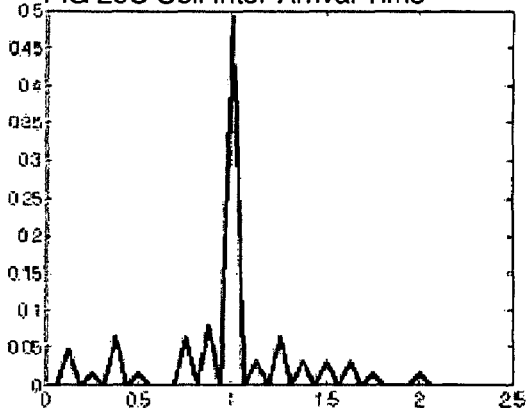
FIG 20C Cell Inter-Arrival Time
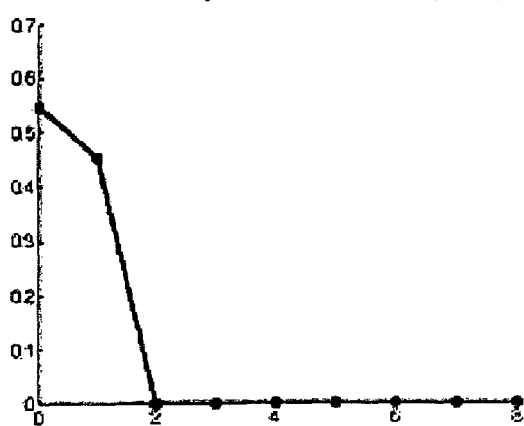
FIG 20D Playback Buffer Occupancy
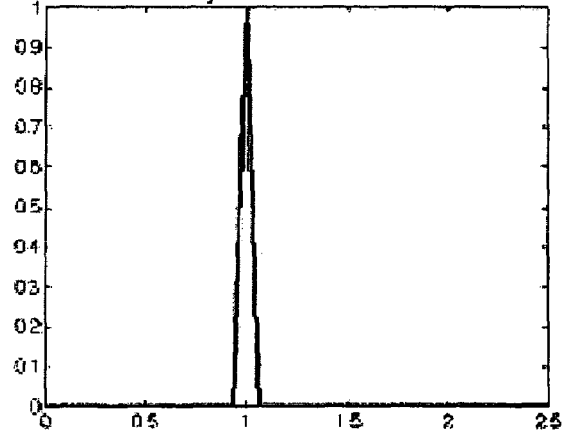
FIG 20E Playback Buffer Cell IDT

FIG. 21

```
Start
    [Frame1] = Optimize_Frame_Schedule(N, F, M, Frame1)  — 740 for j = 1 : N  — 742
    for k = 1 : N  — 744
        for c = 1:M(j,K)-1  — 746
            t1 = cell_time_slot (j,k, c-1)  — 748
            t2 = cell_time_slot(j, k, c)  — 750
            t3 = cell_time_slot(j,k,c+1)  — 752
            idt2 = t2- t1;   idt3 = t3 - t2;  — 754
            if  (idt2 >= K1 * IIDT) & (idt3 <= K2*IIDT)  — 756
                tm = t1 + floor(t3-t1)/2)  — 758
                for delta  = 1: floor( (t3 - t1 )/2 )  — 760
                    ts = tm+ delta;  — 762
            764 — if  (Frame1(ts,j) = -1) & (iFrame1(ts,k) = -1)
                        tidt2  =  ts - t1  — 766
                        tidt3  =  t3 - ts  — 768
                770 — if  (tidt2  <  idt2) & (tidt3  >  idt3)
                            Frame1(ts, j ) = k  — 772
                            Frame1(t2,j) = -1  — 774
                            break;  — 776
                        end  — 778
                    end  — 780
                    ts = tm - delta  — 782
                    repeat lines  — 784
                end  — 786
            end  — 788
        end  — 790
    end  — 792
end  — 794
return Frame1  — 796
```

FIG. 22

```
Start
[Frame3] = Burst_Schedule(N, F, F1, F2, B, M)  — 800

U = floor (M/B)  — 822
V = M - B*U  — 824

Frame1 = Compute_Frame_Schedule(N, F1, U)  — 826
Frame2 = Compute_Frame_Schedule(N, F2, V)  — 828 for p = 1:F1  — 830
    for c = 1:B  — 832
        ts = (p-1)*(B + floor(F2/F1)) + c  — 834
        Frame3(ts, 1:N ) = Frame1(p, 1:N)  — 836
    end  — 838
end  — 840
for p 1:F2  — 842
    ts = p*B + 1  — 844
    Frame3(ts, 1:N ) = Frame2(p, 1:N)  — 846
end  — 848
Return Frame3  — 850
```

Cell Arrival Number

[Frame1, Frame2, Frame3] = Find_Schedule_Traffic_Class (N, F, M1, M2, M3) — 870

A = M1 + M2 + M3 — 872

Frame_All = Compute_Frame_Schedule (N, F, A) — 874

[Frame1, Frame_Rem] = Select_Class_Frame_Schedule (N, F, M1, Frame_All) — 876

[Frame2, Frame_Rem] = Select_Class_Frame_Schedule (N, F, M2, Frame_Rem) — 878

Frame3 = Frame_Rem — 880 return Frame1, Frame2, Frame3 — 882

FIG. 24B

```
Start                                                        ⌐ 900
[Frame1, Frame2] = Select_Class_Frame_Schedule(N, F, M, Frame1, Frame2)

for j = 1 : N  ⌐ 902
    for k = 1 : N  ⌐ 904
        last_DT = 0  ⌐ 906
        for c = 1:M(j,K)  ⌐ 908
            found = 0  ⌐ 910
            t = last_DT + 1  ⌐ 912
            while (not found)  ⌐ 914
                if (Frame2(t,j) = k)  ⌐ 916
                    idt1 = t - last_DT  ⌐ 918
                    if ( idt1 >= IIDT * 0.9) | (c == 1)  ⌐ 920
                        Frame1( t,j)  = k  ⌐ 922
                        Frame2(t,j)   = -1  ⌐ 924
                        last_DT       = t  ⌐ 926
                        break  ⌐ 928
                end  ⌐ 930
            end  ⌐ 932
            t = t + 1  ⌐ 934
        end  ⌐ 936
    end  ⌐ 938
end  ⌐ 940
end  ⌐ 942
return Frame1, Frame2  ⌐ 944
```

FIG 25
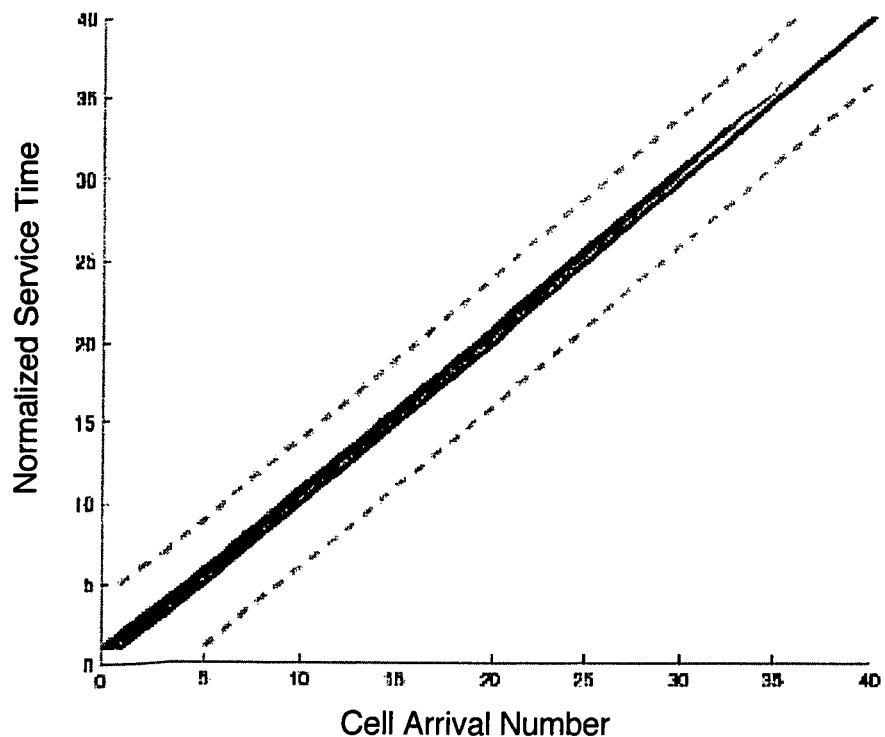
FIG 25A
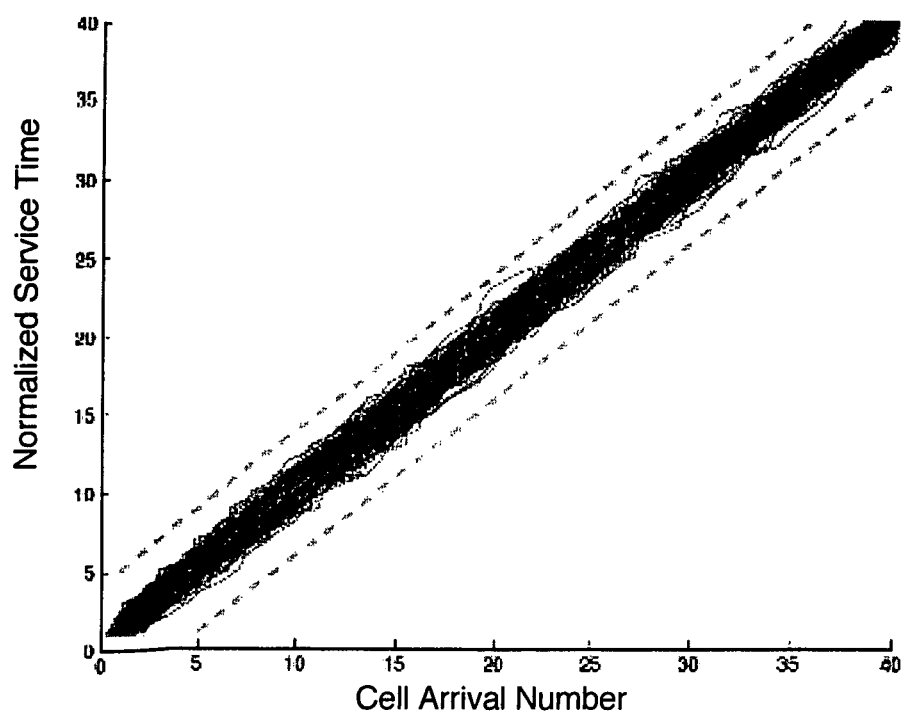
FIG 25B

METHOD AND APPARATUS TO SCHEDULE PACKETS THROUGH A CROSSBAR SWITCH WITH DELAY GUARANTEES

CROSS-REFERENCE TO RELATED APPLICATIONS

This application claims the benefit of the filing date of U.S. provisional application No. 60/808,951 filed on May 30, 2006.

BACKGROUND OF THE INVENTION

The present invention relates to routing connections in a telecommunications network, and more particularly, to scheduling of traffic connections in input-buffered switches.

DESCRIPTION OF THE PRIOR ART

Input-Queued (IQ) switches are widely used in scaleable, high-speed switches of telecommunications networks since input-buffered switches achieve a specified switching capacity using a lower memory bandwidth than Output-Queued switches. Memory and memory access tends to be the slowest component of a switching system. Increasing the size of a switch generally requires large memory bandwidths, which are difficult to achieve in output buffered switches with existing technology.

New multimedia services being offered over the Internet includes telerobotic surgery, telerobotic mining, Voice over IP and Television over IP. Telerobotic control is very sensitive to delay variation, and as a result there is a growing need for delay guarantees in Internet routers and switches which include input buffers.

A number of methods for maximizing the performance of input-buffered switches have been proposed in the prior art. It has been shown that an input-buffered switch using 'Virtual Output Queuing' may achieve 100% throughput under arbitrary traffic patterns, in the paper by V. Anantharam, N. McKeown, A. Mekittikul and J. Walrand, entitled "Achieving 100% Throughput in an Input Queued Switch", IEEE Transactions on Communications, vol. 47, no. 8, pages 1260-1267, 1999, which is hereby incorporated by reference.

Methods are also known in the prior art wherein an input-buffered switch can emulate of the quality-of-service behavior of output-buffered-switches for a general class of scheduling disciplines. However, these methods require complex arbitration schemes that execute at every switch scheduling instant (i.e., at the time scale of packet-transmission times).

There are two fundamentally different approaches to the switch scheduling problem: 'Dynamic cell scheduling' on a slot-by-slot basis, and 'Guaranteed Rate scheduling' on a frame-by-frame basis. In the dynamic cell scheduling approach, a new switch configuration is recomputed for each time-slot and no a priori knowledge is exploited. The determination of connections between the input and output ports of a crossbar switch is typically formulated as a bipartite graph matching problem which is solved in each time-slot. Dynamic cell scheduling approaches can adapt to dynamically varying traffic patterns, since they recompute matchings in each time-slot. In the paper by V. Anantharam et. al referenced above, it was shown that 100% throughput can be achieved for IQ switches with unity speedup, given that all input links are fully utilized and no output link is oversubscribed. However, such schemes are computationally intensive and it is difficult to compute optimal matchings as the line rate increases beyond 40 Gb/sec and the time-slot duration decreases to less than 12.8 nanoseconds (assuming that 64 byte cells are transferred in the switch).

Guaranteed Rate (GR) scheduling schemes were originally used in circuit switches in traditional telephone networks to provide dedicated connections for voice traffic, and have been used to schedule traffic over satellites. Such algorithms are also called 'Time-Slot-Assignment' (TSA) algorithms. Connections could be established for very long durations of time. There are several prior guaranteed rate reservation algorithms. The BATCH-TSA algorithm was introduced in the paper by T. Weller and B. Hajek, "Scheduling Nonuniform Traffic in a Packet Switching System with Small Propagation Delay", IEEE/ACM Transactions on Networking, vol. 5, no. 6, pp. 813-823, 1997, which is hereby incorporated by reference. This algorithm bounds the 'Service Lag' in a Time Division Multiple Access (TDMA) switch. The service lag is a figure of merit which reflects how far behind schedule a switch has fallen when trying to schedule traffic with rate guarantees. The idling weighted round robin (WRR) algorithm was introduced in a paper by N. McKeown, A. Hung, G. Kesidis, entitled "ATM Input Buffered Switches with Guaranteed Rate Property," in Proceedings of IEEE ISCC Conference, 1998, which is hereby incorporated by reference. This algorithm is similar to the BATCH-TSA but differs in the method in which packets are scheduled within a frame. The performance of these two prior art methods has been discussed in a paper by C. E Koksal, R. G. Gallager, C. E. Rohrs, entitled "Rate Quantization and Service Quality over Single Crossbar Switches", IEEE Infocom Conference, 2004, which is hereby incorporated by reference. According to this paper, the prior art methods suffer from the flowing drawbacks: "a large frame size implies a large delay, while a small frame size implies the set of rates for which the switch can provide bounded delays is very limited."

One class of traffic that can benefit from Guaranteed Rate scheduling is jitter-constrained traffic where the bandwidth requirements of the traffic are known a priori. This scheduling is primarily motivated by the needs of an 'Expedited Forwarding' (EF) traffic class in a 'Differentiated-Services' (Diff-Serv) framework, and the requirements of bandwidth-guaranteed, low-jitter traffic in 'Internet protocol' (IP) networks and 'Multi-Protocol Label Switched' (MPLS) networks. In a Diff-Serv network, each router is configured to achieve certain per-hop behavior (i.e., behavior through the path or hop between two adjacent switches). For the EF traffic class, bandwidth is provisioned between the input and output ports of a router. Considering the switch fabric of the router, this bandwidth provisioning results in the generation of a "traffic rate matrix" whose elements specify the bandwidth needed between every input-output port pair of the switch fabric (e.g., rows of the rate matrix correspond to input ports, and columns correspond to output ports). Since this bandwidth is needed for carrying the EF traffic, the switch must satisfy these bandwidth requirements while also satisfying additional stringent requirements on the tolerable jitter. The traffic rate matrix of the switch changes relatively slowly and might be on the order of the provisioning time scales for the per-hop behavior.

Guaranteed rate scheduling schemes generally exploit time-division multiplexing (TDM) of the switch fabric. The TDM schedule is equivalent to the Frame Schedule, and it is recalculated only when the traffic rate matrix changes, i.e., when the per-hop behavior is re-provisioned in a network.

The basis of the Guaranteed Rate (GR) scheduling method is that once a traffic rate matrix is provided, the traffic rate matrix is decomposed into a 'Frame Schedule', which is defined as a sequence of permutation vectors or permutation matrices, which are used to configure the switch for a sequence of F time-slots, where F is the length of the Frame Schedule. Each permutation vector or permutation matrix is referred to as one Frame Schedule 'entry'. The GR method ensures that every input port has the opportunity to transmit to every output port with a frequency sufficient to guarantee its bandwidth requirement. However, these transmission opportunities should ideally be distributed appropriately within a Frame Schedule to satisfy jitter constraints.

A disadvantage of prior GR methods is the relatively long time required for calculation of the Frame Schedule. For a fixed traffic rate matrix, the Frame Schedule is periodic, and consists of a sequence of switch permutations implemented during time-slots of the Frame period. Each Frame Schedule entry represents an interconnection between the input ports and the output ports for a given time-slot with the constraint that each input port is connected to at most one output port and each output port is connected to at most one input port. An entry in the Frame Schedule for an N×N switch may be represented as an N×N matrix containing zeros and ones, such that each row sum and column sum of the matrix is at most one. A "1" in the matrix element at row i and column j implies that input port i is connected to output port j in this time-slot. If each row sum and column sum is exactly one, then each input port is matched to exactly one output port and vice versa. This matrix is termed a 'permutation matrix'. A matrix whose row sums and column sums are at most one without it being a permutation matrix is termed a 'partial permutation matrix'. Therefore, an entry in the Frame Schedule may be represented as a permutation matrix or a partial permutation matrix. If entry is a partial permutation matrix, then the input ports and output ports that are not matched may be used to transmit best-effort traffic.

In general the traffic arriving at a switch consists of a mixture of guaranteed rate traffic with rate and delay specifications, and best-effort traffic. Once the guaranteed rate traffic has been scheduled within a frame, the frame schedule will generally be under-utilized, where the matchings between the N input ports and N output ports are non-saturated for several time slots. This unused switching capacity can be used to schedule best-effort traffic, using any existing hardware-based dynamic cell scheduling method. According to the prior art, a reasonable switch design combines the GR scheme with a dynamic scheduler that schedules best-effort traffic to utilize the transmission slots not used by the GR scheme.

The Frame Schedule that represents a given traffic rate matrix determines the time scale over which the rate, delay and jitter performance can be guaranteed. The total amount of bandwidth needed to support the Frame Schedule is termed the bandwidth requirement of the Frame Schedule. In order for a Frame Schedule to be feasible, the bandwidth requirement of the Frame Schedule should be less than the bandwidth capacity of the switch. If the bandwidth requirement exceeds the bandwidth capacity of the switch, some "speedup" must be introduced. Speedup can be introduced for example by operating multiple switches in parallel, thereby providing the ability of an output port to receive more than 1 packet per time-slot on average.

In addition, for good bandwidth and jitter performance, there are two additional desirable properties for the scheduling method which determines a Frame Schedule. First, the execution time of the scheduling method should not be too large since the method may need to run on a switch control processor and not on a high-end computer. Also, even though the traffic rate matrix does not change at the scale of a packet-switching time-slot, it is desirable to have the option of changing the traffic rate matrix at time scales associated with new connection establishment requests and connection tear-down requests (as for instance in MPLS networks). Second, according to the prior art the number of entries in a Frame Schedule should be relatively small since the entries may need to be stored in a controller close to the switch fabric and the memory taken up for table storage should be relatively small.

Slepian-Duguid Graph-Coloring Method (Prior Art)

One prior art method for calculating Frame Schedules is based on a result by Slepian and Duguid. They formulated the problem of connecting many input ports and output ports as a matching problem in a bipartite graph. Each input port is represented as a vertex in a first set. Each output port is represented as a vertex in a second set. Every request for a match between an input port and output port is represented by an edge in the bipartite graph between the two vertices. Slepian and Duguid showed that a sequence of matchings can be found by coloring the bipartite graph, i.e assigning colors to edges, such that no vertex has two incident edges of the same color. Each color can then represent an entry or switch configuration for one time-slot in a Frame Schedule: All the edges with the same color form a permutation which can be scheduled in the same time-slot, and the number of time-slots needed to realize the traffic implied in the bipartite graph is equal to the number of colors used to color the graph. There is no notion of quality of service in the bipartite graph coloring problem formulation or solution. Therefore, the delay experienced by any connection can be very large. The fundamental proof that an edge coloring of the bipartite graph results in a schedule is generally attributed to Slepian and Duguid.

Graph edge coloring is discussed in the paper by J. S. Turner and R. Melen, "Multirate Clos networks: $50^{Th}$ Anniversary of Clos Networks", IEEE communications Magazine, 2003, pp. 38-44, which is hereby incorporated by reference. There are many papers in the literature which propose variations of algorithms to find such an edge coloring.

Clos Network Method (Prior Art)

A related prior art method for calculating Frame Schedules is to transform the problem of coloring a bipartite graph into a problem of routing a permutation in a 3 stage Clos switching network. The problem of routing of a permutation through a 3-stage Clos network is equivalent to the problem of coloring a bipartite graph, and a solution for one problem yields a solution for the other.

There have been many papers over the years which have addressed the problem of routing permutations in a Clos network. The problem is generally quite difficult, as is evident from the number of papers which have examined the problem. The following is a partial list of papers, which are hereby incorporated by reference. A paper by S. Andresen entitled "The looping algorithm extended to base 2' rearrangeable switching networks," IEEE Transactions on Communications, vol. COM-25, introduces an algorithm for routing permutations in multistage networks. A paper by F. Hwang, "Control algorithms for rearrangeable Clos networks," IEEE Transactions on Communications, vol. COM-31, pp. 952-954, August 1983 introduces additional algorithms. A paper by J. Gordon and S. Srikanthan, "Novel algorithm for Clos-type networks," *Electronic Letters*, vol. 26, no. 21, pp. 1772-1774, October 1990 introduces additional algorithms. A paper by Y. K. Chiu and W. C. Siu, "Comment: Novel algorithm for Clos-type networks," *Electronic Letters*, vol. 27, no. 6, pp. 524-526, March 1991 discusses issues with the previous algorithm. A paper by H. R. Ramanujam, "Decomposition of permutation networks," IEEE Transactions on Computers, vol. C-22, pp. 639-643, July 1973 introduces an additional algorithm. A paper by M. Kubale, "Comments on 'Decomposition of permutation networks,'" IEEE Transactions on Computers., vol. C-31, p. 265, March 1982 addresses issues with the previous algorithm. A paper by A. Jajszczyk, "A simple algorithm for the control of rearrangeable switching networks," IEEE Transactions on Communications, vol. COM-33, pp. 169-171, February 1985 introduces another algorithm for controlling such networks. A paper by C. Cardot, "Comments on 'A simple control algorithm for the control of rearrangeable switching networks,'" IEEE Transactions on Communications, vol. COM-34, p. 395, April 1986 discusses issues with the previous algorithm.

One of the difficulties of all of these prior art methods is that they are time consuming and often require 'backtracking', ie once a method determines it cannot proceed forward it must backtrack and undo previously-made incorrect decisions, in order to move forward. The paper by J. D. Carpinelli, A. Y. Oruc, entitled "A Nonbacktracking Matrix Decomposition Algorithm for Routing on Clos Networks", IEEE Transactions on Communications, Vol. 41, No. 8, August 1993, pp. 1245-1251, is hereby incorporated by reference. This paper introduces a non-backtracking algorithm, but it is quite complex.

A summary of the 50 years of theory related to Clos networks is provided in the paper by A. Jajszczyk, "Nonblocking, Repackable and Rearrangeable Clos Networks: Fifty Years of the Theory Evolution", IEEE Communications Magazine, October 2003, pp. 28-33, which is hereby incorporated by reference. Another paper outlining the use of the Clos network in multirate circuit switching systems is the paper by J. Turner and R. Melen, "Multirate Clos Networks— 50$^{th}$ Anniversary of Clos Networks", IEEE Communications Magazine, October 2003, pp. 38-44, which is hereby incorporated by reference. These authors state that: "We can also expect that the Clos networks will retain their central place in the design of high performance switching systems of all kinds, and that the intellectual framework created to model their performance will continue to develop and evolve to meet the needs of new technologies and applications".

The number of prior art papers illustrates the importance of finding efficient algorithms to color a graph, or equivalently for finding efficient algorithms for routing permutations in a 3 stage Clos network. However, none of the prior art methods have recognized or adequately addressed the problem of minimizing the delay jitter or delay variation when determining a Frame Schedule.

Birkhoff Von Neuman Decomposition (Prior Art)

One prior art method for calculating Frame Schedules is based on the Birkhoff Von-Neumann (BV) decomposition. The concept of BV decomposition for use in input buffered switches was first introduced in the paper by C-S Chang, W. J Chen and H-Y Huang, "On Service Guarantees for Input Buffered Crossbar Switches: A Capacity Decomposition Approach by Birkhoff and von Neuman", IEEE iWQoS'99, 1999, pp. 79-86, which is hereby incorporated by reference. A second paper by W. J. Chen, C-S. Chang. and H-Y. Huang, entitled "Birkhoff-von Neumann Input Buffered Crossbar Switches," Proc. Infocom Conference 2000, reports additional results, and is hereby incorporated by reference.

BV decomposition employs a BV algorithm that can minimize the bandwidth requirement for the Frame Schedule, while providing bandwidth guarantees. The BV algorithm does not take into account delay jitter performance, and a straightforward implementation of the BV algorithm may lead to extremely high delay jitter that does not meet the requirements of EF class service. The time complexity (related to the execution time) of the BV algorithm for an N×N crossbar switch is on the order of $N^{4.5}$ steps on a processor, represented mathematically as $O(N^{4.5})$ and the number of frame schedule entries or permutations is $O(N^2)$. This time requirement makes the algorithm impractical for a high-speed switch implementations.

The BV approach starts with a doubly sub-stochastic or double stochastic N×N traffic rate matrix which specifies the desired traffic rates between input and output ports. The matrix is decomposed into a sequence of N×N permutation matrices (or partial permutation matrices) which can be used to configure the crossbar switch in a sequence of time-slots, and which can be re-used in a circular manner. This approach provides rate guarantees for all admissible traffic matrices. However, according to the paper be C. E. Rohrs referred earlier, the worst-case delay can be very high with BVN decomposition. The authors state: "Therefore, given a bursty delay sensitive traffic flow, a traffic rate which is higher (and possibly much higher) that the average traffic rate of the flow must be allocated to meet its delay requirement".

The basis of the BV decomposition is that any doubly stochastic matrix can be written as a convex combination of permutation matrices. Therefore, the BV decomposition of the rate matrix R generates a set of permutation matrices $P_k$, k=1, ..., K, with $K \leq N^2 - 2N + 2$ so that equation (1) below holds:

$$R \leq \sum_{k=0}^{K} \phi_k P_k \qquad (1)$$

where each $\phi_k$ is a constant equal to the 'weight' of permutation matrix Pk, and equation (2) gives the relation between the elements R(i,j) of the traffic rate matrix and the elements $P_k(i,j)$ of the K permutation matrices:

$$R(i, j) \leq \sum_{k=0}^{K} \phi_k P_k(i, j) \qquad (2)$$

The bandwidth requirement BR of the Frame Schedule generated by the BV decomposition is given by equation $$BR = \sum_{k=0}^{K} \phi_k = M \qquad (3)$$

where M≦1 is the largest of the row sums and column sum of the rate matrix. Thus, the BV decomposition can minimize the bandwidth requirement by meeting the bound M.

The BV approach provides rate guarantees for all admissible traffic matrices. However, according to the paper by C. E. Rohrs et al, the worst-case delay can be very high with BVN decomposition.

The BV decomposition can be done off-line and only needs to be recomputed when the requested flow rates change. Once the matrix decomposition is computed, the permutation matrices must be scheduled such that the permutation matrix Pk appears proportional to its weight $\phi_k$, k=1, ... K. This scheduling method is separate from the decomposition method. Some scheduling method must be employed to create a frame schedule from the matrix decomposition. There is no notion of fairness in the BVN decomposition and $O(N^2)$ matrices may be generated, leading to potentially lengthy delays if the scheduling method is unfair.

The permutation matrices may be scheduled across the switch using a Weighted Round Robin (WRR) scheduling method. A BV decomposition may be illustrated with the following 4×4 fully saturated (doubly stochastic) matrix, which was introduced in the paper by I. Keslassy, M. Kodialam, T. V. Lakshamn, D. Stiliadis, entitled "On Guaranteed Smooth Scheduling for Input-Queued Switches", IEEE/ACM Transactions on Networking, Vol. 13, No. 6, December 2005, which is hereby incorporated by reference:

$$R = \begin{bmatrix} 0.38 & 0 & 0.22 & 0.40 \\ 0.11 & 0.24 & 0.60 & 0.05 \\ 0 & 0.53 & 0.14 & 0.33 \\ 0.51 & 0.23 & 0.04 & 0.22 \end{bmatrix} \quad (4)$$

All the row and column sums of the rate matrix R are one (i.e., the rate matrix is doubly stochastic). One possible BV decomposition of the rate matrix of equation (4) is shown below in equation (5):

$$R \leq 0.14 \times \begin{bmatrix} 1 & 0 & 0 & 0 \\ 0 & 1 & 0 & 0 \\ 0 & 0 & 1 & 0 \\ 0 & 0 & 0 & 1 \end{bmatrix} + 0.23 \times \begin{bmatrix} 1 & 0 & 0 & 0 \\ 0 & 0 & 1 & 0 \\ 0 & 0 & 0 & 1 \\ 0 & 1 & 0 & 0 \end{bmatrix} +$$

$$0.10 \times \begin{bmatrix} 0 & 0 & 1 & 0 \\ 0 & 1 & 0 & 0 \\ 0 & 0 & 0 & 1 \\ 1 & 0 & 0 & 0 \end{bmatrix} + 0.01 \times \begin{bmatrix} 1 & 0 & 0 & 0 \\ 0 & 0 & 1 & 0 \\ 0 & 1 & 0 & 0 \\ 0 & 0 & 0 & 1 \end{bmatrix} +$$

$$0.36 \times \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.04 \times \begin{bmatrix} 0 & 0 & 0 & 1 \\ 1 & 0 & 0 & 0 \\ 0 & 1 & 0 & 0 \\ 0 & 0 & 1 & 0 \end{bmatrix} +$$

$$0.07 \times \begin{bmatrix} 0 & 0 & 1 & 0 \\ 1 & 0 & 0 & 0 \\ 0 & 1 & 0 & 0 \\ 0 & 0 & 0 & 1 \end{bmatrix} + 0.05 \times \begin{bmatrix} 0 & 0 & 1 & 0 \\ 0 & 0 & 0 & 1 \\ 0 & 1 & 0 & 0 \\ 1 & 0 & 0 & 0 \end{bmatrix} \quad (5)$$

The BV decomposition shown in equation (5) has 8 permutation matrices, and this BV decomposition of the rate matrix in equation (4) is not unique. In the BV decomposition of the rate matrix R, a given entry R(i,j) is divided and spread ("striped") across several permutation matrices. The US Patent Application #20030227901, by M. S. Kodialam, T. V. Lakshman, D. Stiliadis, entitled "Scheduling of Guaranteed-bandwidth low-jitter traffic in input-buffered switches" is hereby incorporated by reference. According to this patent application, the following was stated: "Therefore, independent of the type of algorithm used to schedule the permutation matrices, there is no control on when individual entries in the rate matrix will be scheduled. It is possible to derive bounds on the jitter, but it is not possible to ensure that the jitter is low. The bounds on the jitter for the traffic between input port i and output port j depend on the number of matrices in the decomposition that R(i,j) is striped across and also on the number of matrices in the decomposition. Since both these factors increase with the number of ports in the switch, the jitter problem becomes severe when the number of ports is large. The BV decomposition, therefore, results in poor jitter performance especially when there is a large number of ports in the switch."

Greedy Low Jitter Scheduler (Prior Art)

Another prior art method for scheduling cells through an input-buffered crossbar switch was proposed in the paper by I. Keslassy, M. Kodialam, T. V. Lakshamn, D. Stiliadis referenced earlier, and also in the US Patent Application #20030227901 "Scheduling of Guaranteed-bandwidth low-jitter traffic in input-buffered switches" which was referenced earlier. Traffic streams with tight jitter constraints are scheduled through the switch using a frame-based scheduler. They propose a matrix decomposition algorithm designed for low-jitter, which is different from the Birkoff-von Neuman (BV) decomposition.

Those authors propose a Low-Jitter (LJ) decomposition method. The method imposes a set of constraints on the permutation matrices used in a Frame Schedule. They formulate the problem as an integer programming optimization problem, which they call an 'Integer Low Jitter Decomposition' (ILJD) problem, to be solved under the set of constraints. The number of permutation matrices in their solution is no larger than 2N−1.

They introduce a constraint on the optimization problem, which is to minimize the bandwidth requirement BR for the Frame Schedule. Therefore the objective of the LJ decomposition is to solve an integer LJ decomposition programming problem (ILJD) subject to numerous constraints. Since the BV decomposition of the prior art solves the scheduling problem implicitly with the constraint of minimizing the Bandwidth Requirement, the bandwidth requirement of the ILJD solution will be greater than or equal to that of the BV decomposition. As in the case of prior art BV decomposition, the LJ decomposition of the rate matrix is not unique. However, unlike the BV decomposition, the ILJD programming problem is NP-hard, such that an exact computational solution can require tremendous amounts of computation time.

The authors proposed a heuristic algorithm termed the 'Greedy Low Jitter Decomposition' (GLJD) method to solve the ILJD problem in reasonable computational time. Their heuristic algorithm yields considerably fewer permutation matrices than BV decomposition, O(N) instead of O($N^2$), and therefore requires much less high-speed memory to store the switch configurations. However, their algorithm does not offer 100% throughput, and in the worst-case it can require O(log N) speedup, ie its bandwidth requirement can be considerably larger compared to the bandwidth required in a minimum BV decomposition. In other words, in the worst case their Greedy LJ decomposition algorithm may effectively require the operation of O(log N) switches in parallel, to meet the bandwidth and speedup demand, and the efficiency of the switch is therefore O(1/log N) which asymptotically approaches 0 for large enough switches.

Returning to the illustration described above, the GLJD method for solving the integer programming problem ILJD generates the following decomposition in equation (6) for the exemplary rate matrix of equation (4):

$$R \leq 0.60 \times \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.38 \times \begin{bmatrix} 1 & 0 & 0 & 0 \\ 0 & 1 & 0 & 0 \\ 0 & 0 & 0 & 1 \\ 0 & 0 & 1 & 0 \end{bmatrix} + \quad (6)$$

$$0.23 \times \begin{bmatrix} 0 & 0 & 1 & 0 \\ 1 & 0 & 0 & 0 \\ 0 & 0 & 0 & 0 \\ 0 & 1 & 0 & 0 \end{bmatrix} + 0.22 \times \begin{bmatrix} 0 & 0 & 0 & 0 \\ 0 & 0 & 0 & 0 \\ 0 & 0 & 1 & 0 \\ 0 & 0 & 0 & 1 \end{bmatrix} + 0.05 \times \begin{bmatrix} 0 & 0 & 0 & 0 \\ 0 & 0 & 0 & 1 \\ 0 & 0 & 0 & 0 \\ 0 & 0 & 0 & 0 \end{bmatrix}$$

The LJ decomposition solution in equation (6) has a Bandwidth Requirement value of (0.60+0.38+0.23+0.22+0.05)=1.48 in this small example. Therefore, a speedup of 48% is required. Effectively, to achieve an aggregate switching capacity of 1 terabit per second in this example, the switch must have an internal aggregate capacity of 1.48 terabits per second. In comparison, a more formal solution to the ILJD may be may be generated using a mathematical optimization program (e.g., CPLEX in the Matlab mathematical programming environment) to generate a better LJ decomposition of matrix R in equation (4), with Bandwidth Requirement of 1.36:

$$R \leq 0.60 \times \begin{bmatrix} 0 & 0 & 0 & 1 \\ 0 & 0 & 1 & 0 \\ 0 & 1 & 0 & 0 \\ 1 & 0 & 0 & 0 \end{bmatrix} + 0.05 \times \begin{bmatrix} 0 & 0 & 0 & 0 \\ 0 & 0 & 0 & 1 \\ 0 & 0 & 0 & 0 \\ 0 & 0 & 1 & 0 \end{bmatrix} + \qquad (7)$$

$$0.33 \times \begin{bmatrix} 0 & 0 & 1 & 0 \\ 1 & 0 & 0 & 0 \\ 0 & 0 & 0 & 1 \\ 0 & 1 & 0 & 0 \end{bmatrix} + 0.38 \times \begin{bmatrix} 1 & 0 & 0 & 0 \\ 0 & 1 & 0 & 0 \\ 0 & 0 & 1 & 0 \\ 0 & 0 & 0 & 1 \end{bmatrix}$$

The LJ decomposition of equation (7) has a bandwidth requirement of (0.60+0.38+0.33.4+0.05)=1.36, even when using a complex optimization program such as CPLEX. Consequently, comparing the heuristic solution of equation (6) with the more formal solution of equation (7), if the switch speedup is strictly one, neither solution may be employed to schedule the guaranteed rate traffic.

In practice, experimental results presented in the aforementioned paper show that while the greedy low-jitter decomposition algorithm requires a worst-case speedup of O(log N), for many traffic matrixes it can achieve throughputs of approximately 80% of the switch capacity, before failing to find a solution. It produces considerably fewer permutation matrices, empirically about O(N), compared to the BVN decomposition (O($N^2$)). Nevertheless, this approach cannot guarantee any results without introducing speedup, which is undesirable.

MIT Quantized Low Jitter Scheduler (Prior Art)

Another prior art method of scheduling cells through an input-buffered crossbar switch was also considered in the paper by C. E Koksal, R. G. Gallager, C. E. Rohrs, entitled "Rate Quantization and Service Quality over Single Crossbar Switches", IEEE Infocom 2004, which is hereby incorporated by reference. This paper reports work performed at the Massachusetts Institute of Technology, in C. E. Koksal's PhD thesis.

They introduce an algorithm to schedule the cells through a crossbar switch, with improved quality of service compared to the BV decomposition. They also introduce the concept of a quantized traffic rate matrix, whereby they transform the matrix R which has fractional values, to a matrix which has only integer values. Their algorithm requires some amount of speedup greater than 1 and less than or equal to 2, and the speedup affects the 'grade' of quantization which directly affects the quality of service provided by the switch. The worst case delay is improved by a factor of O(N) compared to BV decomposition. The schedule is periodic, and repeats itself every O(N) time slots. The initial schedule construction incurs a cost of O($N^{2.5}$) on a serial computer, and once the schedule is generated it can be incrementally updated with O(N) complexity per rate update.

The authors present experimental results in their paper. Using their algorithm, for a speedup close to 2 the service lag does not exceed roughly N/2 time-slots, whereas is can go as high as O($N^2$) time-slots when no speedup is allowed. For example, with a speedup of 2 the deviation of a packet's departure time, relative to its ideal departure time, is no more than N/2 time-slots. For a switch of size 256×256 with a speedup of 2, the service lag bound using the MIT algorithm is 128 time-slots, whereas without any speedup it can be as high as 65,000 link time-slots. This approach is able to guarantee traffic rates, but it does require a speedup of nearly 2 in order to achieve reasonable bounds on the delay, which is undesirable.

Greedy Integer Decomposition (Prior Art)

Another prior art method based upon BV decomposition was proposed in the paper by S. R. Mohanty and L. N. Bhuyan entitled 'Guaranteed Smooth Switch Scheduling with Low Complexity", IEEE Globecom conference, 2005, pp. 626-630, which is hereby incorporated by reference. This algorithm operates on the unquantized traffic rate matrix R. A method whereby the elements R(j,k) of matrix R are represented as sums of binary fractions, ie ½, ¼, ⅛, is presented. The matrix R can then be decomposed into a convex combination of permutation matrices and their weights, using a greedy sub-optimal algorithm. The decomposition yields an unordered set of permutation matrices and their weights, but not a sequence of permutations representing a frame schedule. The algorithm also attempts to minimize the number of permutation matrices to be stored. This method then must schedule the unordered set of matrices using another scheduling method. They use a method based on round-robin scheduling which attempts to provide relatively fair service. The authors also provide a bound on the delay jitter.

The matrix decomposition method and the scheduling method presented in this paper are relatively fast compared to the prior art, since both methods are greedy and sub-optimal. However, there are several drawbacks to sub-optimal decompositions. First, the bandwidth requirement of the resulting frame schedule will require speedup due to the sub-optimal decomposition. The addition of speedup into a switch incurs a significant additional cost which will be avoided in an optimal decomposition, if one can be found. Second, their algorithm cannot provide short term fairness. The authors state: "as is common to all round-robin schedulers SRRSW cannot provide short term fairness". Third, their jitter bound grows as the switch size N increases (see page 630). The authors acknowledge the difficulty of providing hard guarantees for the delay.

The authors state in their conclusions: "An interesting problem to explore would be to determine the minimum speedup required to provide hard guarantees, and whether such guarantees are possible at all".

Objects and Advantages

Accordingly, it is desirable to find a scheduling method for crossbar switches which can meet guaranteed rate (GR) bandwidth requirements, which can also provide guaranteed delay bounds, which can minimize the delay jitter, and which can operate with a speedup of 1, such that no speedup is required. In this application, a 'Guaranteed Rate and Delay' (GRD) scheduling method is proposed. The proposed method establishes that hard rate and delay guarantees can be met by switch with low jitter and with unity speedup.

The proposed Guaranteed Rate and Delay (GRD) scheduling method is simple to implement, it results in 100% throughput, it requires no speedup, and it results in very low 'jitter' in the traffic streams.

The proposed GRD scheduling method meets guaranteed bandwidth constraints and also introduces guaranteed delay constraints.

The maximum number of packets queued in a switch employing the GRD scheduling method can be kept to a very small number, due to the very low delay 'jitter'. Packets belonging to guaranteed rate connections generally arrive close to the their ideal arrival times, and generally departure close to their ideal departure times, and therefore there is no need to maintain a large queue of packets or cells in an IP router or switch.

The guaranteed bandwidth allocated to a flow can be increased, decreased or removed incrementally, without disturbing the other traffic in the switch most of the time.

New flows can be added or removed incrementally, without substantially disturbing the other traffic in switch most of the time.

The proposed GRD method removes the need to add 'speedup' to a switch in order to achieve 100% throughput. The method works with a speedup of one and achieves 100% throughput.

The proposed GRD method is very fast, with a worst-case run time of O(NF log(NF)) when executed in a serial processor, and with considerably faster run-time when executed in a multiple-processor implementation, such as the new multi-core Intel processors. The algorithm has a run-time complexity comparable to the well know FFT algorithm, and should run several times faster than similarly sized FFT computations.

The GRD scheduling method can work in tandem with a separate hardware-based cell scheduler for Best-Effort traffic. When the GR traffic does not utilize all the switching capacity in a frame, the GRD scheduler will result in frame schedules where some input ports and output ports will be idle for many time-slots. A separate hardware-based cell scheduler can compute matchings between idle input ports and idle output ports for best-effort traffic, dynamically in every time-slot.

The GRD scheduling method is sufficiently fast, that it can also be used to compute schedules for dynamically changing Best-Effort traffic. Schedules for dynamically changing Best-Effort traffic can be computed every several milliseconds, corresponding to the duration of several frames. A hardware-based cell scheduler for best-effort traffic is not essential.

By assigning the scheduling of Best-Effort traffic to the proposed GRD algorithm, the likelihood of 'Denial of Service' (DOS) Attacks on the Internet should be dramatically diminished. The proposed GRD method can be implemented primarily in software, with potentially some hardware-assistance, so that the scheduling of best-effort traffic can be placed under software control. Software can detect unusual spikes of best-effort traffic directed to a single output port, and process the request and determine how much, if any, of this short-term bandwidth request to allocate.

The GRD scheduling method can achieve 100% throughput through a crossbar switch, thereby allowing the maximize utilization of the installed network infrastructure.

The GRD scheduling method results in guaranteed rate bounds and guaranteed delay bounds, suitable for new emerging Telerobotic services over the network, such as telerobotic surgery, telerobotic mining, telerobotic manufacturing systems, and other new services.

The GRD method removes much of the variability of network queueing delays for guaranteed rate traffic.

The GRD method can guarantee a small end-to-end queuing delay in a network, as low as 10 s-100 s of microseconds as shown by simulations, suitable for real-time traffic and services. This figure does not include the fixed fiber delay, which can be several milliseconds.

The GRD method can achieve 100% throughout without any switch speedup, but it can also be used in switches with speedup. Switches with speedup often use a combination of input queueing and output queueing.

The GRD method can be used in Internet Protocol (IP) networks, in protocols such as RSVP and Differentiated Services (Diff-Serv), which use connection-establishment and call-admission protocols to establish end-to-end paths for new connections. Resources such as bandwidth and buffer space can be reserved in each router or switch along an end-to-end path, when a new connection is established. The proposed GRD method can be used to schedule traffic through each switch or IP router in the end-to-end path, while providing bandwidth rate guarantees and delay guarantees.

The GRD method can be used in ATM networks, MPLS networks, and in Generalized MPLS networks, in the same manner as it can be used in IP networks.

The GRD method can be used in frame-based schedulers, such as Frame-relay, and optical switches which use time-domain-switching, and in switches in satellites, which traditionally all use time-slot-assignment algorithms.

The GRD method can be used wireless networks (ie 802.11 'WiFi' networks and 802.16 'WiMax' network), which can use time-slot-assignment algorithms to schedule traffic between mobile users and an Access Point, or between Access Points.

The GRD method can be implemented in software in a serial processor, or implemented in software in a multiple processor, or implemented in hardware in an Application Specific Integrated Circuit (ASIC), or implemented in a Field Programmable Logic Device (FPLD) or a Field Programmable Gate Array (FPGA), or other programmable hardware methods.

SUMMARY OF THE INVENTION

In accordance with embodiments of the present invention, a method and apparatus to schedule the transmission of packets through a crossbar switch with N input/output ports subject to guaranteed rate and delay constraints is presented. A quantized traffic rate matrix is generated from collected provisioning information. The traffic rate matrix for a Frame of length F time-slots (equivalently, a scheduling period) is first transformed into a permutation of size NF elements, which is then decomposed into a sequence of smaller permutations each with N elements, where each permutation is used to configure the switch for one time-slot within a frame. The collection of F permutations is called a Frame Schedule. In the Frame Schedule, the expected Inter-Departure Time (IDT) between cells in a flow equals the Ideal IDT, and the delay jitter is bounded and small. For fixed frame size F, an individual flow can often be scheduled in O(log N) steps, while a complete reconfiguration requires O(N log N) steps when implemented in a serial processor. An RSVP or Differential Services-like algorithm can be used to reserve bandwidth and buffer space in an IP-router, an ATM switch or MPLS switch during a connection setup phase, and the proposed method can be used to schedule traffic in each router or switch along the path. The scheduling method also supports multicast traffic.

BRIEF DESCRIPTION OF THE DRAWINGS

Other aspects, features, and advantages of the present invention will become more fully apparent from the following detailed description, the appended claims, and the accompanying drawings.

FIG. 2 shows two prior art methods for representing the traffic in a switch.

FIG. 3 shows a prior art 3-stage Clos network, and the routing of 4 connections in this network.

FIG. 4 shows a prior art Benes network, where the switches in the first and third stage have size 2×2, while the switches in the middle stage have size (N/2)×(N/2). When the middle stage switches are recursively expanded using the same structure, the resulting network of 2×2 switches is called the binary Benes network topology.

FIG. 10 illustrates the results of the sub-optimal greedy recursive fair matrix decomposition methods in FIGS. 7, 8 and 9 graphically. To achieve the required traffic rates specified in the traffic rate matrix, speedup is necessary due to the sub-optimality of the decomposition.

FIG. 11 illustrates the results of the proposed optimal recursive fair matrix decomposition method graphically, for comparison with FIG. 10. To achieve the required rates specified in the traffic rate matrix, no speedup is necessary and the throughput is essentially 100%.

FIG. 12A illustrates the method 'Compute_Frame_Schedule', which will transform a quantized traffic rate matrix into a permutation, and then invoke the method in FIG. 12B to determine a low-jitter frame schedule from the permutation. FIG. 12 shows an embodiment of the method 'Find_Schedule_Permutation', a provably optimal method to partition a permutation representing a quantized traffic rate matrix relatively fairly into 2 permutations representing 2 traffic rate matrices.

FIG. 18 illustrates tables of results for the decomposition of 100 randomly selected traffic rate matrices, for a switch of size N=8 and a frame of size F=8, using the method of FIG. 12A. FIG. 18A shows results for the frame schedules computed using the method of FIG. 12A and FIG. 15. FIG. 18B shows results for the frame schedules computed using the method of FIG. 12A and FIG. 16. FIG. 18C shows results for the frame schedules computed using the method of FIG. 12A and FIG. 17. The delay variance is very small.

FIG. 19A illustrates the 'Service Lead-Lag' of a Frame Schedule for a switch with size N=8, with a frame size of F=16, using the proposed methods of FIG. 12A and FIG. 16. Most cells are serviced very close to their ideal service time. FIG. 19B illustrates the Service Lead-Lag for a switch with size N=16, with a frame size of F=128 time-slots. The results are taken over 10 randomly generated traffic rate matrices with 100% utilization. Most cells are serviced very close to their ideal service time.

FIG. 20 illustrates results for guaranteed rate traffic traversing an end-to-end path over 10 IP routers, using the method of FIG. 12A. Computer simulations where used to generate these results. FIG. 20A illustrates the average number of cells queued in each input queue of the IP routers, and in the destination's playback buffer. FIG. 20B illustrates the number of queued cells in the most heavily loaded input queue (an average of 2.8 cells). FIG. 20C illustrates the probability distribution for the inter-arrival times of cells arriving to this input queue. FIG. 20D illustrates the number of cells queued at the destination playback buffer. FIG. 20E illustrates the probability distribution for the inter-departure times of cells departing from the playback buffer. In this example, the delay jitter at the end-user is zero, and each input queue contains on average slightly more than 1 cell. The delay jitter has been completely eliminated in this example. Simulations where conducted for several different switch sizes, frame sizes, end-to-end path lengths and traffic rate matrices, with similar results. The delay jitter is very low.

FIG. 21 illustrates the method 'Optimize_Frame_Schedule' to further reduce the delay jitter of the frame schedule computed by the proposed method in FIG. 12A.

FIG. 22 illustrates the method 'Burst Schedule' to schedule Guaranteed Rate traffic with allowable bursts of service.

FIG. 24B illustrates the method 'Select_Class_Frame_Schedule' which computes the frame schedule for a traffic class. Guaranteed Rate traffic can represent a high-priority class, while Best-Effort traffic can represent a low priority class.

FIG. 25A illustrates the 'Service Lead-Lag' for Guaranteed Rate traffic, which is essentially ideal with very little service lead or lag. FIG. 25B illustrates the 'Service Lead-Lag' for Best-Effort traffic.

DETAILED DESCRIPTION

Figure 1A:
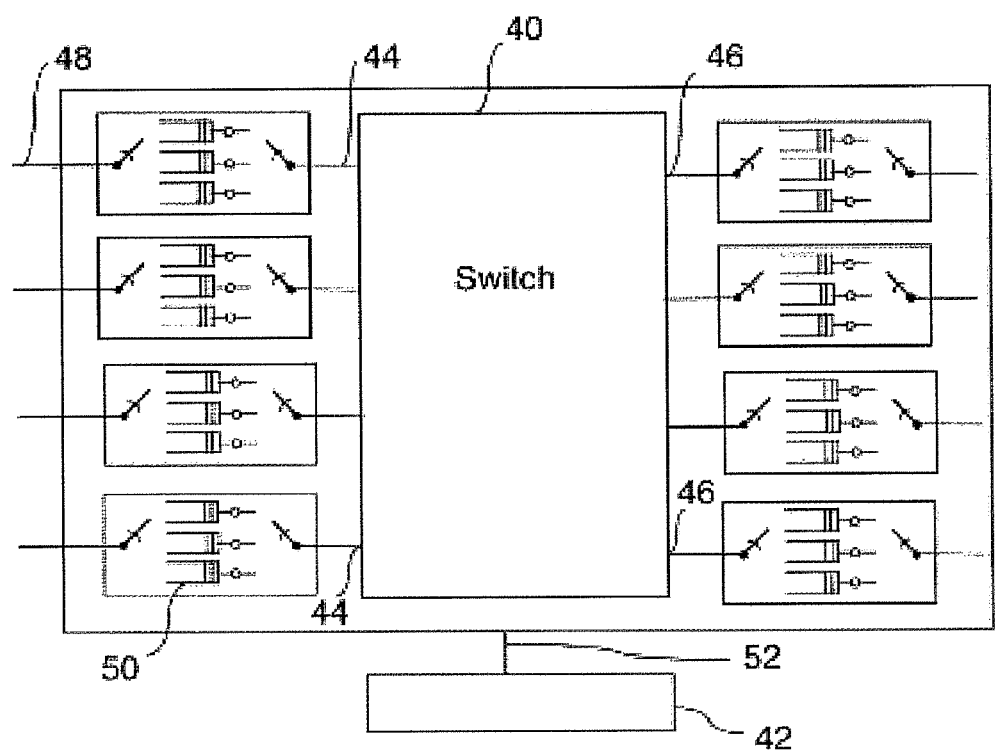
FIG. 1A shows an Input Queued switch with Virtual Output Queues at the input side of the switch, including the proposed Guaranteed Rate and Delay (GRD) scheduler implementing an exemplary embodiment of the present invention.

FIG. 1A shows a switch 40 having a proposed Guaranteed Rate and Delay (GRD) scheduler module 42 implementing an exemplary embodiment of the present invention. Switch 40 is an N×M input-output-buffered packet switch with N input ports 44 and M output ports 46. Typically N=M, although this equality is not necessary. Typically, variable size packets of data arrive on an incoming fibers 48. Each Input Port 44 is associated with multiple "Virtual Output Queues" (VOQ) 50, and at each input port one VOQ is associated with each output port. Typically, an arriving packet is fragmented into multiple fixed-size cells for transmission through the switch, and these cells are forwarded into the appropriate Virtual Output Queue 50, where they await transmission to the desired output port.

A Frame consists of multiple time-slots. In each time-slot, the GRD scheduler 42 matches each of output ports 46 to at most one of input ports 44. Switch 40 couples selected ones of input ports 44 to corresponding selected ones of output ports 46. Switch 40 couples input ports to output ports based on configuration control signals 52 from the GRD scheduler module 42. For the fraction of the input traffic that has guaranteed rate and delay requirements, the rates required for each input/output port pair are known from, for example, information provided from a provisioning database (not shown). Within a packet network, such as the Internet network, this rate information is supplied to switch 40 either through a bandwidth broker or through various signaling protocols, such as MPLS signaling or Differentiated Services signaling or Resource Reservation protocol (RSVP) signaling.

Referring to FIG. 1A, a crossbar switch 40 of size N×N has N input ports 44, which can be labeled with integers from $0 \leq j < N$, and N output ports 46, which can be labeled from $0 \leq k < N$. The integer labels are not shown in FIG. 1A.

Figure 1B:
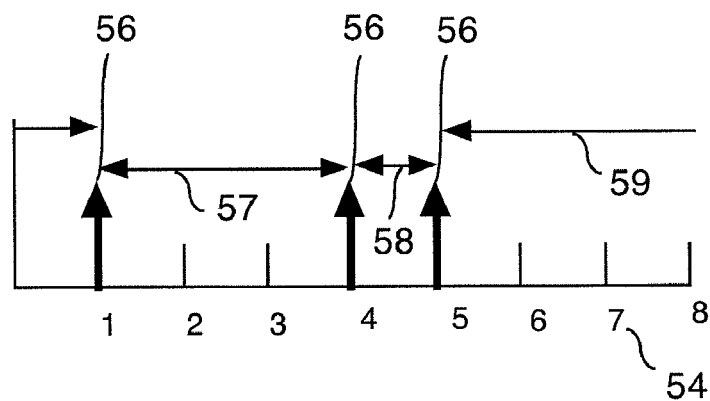
FIG. 1B shows the definition of an Inter-Departure Time.

FIG. 1B shows part of a Frame Schedule 54 with 8 time-slots, where 3 cells 56 are transmitted to a selected output port, in time-slots 1, 4 and 5. Define the traffic flowing between input port j and output port k of crossbar switch 40 as a flow(j,k). Let T(c) represent the time-slot in which cell(c) of flow(j,k) is transmitted. Define the 'Inter-Departure Time' (IDT) of cell(c) as the value T(c)−T(c−1), for $2 \leq c \leq 3$ in FIG. 1B. The IDT 57 of cell(2) 56 equals 3 time-slots. Define the Inter-Departure Time (IDT) 59 of the first cell 56 as the value T(1)+F−T(3). This IDT 59 represents the time-slots between the transmission of the last cell in the flow in one frame, and the transmission of the first cell in the flow in the next frame. The delay jitter can be defined as the variance of the inter-departures times of the cells in a flow. When a frame becomes very large, the IDTs can also become very large, and the delay jitter can become very large.

Figures 2A, 2B:
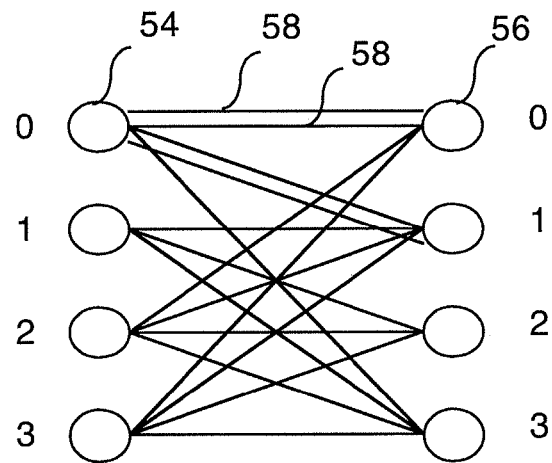
FIG. 2A shows a bipartite graph.
FIG. 2B shows a quantized traffic rate matrix.

FIG. 2A shows a prior art method for representing connections in a switch, based upon a bipartite multigraph. The input ports 44 of a switch are represented as vertices 54 in a first set. The output ports 46 of the switch are represented as vertices 56 in a second set. A request for S matches within one frame between one input port J and one output port K is represented by S edges 58 between the two vertices J and K.

FIG. 2B shows another prior art method for representing connections in a switch, which is equivalent to the prior art method in FIG. 2A. The input ports 44 of the switch are represented as rows of a quantized traffic rate matrix M 60. The output ports 46 of the switch are represented as columns of the same traffic rate matrix M. A request for S matches or connections within one frame between one input port J and one output port K is represented by assigning the value M(J, K)=S.

The guaranteed traffic requirements for an N×N switch can specified in a doubly substochastic traffic rate matrix R:

$$R = \begin{pmatrix} R_{0,0} & R_{0,1} & \cdots & R_{0,N-1} \\ R_{1,0} & R_{1,1} & \cdots & R_{1,N-1} \\ \cdots & & & \cdots \\ R_{N-1,0} & R_{N-1,1} & \cdots & R_{N-1,N-1} \end{pmatrix}, \begin{array}{l} \sum_{i=0}^{N-1} R_{i,j} \leq 1, \\ \sum_{j=0}^{N-1} R_{i,j} \leq 1 \end{array} \quad (8)$$

Consider an example with a 4×4 switch with a Frame with F=8 time-slots. The minimum allotment of guaranteed bandwidth is 1/F=⅛ or 12.5% of the line rate, which would reserve one time-slot per frame of 8 time-slots. Define a new quantized traffic rate matrix M where the traffic is expressed as an integer number of the minimum bandwidth allotment, or equivalently where the traffic requirements are expressed as an integer number of requested time-slots within a frame:

$$M = \begin{pmatrix} M_{0,0} & M_{0,1} & \cdots & M_{0,N-1} \\ M_{1,0} & M_{1,1} & \cdots & M_{1,N-1} \\ \cdots & & & \cdots \\ M_{N-1,0} & M_{N-1,1} & \cdots & M_{N-1,N-1} \end{pmatrix}, \begin{array}{l} \sum_{i=0}^{N-1} M_{i,j} \leq F = 8, \\ \sum_{j=0}^{N-1} M_{i,j} \leq F = 8 \end{array} \quad (9)$$

The decomposition and scheduling of a traffic rate matrix using the preferred embodiment is illustrated with the following 4×4 fully saturated (doubly stochastic) matrix, which was introduced in US Patent Application #20030227901:

$$R = \begin{bmatrix} 0.38 & 0 & 0.22 & 0.40 \\ 0.11 & 0.24 & 0.60 & 0.05 \\ 0 & 0.53 & 0.14 & 0.33 \\ 0.51 & 0.23 & 0.04 & 0.22 \end{bmatrix} \quad (10)$$

To schedule the switch 40 to realize the traffic requirements in matrix R with a frame with 32 time-slots, set the frame size parameter F to equal 32. Using F=32, a quantized rate matrix M which approximates the original matrix R can be determined. The quantized rate matrix M can be converted back to an un-quantized floating point format by computing matrix (M/F), to determine how closely it approximates the original matrix R. On possible quantized traffic rate matrix M and its approximation to the original matrix R above is shown below:

$$M = \begin{bmatrix} 12 & 0 & 8 & 12 \\ 4 & 8 & 18 & 2 \\ 0 & 17 & 4 & 11 \\ 16 & 7 & 2 & 7 \end{bmatrix}, M/F = \begin{bmatrix} 0.3750 & 0 & 0.2500 & 0.3750 \\ 0.1250 & 0.2500 & 0.5625 & 0.0625 \\ 0 & 0.5312 & 0.1250 & 0.3438 \\ 0.5000 & 0.2188 & 0.0625 & 0.2188 \end{bmatrix} \quad (11)$$

With F=32, the minimum allotment of guaranteed bandwidth is (1/32) of the line rate, or 0.03125 or 3.125 percent of the link capacity. Using the discrete quantized matrix M in equation (11), the traffic allocated between input-output ports (0,0) is 37.5% of the line rate, equivalent to 12 time-slots out of 32, while the requested traffic rate in matrix R is 38% of the line rate. The difference between the requested traffic rate and the allocated traffic rate is due to the quantization error, which can be reduced by selecting a larger value of parameter F.

To achieve a finer degree of resolution or control in the allocation of bandwidth, a service provider may find it desirable to allocate bandwidths in smaller increments, ie 1% of the link capacity. To achieve a 1% resolution, the frame size F should be $\geq 128$. Similarly, to allocate bandwidth in increments of 0.1% resolution, the frame size F should be $\geq 1024$.

Define an 'admissible' quantized traffic rate matrix M with parameter F as a matrix which satisfies these 3 constraints: Every element is a non-negative integer. The sum of each row must be $\leq F$, and the sum of each column must be $\leq F$. These constraints ensure than no input port transmits more than F cells per frame, and that no output port receives more than F cells per frame.

FIG. 3 shows a prior art 3-stage rearrangeable CLOS network 80 with size N×N. The network includes 3 stages of switches, labelled 82, 84 and 86. The switches in the first and third stages have size 8×8, and switches in the middle stage have size 4×4. Each stage of switches has a set of input pins 88 which can be labelled from 0 . . . N−1 and a set of output pins 90 which can be labelled from 0 . . . N−1. In FIG. 3, the input pins 88 in the first stage 82 are labeled with integers from 0 to 31, and the output pins 90 in the third stage 86 are labelled with integers from 0 to 31.

The Clos network has been used extensively in prior art Time-Slot-Assignment (TSA) algorithms. In the traditional TSA algorithm, consider a 4×4 crossbar switch 40 in FIG. 1, where each input port has $\leq 8$ packets destined for the output ports within each Frame. The transmission of $\leq 8$ packets from each input port 44 can be accomplished with a frame of 8 time-slots. The 3-stage Clos network in FIG. 3 can be used to model this prior art TSA problem. To compute a frame schedule of size F, the switches in the first and third stage have size F×F, where F=8 in this example. Let the switches in the first stage 82 be labeled with consecutive integers starting with 0 up until N−1 (these labels are not shown in FIG. 3). Let the switches in the third stage 86 be labeled with consecutive integers starting with 0 up until N−1 (not shown). Each switch with label j in the first stage 82 is associated with input port j of the crossbar switch 40 in FIG. 1. Each switch with label k in the third stage 86 is associated with output port k of crossbar switch 40. The switches in the middle stage 84 have size N×N, where N=4 in this example. The state of each switch in the middle stage 84 represents a permutation to be used to configure the N×N switch 40 for one time-slot of the frame schedule.

In the Internet Protocol, an IP packet may have a variable number of bytes. Crossbar switches are often configured to transfer a fixed number of bytes between input and output ports. The terminology 'packet' will refer to a variable size IP packet, while the terminology 'cell' will refer to a fixed sized cell, typically 64 bytes.

According to the prior art of Time-Slot-Assignment algorithms, a permutation which models the cells to be transmitted within a frame is created, subject to the following 2 constraints. Every cell to be transmitted from input port j of switch 40 is assigned to some input pin 88 associated with switch j in the first stage of switches 82. Every packet to be received by output port k of switch 40 is assigned to some output pin 90 associated with switch k in the third stage of switches 86.

This permutation is then routed through the 3-stage CLOS network, to yield a frame schedule. The permutations used in each of the F time-slots can be read directly from the states of the N×N crossbar switches in the middle stage 86 of the CLOS network. This prior art TSA algorithm is equivalent to finding a graph coloring of a bipartite graph.

Difficulty with Prior Time-Slot-Assignment Algorithms

There are several major difficulties with prior art Times-Slot-Assignment (TSA) algorithms. The first major difficulty is that existing TSA algorithms are complex and usually require back-tracking. In a back-tracking algorithm, a previously-made decision is often found to be incorrect, and all the work accomplished by the algorithm since the last incorrect decision must be undone and recomputed. This phenomina of undoing of previously computed work to undo a previously made incorrect decision is called backtracking. Any of the recomputed decisions may also be found to be incorrect in the future, causing more cases of backtracking. These complex algorithms are time consuming. Due to their complexity, existing TSA algorithms are considered too slow to be used in fast Internet-based packet switches.

The second major difficulty with existing TSA algorithms is that they operate on the 3 stage Clos network. This network has a tremendous number of discrete states, far more than necessary to compute a time slot assignment. The existence of these tremendous number of discrete states makes the algorithms to route permutations through the 3 stage Clos network very complex. The list of papers in the introduction dedicated to routing permutations through 3 stage networks attests to the difficulty.

The third major difficulty with existing TSA algorithms and graph coloring algorithms is that they do not address delay jitter. The prior art on TSA algorithms or graph coloring algorithms do not recognize or solve the problem of delay jitter minimization.

Referring to the Clos network FIG. 3, the case where input port 0 of crossbar switch 40 transmits 4 cells to output port 0 is shown by the 4 solid lines 92. The solid lines 92 pass through 3 consecutive switches in the middle stage 84. The state of each switch in the middle stage 84 represents one permutation used to configure the switch 40 for one time-slot within the frame. If the permutations are used linearly, from top to bottom, these 4 cells will be transmitted consecutively in time-slots 1, 2, 3 and 4 within a frame of F time-slots, and the delay jitter will be large. The IDT for cells 2, 3 and 4 will be 1 time-slot, whereas the IDT for cell 1 will be 5 time-slots. Consider a Clos network, and a flow(j,k) with S cells of service. In the worst-case, all S cells will be transmitted in consecutive permutations in a frame. The worst-case IDT is therefore F-S time-slots. For large F, this worst-case IDT of a 3 stage Clos network can be quite large. This author is not aware of any paper in the prior art that has discussed methods to rearrange the permutations read from the middle stage 84 of the Clos network in order to minimize the delay jitter. It is not clear that rearranging the permutations would be feasible, given the large number of permutations and large number of bandwidth constraints to consider.

The Perfect Shuffle Permutation

FIG. 4 illustrates a prior art Benes network. The network includes 3 stages of switches labeled 82, 84, 86. The switches in the first stage 82 and the $3^{rd}$ stage 86 have size 2×2. Switches with size 2×2 will also be called Binary switches. The switches in the second stage 84 have size (N/2)×(N/2). A permutation of wires 94 connects the output pins 90 of the first stage switches 82 to the input pins 88 of the second stage of switches 84. In FIG. 4, the permutation of wires 94 between the first and second stages is called a Perfect-Shuffle permutation. The inverse of this permutation (equivalent to the mapping from input pins 88 of stage 2 back onto output pins 90 of stage 1) is called the inverse Perfect Shuffle permutation. The output pins 90 on the first stage of switches 82 can be viewed as forming 2 halves of a deck of cards, and these pins are connected to the input pin 88 of the second stage of switches 84 as if a perfect shuffle of the deck of cards has occurred. The switches 84 in the middle stage of FIG. 4 can be constructed recursively using a smaller instance of the same topology shown in FIG. 4. The resulting network is called the binary Benes network, and it will have $2*\log_2 N-1$ stages of binary switches, where $\log_2 N$ is the logarithm of N with respect to base 2, and where N is a power of 2.

The perfect shuffle permutation can be generalized to higher radices. The Perfect Shuffle permutation in FIG. 4 can be called the radix-2 Perfect Shuffle. A binary number in the range 0 ... N−1 can be represented with n binary bits, $b_{n-1} b_{n-1} \ldots b_1 b$, where $n=\log_2 N$. The radix-2 perfect shuffle is given by the mapping $$P(b_{n-1} b_{n-2} \ldots b_1 b_0) = b_0 b_{n-1} b_{n-2} \ldots b_1. \quad (12)$$

For example, the perfect shuffle permutation of the sequence (0 1 2 3 4 5 6 7) maps onto the sequence (0 4 1 5 2 6 3 7). If we view the sequence (0, 1, 2, 3) as one half of a deck of cards, and the sequence (4, 5, 6, 7) as the other half of the deck of cards, the perfect shuffle permutation interleaves the two sequences perfectly to yield (0 4 1 5 2 6 3 7). The inverse Perfect Shuffle permutation is given by the mapping $$P(b_{n-1} b_{n-2} \ldots b_1 b_0) = b_{n-2} b_{n-3} \ldots b_1 b_0 b_{n-1} \quad (13)$$

Using the inverse perfect shuffle, the sequence (0 1 2 3 4 5 6 7) maps onto the sequence (0 2 4 6 1 3 5 7). The perfect shuffle can be generalized to larger radices. The radix-4 perfect shuffle is given by the mapping $$P(b_{n-1} b_{n-2} b_{n-3} \ldots b_2 b_0 b_{n-1} b_{n-2} b_{n-3} \ldots b_2. \quad (14)$$

since the pair of bits $b_1 b_0$, can be viewed as a single digit in base 4.

A permutation can be defined as a mapping of integers in a first set in the range 0 ... N−1 for some N, onto the integers in a second set in the range 0 ... N−1, such that each integer is matched with only one other integer. A permutation element can be defined as the mapping or matching of one integer in the first set onto one integer in the second set. A permutation element can be represented by a pair of integers, or by one integer from either set since the other member of the matching is uniquely determined. A permutation can be represented as an N×N matrix with entries 0 s and 1's as discussed earlier, or by a vector of N elements. A partial permutation allows some integer in the first set to remain idle, without mapping onto an integer in the second set. Therefore, some elements of the second set will also remain unmatched. To denote an idle integer in the first set, it can map onto the NULL symbol, which typically is −1. In this document, the term 'permutation' will refer to both complete permutations and partial permutations. An inverse permutation illustrates the matching between integers in the second set onto integers in the first set. A partial permutation must have a partial inverse permutation.

Proposed Multistage Networks for Time-Slot-Assignment

Figure 5:
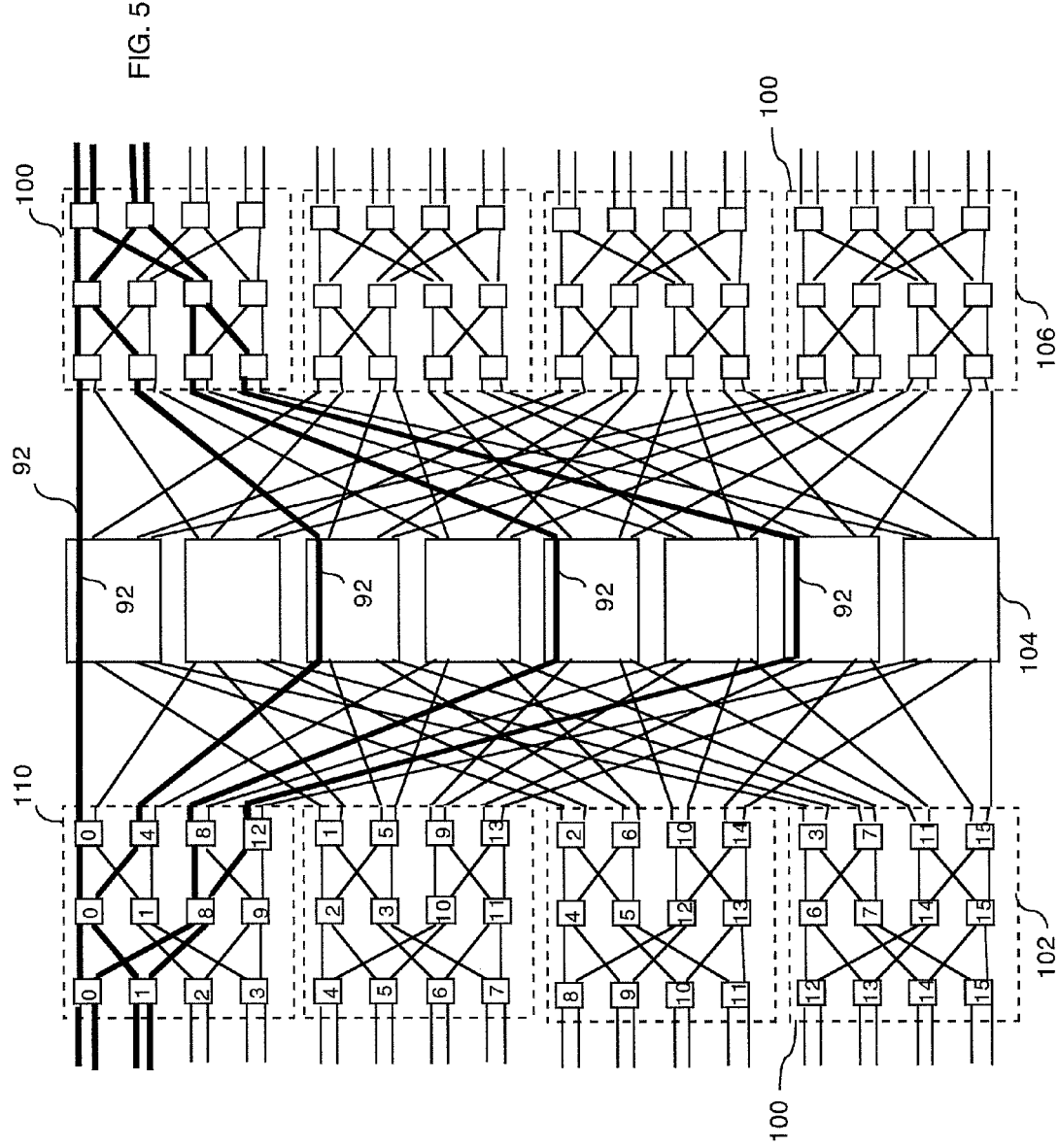
FIG. 5 shows a multistage network derived from a 3-stage Clos network, in which the switches in the first and third stages have been replaced by sub-networks composed of binary (2×2) switches.

FIG. 5 illustrates another multistage network which has been derived from the 3-stage Clos network of FIG. 3. The switches in the first stage 82 of FIG. 3 have been replaced by a subnetwork constructed with binary switches, which are delineated by dotted lines 100. There are 3 stages in FIG. 5, labeled 102, 104 and 106. The first stage 102 consists of subnetworks 100 which have size 8×8. The third stage 106 consists of subnetworks 100 which have size 8×8. The middle stage 104 consists of crossbar switches of size 4×4. In general, each crossbar switch of size K×K in a stage of a 3-stage CLOS network in FIG. 3 can be replaced by a sub-network of binary switches, where the sub-network has size K×K, yielding a binary multistage network.

The routing of the partial permutation (0, 1, 2, 3, −1, ..., −1) onto (0, 1, 2, 3, −1, ..., −1) in a 3 stage Clos network was shown by the 4 bold lines 92 in FIG. 3. The symbols −1 denote an idle input pin or an idle output pin. The routing of the same partial permutation (0, 1, 2, 3, −1, ..., −1) onto (0, 1, 2, 3, −1, ..., −1) on the network in FIG. 5 will result in much less delay jitter. In FIG. 5, the routes taken by the first 4 elements of the permutation are illustrated by the 4 bold lines 92 through the center stage of switches 104. The routes are relatively evenly distributed over the 4×4 switches in the middle stage 104. The 4 cell reservations between Input port 0 and Output port 0 corresponding to these bold lines will occur in time-slots 1, 3, 5 and 7. The inter-departure times for cells 1, 2, 3, 4 will be 2 time-slots. The average inter-departure time is 2 time-slots. The ideal Inter-departure time (denoted as IDDT) of the 4 cells in a frame of 8 time-slots is given by 8/2=2 time-slots per cell. The use of this topology in FIG. 5 to route the partial permutation results in a relatively even distribution of cells in each half of the frame schedule, which will reduce the delay jitter.

Figure 6:
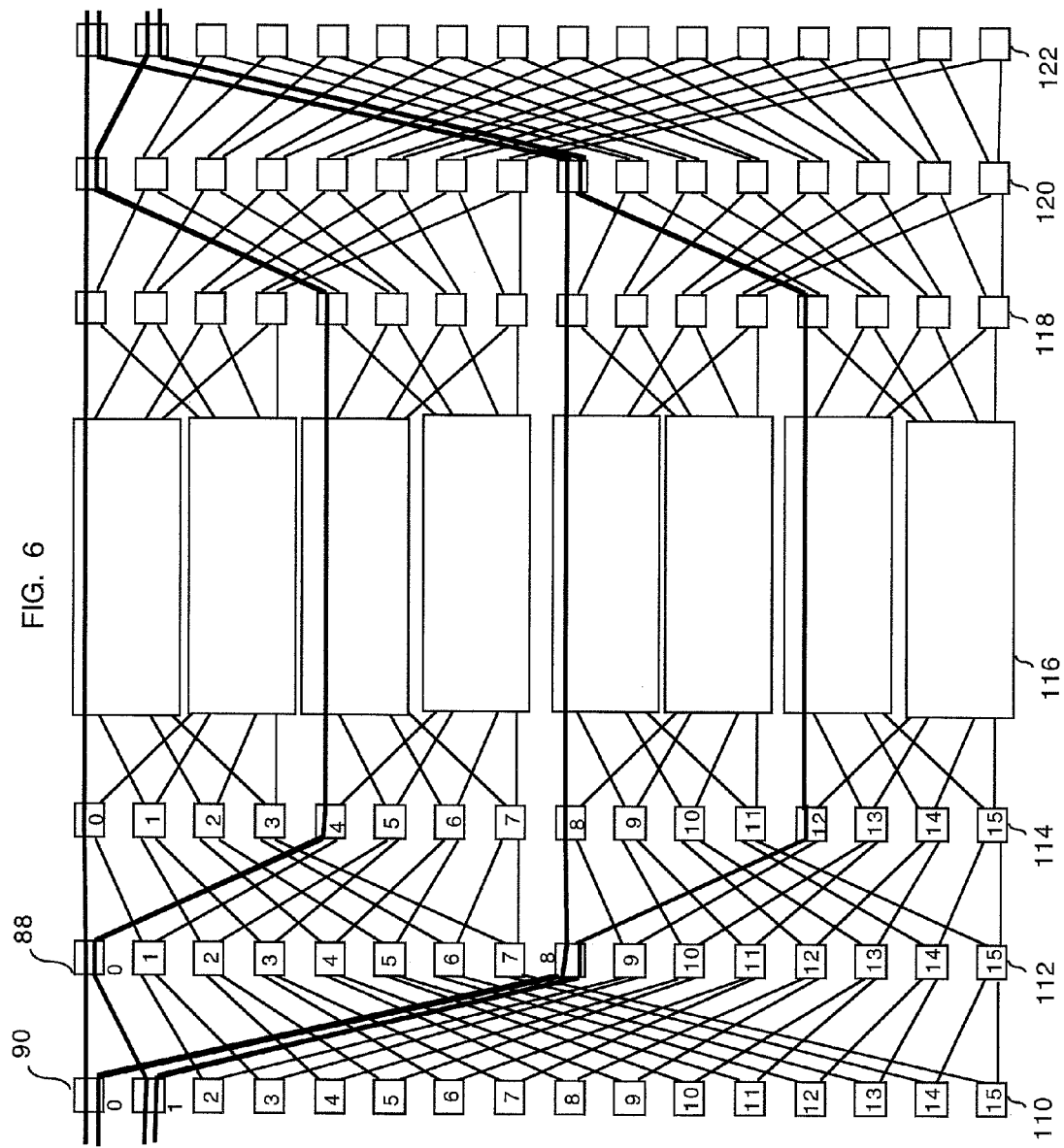
FIG. 6 shows a 7-stage network, where the switches in the middle stage have size 4×4, while the remaining stages have binary switches. When the middle stage switches are realized with subnetworks of 2×2 switches, the resulting topology is the Benes network.

FIG. 6 illustrates another multistage network based on the Benes network of FIG. 5. The network includes 7 stages labelled 110, 112, 114, 116, 118, 120 and 122. The switches in the middle stage 116 have size 4×4, but these can also be replaced by subnetworks of binary switches, using the Benes topology of FIG. 4. The switches in the first 3 stages 110, 112 and 114 are binary. The switches in the last 3 stages 118, 120 and 122 are binary. This network can be obtained from the network in FIG. 5 by a topological transformation, equivalent to moving the binary switches around relative to each other, until the topologies are equivalent when drawn on paper. Not all multistage networks are topologically equivalent. However, the topology in FIG. 5, when extended to larger N, is topologically equivalent to the topology in FIG. 6, when extended to large N.

To see the topological equivalence, the binary switches in the first 3 stages 110, 112 and 114 of FIG. 6 have been labeled with integers 0 ... 15, from top to bottom. The switches in the first 3 stages 107, 108 and 109 of binary switches in FIG. 5 have also been labeled to illustrate how the binary switches in FIG. 6 can be rearranged to yield the topology of FIG. 5. Referring to the first stage of subnetworks 102 in FIG. 5, the labels of binary switches in the third stage 109 of binary switches are given by the radix 4 perfect shuffle. The sequence of binary switches in stage 114 of the network in FIG. 6, read from top to bottom, is (0 1 2 3, 4 5 6 7, 8 9 10 11, 12 13 14 15). The sequence of binary switches in stage 109 of FIG. 5 is the sequence (0 4 8 12, 1 5 9 13, 2 6 10 14, 3 7 11 15), which is the radix 4 perfect shuffle of the original sequence.

The proposed GRD scheduling method will use binary networks based upon the topology of FIG. 6 for routing permutations, extended to larger N. This topology is equivalent to the topology in FIG. 5. However, there many other topologically similar binary networks that can also be used. The main requirements of a binary topology to be used are the following. The first requirement is that for every binary switch in the first stage of binary switches, one output pin 90 leads to the upper half of input pins 88 in the second stage of binary switches, and one output pin 90 leads to the lower half of input pins 88 in the second stage of binary switches. A wire from a first stage binary switch to either half of the input pins of the second stage can select any input pin in that half, not necessarily the pin given by the Perfect Shuffle permutation. A similar constraint applies to the permutation of wires linking the input pins of the last stage to the output pins of the second last stage. Similar constraints exist for the binary switches as we move inwards from the first and last stages. These constraints ensure that the resulting network is 'rearrangeable'. A rearrangeable network is one where a connection between an idle input and an idle output can always be established, with the condition that previously routed connections may have to be moved or rearranged.

The rearrangeable binary multistage networks in FIG. 5 and FIG. 6 are not functionally equivalent to the CLOS network in FIG. 3. It is useful to compare the number of discrete states achievable in each network. Define a state of a crossbar switch as a distinct permutation of its inputs onto its outputs. Consider the Clos network in FIG. 3. Each 8×8 switch in the first and third stages 82 and 86 has a number of discrete states equal to factorial(8)=40,320, and there are 4 such switches in each of the first and third stages. Each 4×4 switch in the middle stage 84 has a number of discrete states equal to factorial(4)=24, and there are 8 such switches in the middle stage. The number of discrete states allowed in the Clos network is approx. $((8!)^8)*((4!)^8)=6.98*10^{36}$. The Clos network in FIG. 3 has an enormous number of distinct discrete states (or distinct settings of the switches).

Consider the binary networks in FIG. 5. Each subnetwork of size 8×8 has 12 binary switches. The number of states in each 8×8 subnetwork is therefore $2^{12}=4,096$, compared to 8! for a 8×8 crossbar switch. However, once the state of a binary switch in a subnetwork 100 in the first stage 102 is confirmed, the state of one binary switch in a subnetwork 100 in the third stage 106 also becomes fixed. (This phenomina is a consequence for the prior art routing algorithms for binary rearrangeable networks.) The number of discrete states allowed in the multistage network in FIG. 5, and by topological equivalence to the topology in FIG. 6, is therefore $((2^{12})^4)*((4!)^8)=2.8*10^{14}$.

The use of the binary multistage networks in FIG. 5 and FIG. 6 has reduced the number of discrete states to consider when routing a permutation by a factor of approx. $10^{22}$ for this example. The number $10^{22}$ is exceedingly large, greater than one billion squared. The reduced number of states to consider by any algorithm which routes permutations using the binary topology should considerably improve the efficiency of the algorithm.

The proposed GRD scheduling method will differ from the prior art TSAs in several methods. First, several methods for generating the permutations to be routed will be discussed. These methods affect the delay jitter of the resulting frame schedule. One can adjust the delay jitter by manipulating the permutations to be routed. Second, the permutations will be routed in multistage network consisting of sub-networks of binary switches as shown in FIGS. 5 and 6, (and generalized to larger sizes), instead of a 3-stage Clos network. This multistage network exploits the Perfect Shuffle permutation.

The use of the Perfect Shuffle permutation is one of the key advantages of using the topologies in FIG. 5 and FIG. 6. Prior art Time-Slot-Assignment algorithms do not exploit the use of the perfect shuffle permutation or the use of binary switches. In FIG. 6, contiguous sequences of permutation elements (cell reservation requests) appearing at the output pins 90 the first stage of switches 110 are split 'relatively fairly' onto the upper and lower halves of the input pins 88 in the second stage of switches 112 by the perfect shuffle permutation, and this splitting occurs recursively. In the worst case, given a contiguous sequence of z permutation elements where z is even, these elements will be split relatively fairly, with z/2−1 elements going to one half of the input pins in the next stage, and z/2+1 elements going to the other half of the input pins in the next stage. For example, the worst-case splitting of 90 consecutive permutation elements is (44 and 46). Therefore, one half of a frame may contain 44 cell transmission requests, while the other half may contain 46 cell transmission requests. This recursive fair splitting will result in relatively even distribution of cell transmission times over the middle stage of switches 116, which will result in a low jitter of cell transmission times within a frame schedule.

Furthermore, the use of multistage networks of binary switches will remove the need for any backtracking at all, making the routing algorithm very fast and efficient. The reduced number of states to consider should also dramatically improve the efficiency of the algorithm. Prior art routing algorithms for routing permutations in binary rearrangeable are well known. The looping algorithm is described in the paper by S. Andresen referenced earlier. The looping algorithm is more efficient that prior art algorithms for routing permutations in 3-stage Clos networks. One of the contributions in this document is establishing that a routing of a permutation through a 3 stage Clos network can be achieved by routing a permutation through a binary rearrangeable network. Third, mapping of a traffic rate matrix M onto a permutation will be performed so that the delay jitter will be minimized. To minimize the delay jitter, all the reservation requests belonging to one flow should appear at consecutive elements in the permutation, so that the Perfect Shuffle permutation will partition these elements relatively fairly. (The delay jitter could also be maximized by manipulating the permutation so that permutation elements associated with one flow appear in non-continuous locations of the permutation, or by manipulating the binary multistage network.) The combination of (a) methods to generate permutations to ensure low jitter, (b) the method of selecting a binary network which will enforce a low delay jitter, (c) the method to route permutations in binary networks without backtracking, and (d) the method to recover the states of a 3-stage Clos network, all yield a very efficient and effective scheduling algorithm.

Sub-Optimal Greedy Recursive Fair Matrix Decomposition

Figure 7:
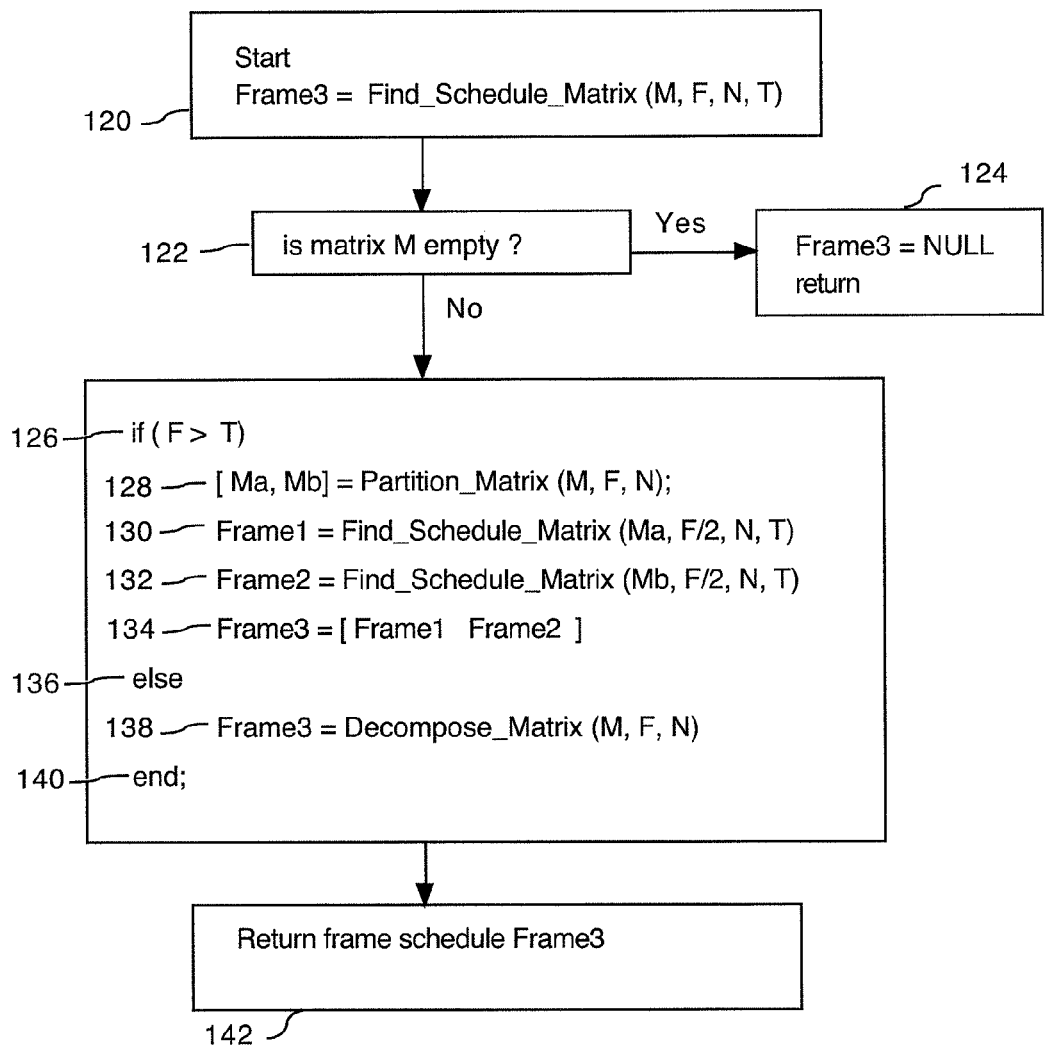
FIG. 7 shows a sub-optimal greedy recursive fair method called "Find_Schedule_Matrix", for computing a relatively low-jitter Frame Schedule given a quantized traffic rate matrix.
Figure 8A:
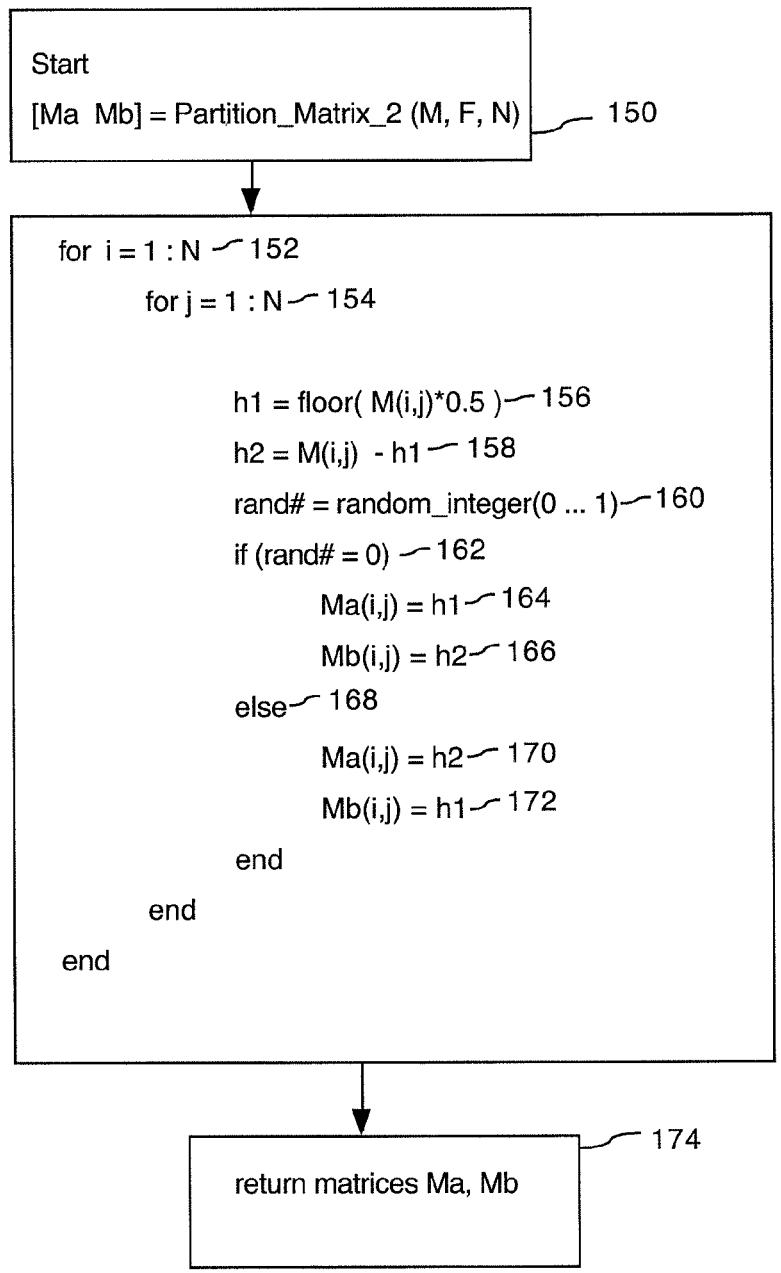
FIG. 8A shows a sub-optimal greedy method called 'Partition_Matrix 2', to partition one quantized traffic rate matrix relatively fairly into 2 traffic rate matrices, each with approximately half of the traffic rate requests of the original matrix.
Figure 8B:
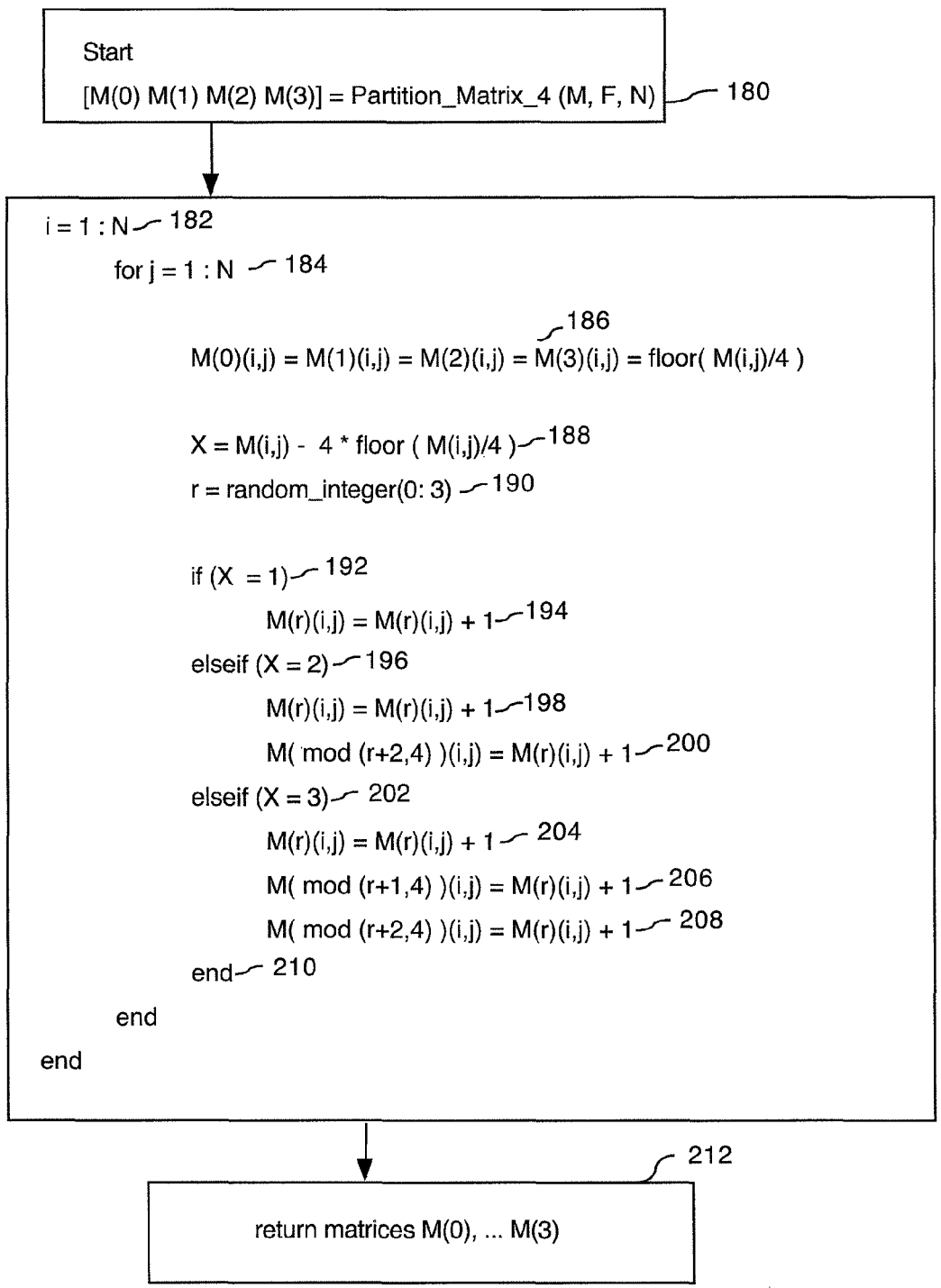
FIG. 8B shows a sub-optimal greedy method called 'Partition_Matrix_4', to partition one quantized traffic rate matrix relatively fairly into 4 traffic rate matrices, each with approximately one quarter of the traffic rate requests of the original matrix.
Figure 9:
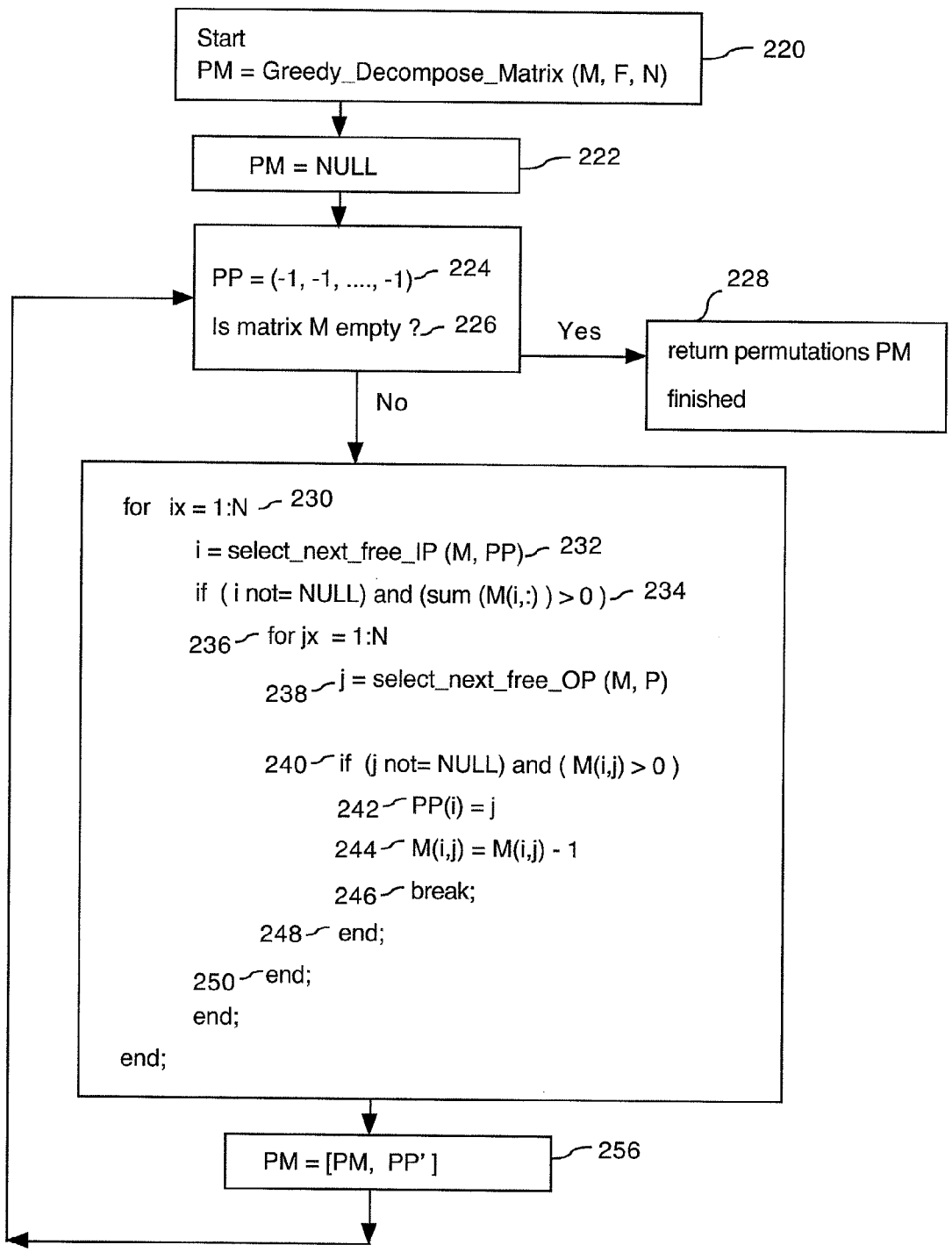
FIG. 9 shows a sub-optimal greedy method called 'Decompose_Matrix', to decompose a quantized traffic rate matrix into a sequence of permutation matrices. This decomposition method differs from the prior art in that it computes a sequence of permutation matrices directly, rather than a convex combination of permutation matrices and their weights which must be scheduled in the prior art.

FIGS. 7, 8 and 9 illustrate 3 methods related to a sub-optimal greedy stochastic matrix decomposition. The methods in FIGS. 7, 8 and are suboptimal but they recursive, fair and relatively fast. They differ from the prior art in that these methods decompose a quantized traffic rate matrix directly into a sequence of permutation matrices which form a frame schedule. A matrix is not decomposed into a convex combination of permutations and weights which must be separately scheduled, as done in the prior art BV and related decompositions shown in equations (2), (5), (6) and (7). No separate scheduling method is required to schedule permutations, since the scheduling is inherent in the relatively fair decomposition.

For comparison purposes, FIGS. 10, 11 and 12 illustrate the proposed optimal stochastic matrix decomposition method, which transforms the matrix to be decomposed into a permutation and routes the permutation through a multi-stage rearrangeable network.

FIG. 7 shows a method called "Find_Schedule_Matrix" 120, for determining a Frame Schedule given an admissible quantized traffic rate matrix M. The method operates on data M, F and N, where M is an N×N quantized traffic rate matrix, F is the desired Frame size. Line 126 tests the frame size parameter F against T, where T is the termination criterion. If F>T, then the method proceeds to line 128, where the method 'Partition_Matrix_2'' is invoked; This method partitions matrix M with desired frame size F, into two matrices Ma and Mb each with desired frame size F/2. Upon this partitioning, each matrix Ma and Mb might be schedulable in a frame of size F/2. However, if the partitioning is non-ideal, the sum of the elements of one matrix may be slightly larger than the sum of the elements of the other and either matrix may also be inadmissible, ie the sum of any row or column may exceed F/2. If either matrix Ma or Mb is inadmissible, it can still be scheduled, but the frame size will be larger than F/2. Line 130 invokes the same method to schedule the matrix Ma preferably in a frame of size F/2. Line 130 returns the sequence of permutations in the resulting frame schedule in the matrix Frame1. Every column in the matrix represents a permutation used in one time-slot. Line 132 invokes the same method to schedule the matrix Mb preferably in a frame of size F/2. Line 132 returns the sequence of permutation vectors in the resulting frame schedule in the matrix Frame2. Line 134 concatenates the permutation sequences from Frame1 and Frame2 to form one larger sequence Frame3, which is the frame schedule for matrix M in a frame of desired size F. The sequence Frame3 is returned in line 142.

If the test in line 126 is false, then the termination criterion has been reached. Line 138 invokes method Decompose_Matrix, which will decompose the matrix M into permutations and return the list of permutations in the frame schedule in matrix Frame3. In Line 142, the frame schedule Frame3 corresponding to a list of permutations associated with the decomposition of matrix M is returned.

FIG. 8A shows a sub-optimal greedy method called "Partition_Matrix_2', for partitioning a quantized traffic rate matrix M with desired frame size F, into 2 quantized traffic rate matrices Ma and Mb, each with substantially half the traffic rate requests of the original matrix, each with desired frame size F/2. In an ideal and fair partitioning of an admissible matrix M, the sum of the elements of each matrix Ma and Mb will be substantially equal, and matrices Ma and Mb will be admissible given a frame size of F/2. However, an ideal partitioning can be extremely difficult to compute for large doubly stochastic matrices. The method in FIG. 8A is a greedy method which is unlikely to achieve an optimal partitioning. The use of a sub-optimal method will require some speedup in the switch to meet the traffic requirements, which is undesirable. Nevertheless, the method is extremely fast.

Line 152 forms a first loop which visits every row i in matrix M. Line 154 forms a second loop which visits every column j in matrix M. The element M(i,j) represents the number of match requests between input port 'i' and output port 'j' to be partitioned into 2 matrices. If M(i,j) is even, then each matrix Ma and Mb can be assigned exact M(i,j)/2 match requests and the partitioning of this element will be perfectly fair. The variable h1 in line 156 will equal the variable h2 in line 158, which are assigned to matrices Ma and Mb in the next few lines. However, if M(i,j) is odd then the partitioning will be relatively fair: One matrix will receive a smaller amount h1=floor(M(i,j)*0.5) requests, and the other matrix will receive the remaining matrix element requests h2, where h2=h1=1. In line 160 a random integer either 0 or 1 is determined. In line 162, if the random integer=0, then h1 requests are assigned to the appropriate element of matrix Ma in line 164, and Mb receives the remaining h2 requests in line 166. In line 160, if the random integer=1, then h2 requests are assigned to the appropriate element of matrix Ma, and Mb receives the remaining h1 requests. The greedy method in FIG. 8A can easily be improved, however it will still remain suboptimal. For example, when a matrix element M(i,j) is partitioned and allocated to Ma and Mb, the matrix Ma or Mb with the largest sum of elements could receive the value h1=floor(M(i,j)*0.5), and the other matrix could receive the remaining amount h2.

FIG. 8B shows a greedy suboptimal recursive fair method called "Partition_Matrix 4', for partitioning a quantized traffic rate matrix M with desired frame size F, into 4 traffic rate matrices M(0) . . . M(3), each with substantially one quarter of the traffic rate requests of the original matrix M and each with desired frame size F/4. In an ideal fair partitioning, the sum of the elements of each matrix M(0), M(1), M(2) and M(3) will be substantially equal, and the matrices will be admissible, ie all row and columns sums will be <=F/4. However, an ideal partitioning can be extremely difficult to compute for large doubly stochastic matrices. The use of a sub-optimal method will require some speedup in the switch to meet the requirements, which is undesirable. Nevertheless, the method is very fast.

Line 182 forms a first loop which visits every row i in matrix M. Line 184 forms a second loop which visits every column j in matrix M. The element M(i,j) represents the number of match requests to be partitioned into 4 matrices. In line 186, each of the 4 matrices receives floor(M(i,j)/4)) match requests. In Line 188, the number of remaining match requests is assigned to variable X, ie X==M(i,j)−4*floor(M(i,j)/4) is determined. These remaining match requests must be assigned to the 4 matrices. Line 190 selects a random integer r between 0 and 3 inclusive. If X==1, then the one remaining match request to be allocated is assigned to the appropriate element of matrix M(r) in line 194. If X==2, then the two remaining match requests to be allocated are assigned to the appropriate elements of matrices M(r) and M((r+2) modulo 4), in lines 198 and 200. This partitioning is fair, in that the service for element M(i,j) is relatively fairly distributed over the 4 matrices being generated; the service is not concentrated in consecutive matrices. If X==3, then the three remaining match requests to be allocated are assigned to the appropriate elements of 3 matrices M(r), M((r+1) modulo 4), and M((r+2) modulo 4), in lines 204, 206 and 208. This partitioning is relatively fair, in that the service for element M(i,j) is relatively fairly distributed over the 4 matrices being generated.

The method Partition_Matrix_4 in FIG. 8B can be extended to partition a matrix M into more than 4 matrices, for example matrix M can be partitioned into 16 matrices. Furthermore, one may assign the remaining traffic rate requests in variable X to the 16 matrices in a relatively fair manner. If an input port/output port pair (i,j) requests 3 time slots ie M(i,j), these 3 requests can be partitioned by assigning one request to each of matrices M(0), M(5) and M(10) to achieve a relatively balanced time interval between them. Alternatively, these 3 requests can be partitioned by assigning one request to each of matrices M(1), M(6) and M(11) to achieve a relatively balanced time interval between them. Given a random integer r between 0 and 15 inclusive, these 3 requests can be partitioned by assigning one request to each of matrices M(r), M((r+5) mod 16) and M((r+10) mod 16) to achieve a relatively balanced and fair time interval between them.

FIG. 9 shows a sub-optimal and greedy method 'Decompose_Matrix', which decomposes a quantized traffic rate matrix into a sequence of permutations which form a subframe. This method represents permutations as vectors rather than matrices, to reduce the amount of memory to return, although matrices can also be used. Line 222 initializes the subframe PM to the empty set. Line 224 initializes the variable PP representing a partial or full permutation to the idle symbols (−1). Line 226 tests to see if the traffic rate matrix is non-empty before proceeding to the main body of the method. Line 230 forms a first loop, which will visit every unmatched input port. In line 232, the order in which unmatched input ports are visited is determined by the method 'select_next_free IP(M,PP)', which examines the traffic rate matrix M and partially established permutation vector PP, and selects an appropriate unmatched input port for processing. There are several greedy heuristics which can be used to select such an input port, including randomly selecting such an input port from the idle input ports, or by selecting the input port with the smallest row sum. Line 234 tests to see if the input port is valid (ie not equal to −1) and if it has any match requests to any output ports, equivalent to the condition that the sum of row i of the matrix M is greater than 0. (Matlab notation is used, where M(i,:) represents the sum of all elements in row i of matrix M). If the test is true, the method proceeds to line 236.

Line 236 forms a second loop, which will visit every unmatched output port. The order in which unmatched output ports are visited is determined by line 238, which invokes a function 'select_next_free_OP(M,PP)'. This function considers matrices M and PP and determines a suitable unmatched output port for matching. Line 240 tests to see if the currently selected unmatched input port i and output port j can be matched, equivalent to the condition that matrix element M(i,j)>0. If this test is true, then in line 242 input port 'i' is matched to output port 'j' in the partial permutation vector PP, and in line 244 one match request is removed from the corresponding matrix element M(i,j). Having made the match between an input port and output port, the inner loop can be exitted, which is accomplished with the 'break' command in line 246. This will cause the outer loop 230 to proceed. If there are no more unmatched input ports, line 232 returns '−1' (a NULL value), which is detected and causes the outer loop to take no action. In Line 256, the permutation vector PP is made into a column vector (with the transpose operator'), and the column vector is concatenated to the end of the subframe PM. The mathematical notation used in the MATLAB programming language used in line 256.

FIG. 10 shows results for the sub-optimal greedy methods in FIGS. 7, 8 and 9 respectively. Matrix 280 is a quantized 4×4 traffic rate matrix with parameter F=16. Matrix 280 with desired frame size F=16 is partitioned into 2 matrices 282 and 284, each with desired frame size F=8, using the method in FIG. 7. Each of these matrices is further partitioned, resulting in 4 matrices 286, 288, 290 and 292, each with desired frame size F=4. The value F=4 denotes the termination of the recursion T in this example, and each of the matrices are then decomposed using the method Decompose_Matrix in FIG. 8. The switch permutation configurations are returned as permutation vectors in column format (with 4×1 elements), rather than permutation matrices (with 4×4=16 elements), to reduce the size of data to present. In the Frame Schedule Frame3 294, the first 5 columns starting at column 296 are the permutation vectors associated with the decomposition of matrix 286. The next 5 columns starting at column 298 are permutation vectors associated with the decomposition of matrix 288. The next 5 columns starting at column 300 are the permutation vectors associated with the decomposition of matrix 290. The final 4 columns starting at column 302 are the permutation vectors associated with the decomposition of matrix 292.

The overall the method Find_Schedule_Matrix in FIG. 7 is relatively fair, due to the fact that the initial traffic rate matrix M is recursively partitioned, relatively fairly into many matrices, before these many matrices are decomposed into permutations. However, the method is sub-optimal and the drawbacks of this method are illustrated in FIG. 10. The matrix requires 19 time-slots to achieve the required traffic, while an optimal solution will meet the requirements in 16 time-slots. (The quantized traffic matrix is admissible with parameter F=16, indicating that it can be scheduled in 16 time-slots in an optimal frame schedule.) The speedup=19/16=1.19. In this simple example, the capacity of the switch must be increased by 19% to accommodate the imperfections of this frame schedule. A larger quantized traffic rate matrix with larger entries will have more levels of recursion, where each level introduces sub-optimal partitions, and will likely have a larger speedup requirement.

Optimal Recursive Fair Stochastic Matrix Decomposition

It is desirable to find an ideal and fair method to decompose a quantized admissible traffic rate matrix M with a optimal frame size of F ideally into two quantized admissible matrices Ma and Mb each with an optimal frame size of F/2. Furthermore, it is desirable to find an optimal method to decompose a quantized admissible traffic matrix M into a series of permutations to configure the switch, in a 'fair' manner such that the matches between an input port-output port pair (IP,OP) are relatively evenly distributed over the time-slots in the frame. The remainder of this application will describe an exemplary method for the optimal and relatively fair partitioning of a matrix M into two matrix Ma and Mb, and an exemplary method for the optimal relatively fair decomposition of a matrix into permutations. These methods are called optimal because they do not introduce any speedup.

FIG. 11 illustrates the results of the methods to be proposed. Matrix 280 is a quantized 4×4 traffic rate matrix with parameter F=16. Matrix 280 with frame size F=16 is optimally partitioned into 2 matrices 283 and 285, each with frame size F=8, using the method in FIG. 12 (to be discussed). Each of these matrices is further partitioned, resulting in 4 matrices 287, 289, 291 and 293, each with frame size F=4. T. Each of these matrices is further decomposed to yield the permutations. The switch permutations are returned as permutation vectors in column format (a column with 4 elements), to reduce the size of data to present. In matrix Frame3 295, the 4 columns starting at column 297 are the permutation vectors associated with the optimal decomposition of matrix 287. The next 4 columns starting at column 299 are permutation vectors associated with the optimal decomposition of matrix 289. The next 4 columns starting at column 301 are permutation vectors associated with the decomposition of matrix 291. The final 4 columns starting at column 303 are permutation vectors associated with the decomposition of matrix 293. This optimal decomposition meets the traffic requirements in the quantized traffic rate matrix, in a frame size of 16. No speedup is required, and the throughput of the switch is essentially 100%.

FIG. 12A illustrates the exemplary method Compute_Frame_Schedule. The method accepts parameters N and F, and a quantized traffic rate matrix M, and returns a frame schedule Frame3. A permutation P is initialized in one of lines 342, 346 or 348. Only one of these three lines is invoked. The preferred method in line 346. In line 350, the method Find_Schedule_Permutation is invoked.

FIG. 12B illustrates an exemplary method Find_Schedule_Permutation 354, which will process a permutation P representing an admissible traffic rate matrix with frame size F to be scheduled. Line 356 tests to see if the length of the permutation is >N, where N is the termination criterion, equal to the switch size N. If the length is >N, then in line 358 the permutation P is partitioned into two admissible permutations Pa and Pb given parameter F/2. Each permutation Pa and Pb represents an admissible traffic rate matrix with frame size F/2. In lines 360 and 362, the same method is invoked recursively on the permutations Pa and Pb. Each invocation returns a list of permutation vectors Frame1 and Frame2, which represent the optimal scheduling of the traffic rate matrices represented by permutations Pa and Pb in frames of size F/2. These two lists of permutations are concatenation to form one larger Frame called Frame3 with F permutations in line 364. Line 366 is invoked if the length of P equals N, which indicates that the termination criterion has been reached. The permutation P is the single permutation to schedule in a frame of size 1, and hence in line 368 the variable Frame2 is assigned the column vector P. In line 372 the list of permutations PM corresponding to the schedule of matrix M is returned, and the method ends.

Figure 13:
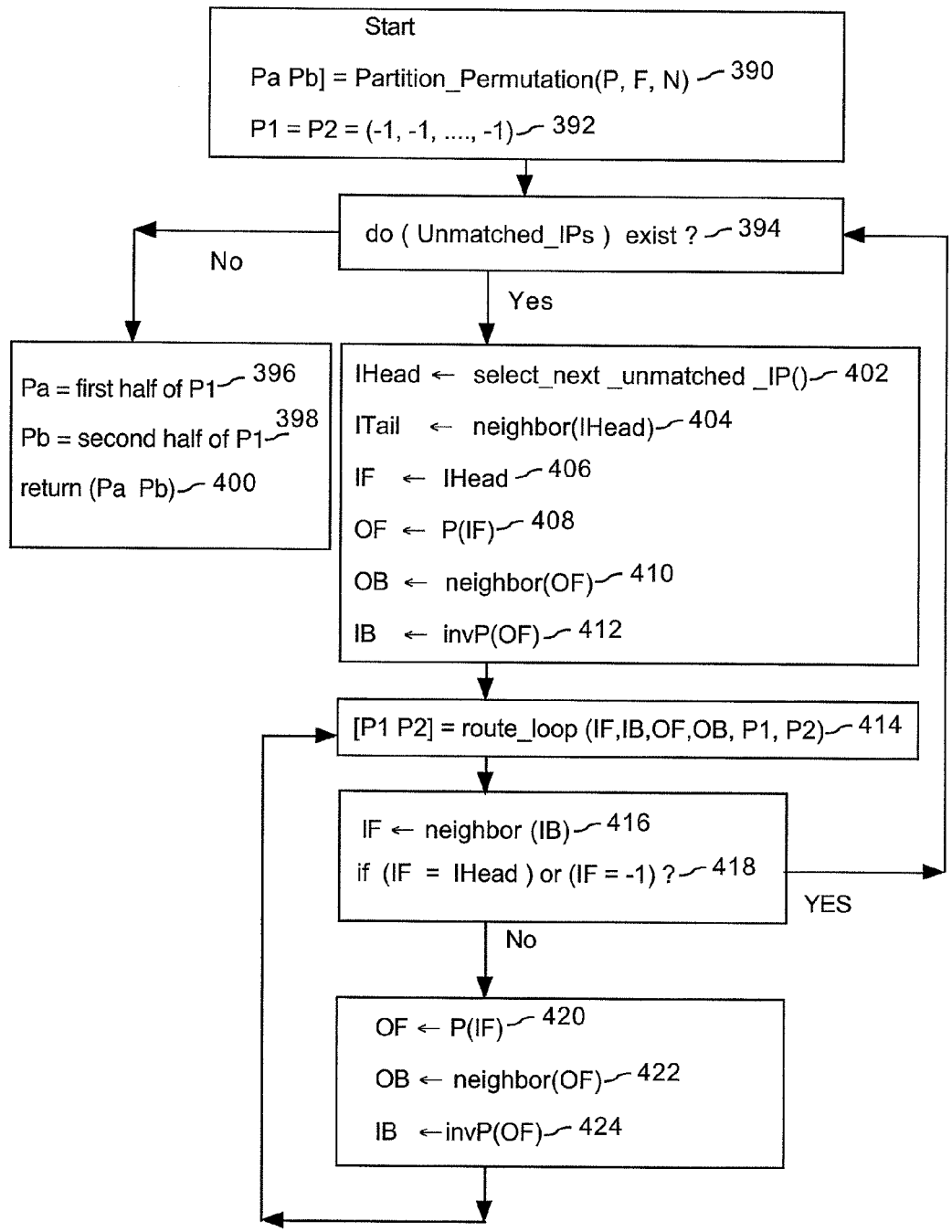
FIG. 13 shows a preferred embodiment of the method 'Partition_Permutation', a provably optimal method to partition a permutation representing a quantized traffic rate matrix relatively fairly into 2 permutations representing 2 traffic rate matrices.

FIG. 13 illustrates an exemplary method Partition_Permutation, which will partition an admissible permutation with NF elements relatively fairly into 2 admissible permutations each with NF/2 elements. This method effectively routes a permutation with NF elements through the first stage and last stage of a binary Benes network shown in FIG. 4. The permutation P represents an admissible traffic rate matrix with frame size F to be partitioned. In Line 392, two permutations P1 and P2 the same size as P are initialized with the values −1. Line 394 tests to see if any unprocessed elements of the permutation P exists. The method 'select_next_IP( )' can select the next element for processing according to several heuristics. Assume a linear ordering is used, ie unprocessed elements of P are processed in a linear order. In Line 394, if the answer is No, then the permutation P has been partitioned and the method returns the two resulting permutations Pa and Pb. Line 396 assigns the first half of P1 to permutation Pa. Line 398 assigns the last half of P1 to permutation Pb. Permutations Pa and Pb are returned in line 400 and the method finishes. If line 394 is affirmative, there are still unprocessed elements of P which must be processed. A new chain of constraints will be initiated. In line 402, the next unprocessed element is selected for processing in the function 'select_next_IP( )'. The function examines data in permutations P and P1, and returns an index into permutation P, which identifies an element of the permutation to be routed through the Benes network. In lines 402 and 404, the variables Ihead and ITail are initialized. The variable Ihead represents an index into permutation P, and Itail represents the neighboring index into P. Two indices x and y are neighbors if their binary representations differ in the least significant bit only, ie assuming a binary representation with 4 bits, 0=0000 and 1=0001 are neighbors, and 2=0010 and 3=0011 are neighbors, etc.

In lines 406 and 408, the variables IF and OF denote a pairing (IF,OF) in permutation P which must be assigned to either permutation Pa or Pb. In lines 410 and 412, the variables OB and IB denote a pairing (IB,OB), which must also be assigned to either permutation Pa or Pb. In line 414, the method Route_Loop is invoked, which will assign the 2 pairings (IF,OF) and (IB,OB) to the two permutations Pa and Pb in an optimal manner. When these pairings have been assigned, they are written into the permutations P1 and P2 which are returned in line 414. In line 416, the element of P which is a neighbor to IB is identified as the next IP to process. Line 418 tests to see if this IP is equal to the previously processed IP Ihead, in which case the loop has been terminated. Line 418 also tests to see if IF=−1, in which case processing resumes at line 394. Otherwise, the variables IF, OF, IB, OB are identified as unprocessed and the processing proceeds again at line 414, with 2 new pairings (IF,OF) and (IB,OB) in permutation P to be assigned to permutations Pa and Pb. In line 424, the function 'invP(OF)' returns the index in permutation P which maps onto OF, ie the function invP( ) represents the inverse permutation. If no index in P maps to OF, then the function will return −1.

Figure 14:
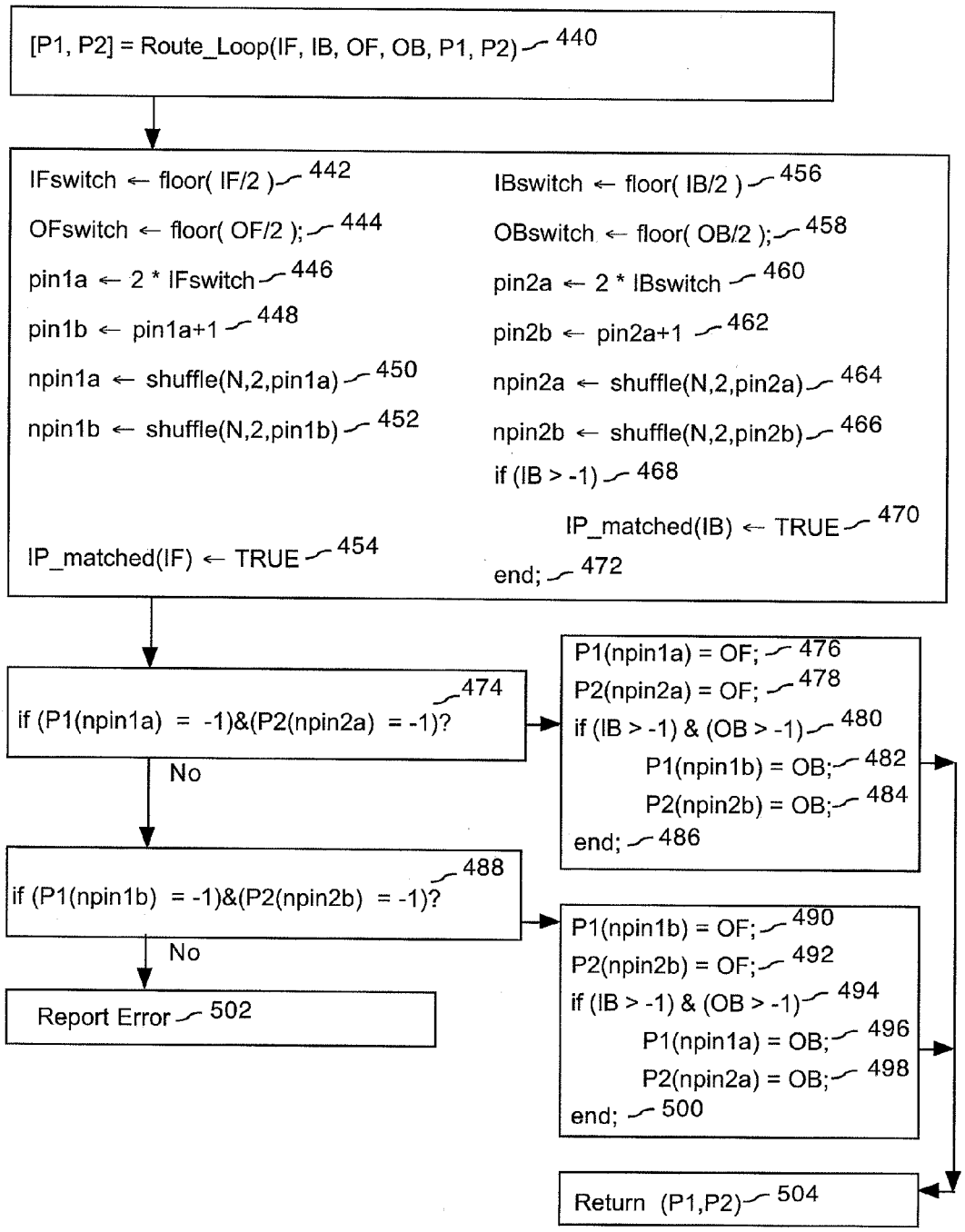
FIG. 14 shows an embodiment of the method 'Route_Loop', a method used in the method Partition_Permutation.

FIG. 14 illustrates an exemplary method Route_Loop 440, which will assign 2 pairings (IF,OF) and (IB,OB) to the 2 permutations P1 and P2 being generated in method Partition_Permutation of FIG. 13. This method modifies the permutations P1 and P2 and returns the modified values. In line 442, the variable IFswitch denotes the numeric label of the switch in the first stage of the Benes network which contains pin IF. In line 444, the variable OFswitch denotes the numeric label of the switch in the last stage of the Benes network which contains pin OF. In lines 446 and 448, the variables pin1$a$ and pin1$b$ denote 2 output pins from the first stage of the Benes network, which the route for the matching (IF,OF) can take. These output pins are mapped onto 2 input pins in stage 2 using the perfect shuffle permutation. Lines 450 and 452 invoke the perfect shuffle permutation: N denotes the maximum number of the pins, 2 denotes the radix, and the $3^{rd}$ parameter is the pin number to be mapped.

Similarly, in line 456, the variable IBswitch denotes the numeric label of the switch in the first stage of the Benes network which contains pin IB. In line 458, the variable OBswitch denotes the numeric label of the switch in the last stage of the Benes network which contains pin OB. In lines 460 and 462, the variables pin2$a$ and pin2$b$ denote 2 input pins from the first stage of the Benes network, which the route for the matching (IF,OF) can traverse. These input pins are mapped onto 2 output pins in the second last stage using the perfect shuffle permutation. Lines 464 and 466 invoke the perfect shuffle permutation.

A constraint that must be satisfied for a valid partitioning is that the pairings (IF,OF) and (IB,OB) cannot be assigned to the same half of permutation P1 or P2. Line 474 tests to see if both P1($n$pin1$a$) and P2($n$pin2$a$) are unassigned (ie if they each equal −1). If both equal −1, then the matching (IO,OF) can traverse the first (upper) half of the Benes network. In this case, processing proceeds to line 476. The value OF is written into the first half of P1 and P2 in lines 476 and 478. If the pairing (IB,OB) exists then it is forced to traverse the second (lower) half of the Benes network. The values OB are written into the second half of P1 and P2 in lines 482 and 484. After line 486, the method returns. If the test in line 474 is negative, then the matching (IF,OF) cannot traverse the first (upper) half of the Benes network. Therefore, it must be able to traverse the second (lower) half of the Benes network. In line 488, P1($n$pin1$b$) and P2($n$pin2$b$) are tested, to ensure that they are both equal to −1. (This test is not necessary, since the condition must be true as a consequence of the looping algorithm for routing of permutations through the Benes networks). In line 490 and 492, OF is written into the second half of P1 and P2. If the matching (IB,OB) is valid, it must be forced through the first (upper) half of the Benes network, and the values OB are written into the first half of P1 and P2 in lines 496 and 498.

In line 474, the preference is to route matches through the upper half of P1. However, the preference could also be to randomly select between the upper and lower halves of P1 when assigning OF.

Figure 15:
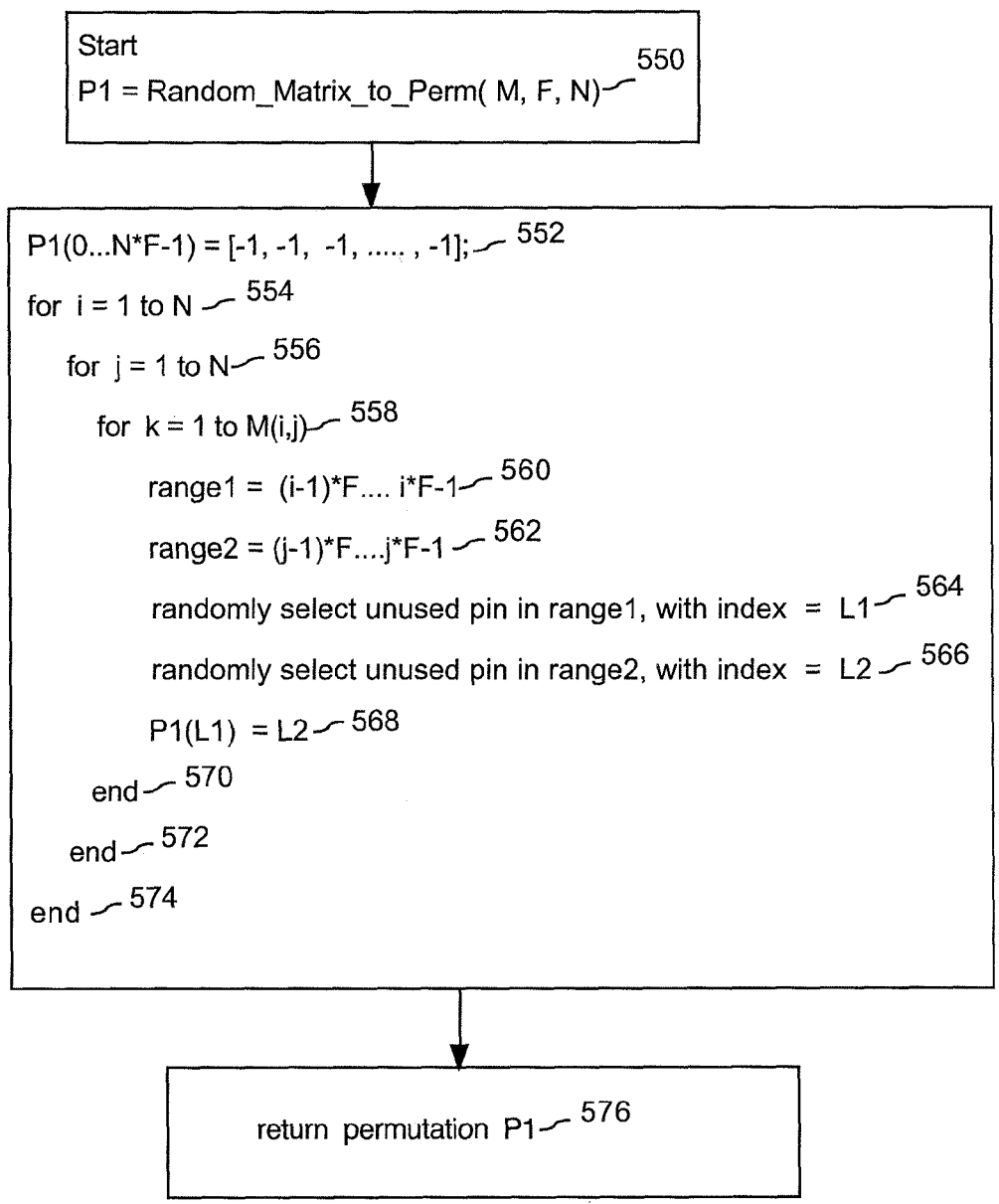
FIG. 15 shows an embodiment of the method 'Random_Matrix_to_Permutation', a method which transforms a quantized traffic rate matrix into a permutation, used in the method Compute_Frame_Schedule in FIG. 12A.

FIG. 15 illustrates an exemplary method Random_Matrix_to_Permutation, which will transform an admissible quantized N×N traffic rate matrix M given parameter F into an admissible permutation P1 with NF elements, which can be used in the method of FIG. 12A. Line 552 creates a first loop which visits all the input ports i. Line 554 creates a second loop which visits all the output ports j. The input pins corresponding to the input port 'i' in the network of FIG. 5 are in the range (i−1)*F . . . (i*F−1). Line 558 identifies this range. The output pins corresponding to the output port 'j' in the network of FIG. 5 are in the range (j−1)*F . . . (j*F−1). Line 560 identifies this range. Line 562 creates a loop corresponding to the number of match requests to be made between (i,j), which equals M(i,j). Each match request in M(i,j) must be assigned to an element in the permutation P1. In Line 564, an index L1 is selected at random from the set of unassigned pins in the input pin range. In Line 566, an index L2 is selected at random from the set of unassigned output pins in the output pin range. In line 568, the output pin L2 is written into the permutation P1 at this index L1. Upon completion of all 3 loops 554, 556 and 562, the matrix has been assigned to the permutation P1, which is returned in line 576. There are several variations of the method which can be envisioned, which are described next.

Figure 16:
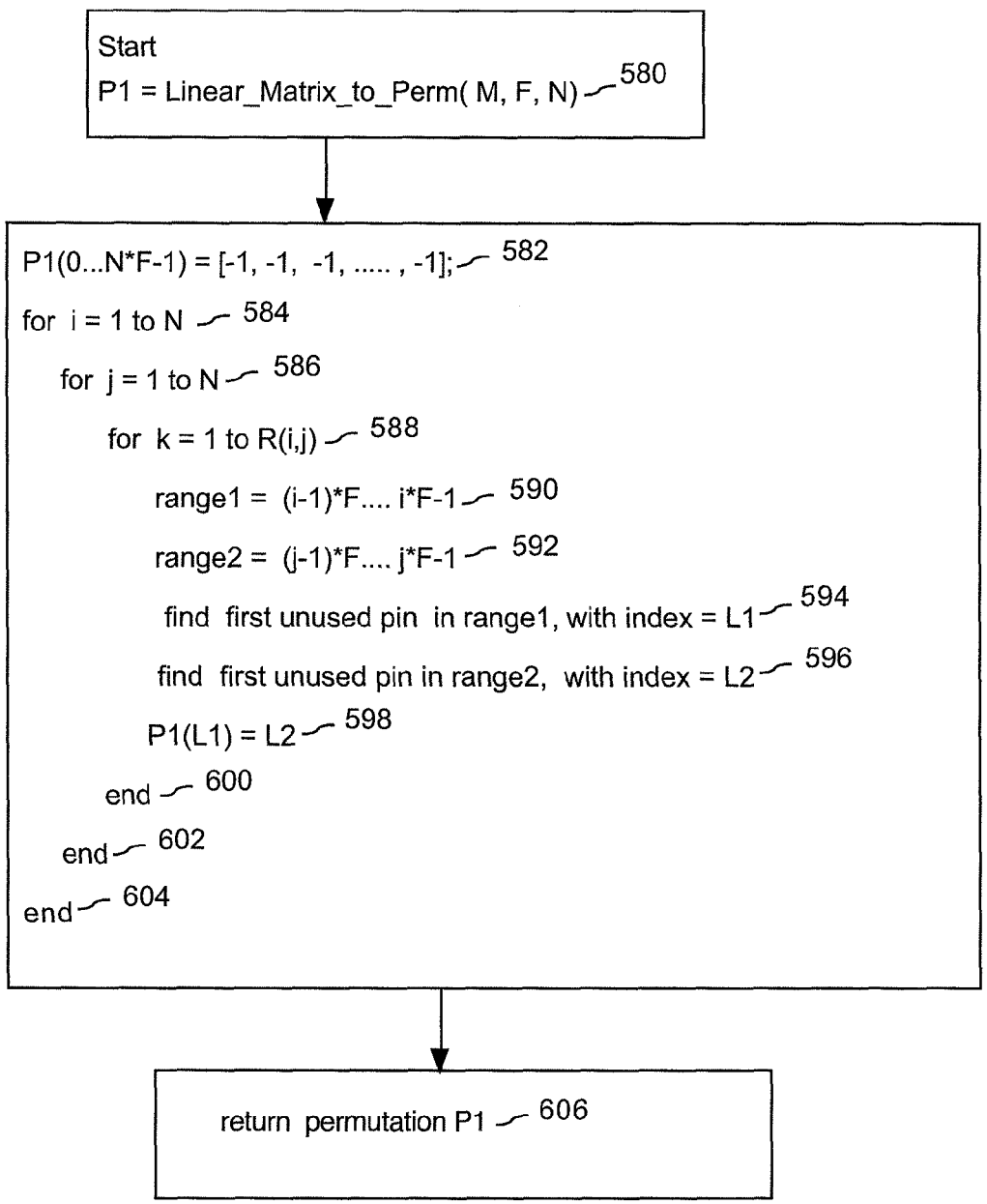
FIG. 16 shows an embodiment of the method 'Linear_Matrix_to_Permutation', a method which transforms a quantized traffic rate matrix into a permutation, used in the method Compute_Frame_Schedule in FIG. 12A.

FIG. 16 illustrates a preferred method Linear_Matrix_to_Permutation, which will transform an admissible quantized N×N traffic rate matrix M given parameter F into an admissible permutation P1 with NF elements, which can be processed in the method of FIG. 12A. The method is similar to the method in FIG. 15. Line 592 selects the first idle input pin in range1. Line 594 selects the first idle output pin in range2. The loop in lines 596, 598 and 600 writes M(i,j) consecutive elements of permutation P1. All the match requests associated with input port i and output port j are placed consecutively in P1, so that they will be fairly and evenly distributed when routed through the Benes network by the perfect shuffle permutation.

Figure 17:
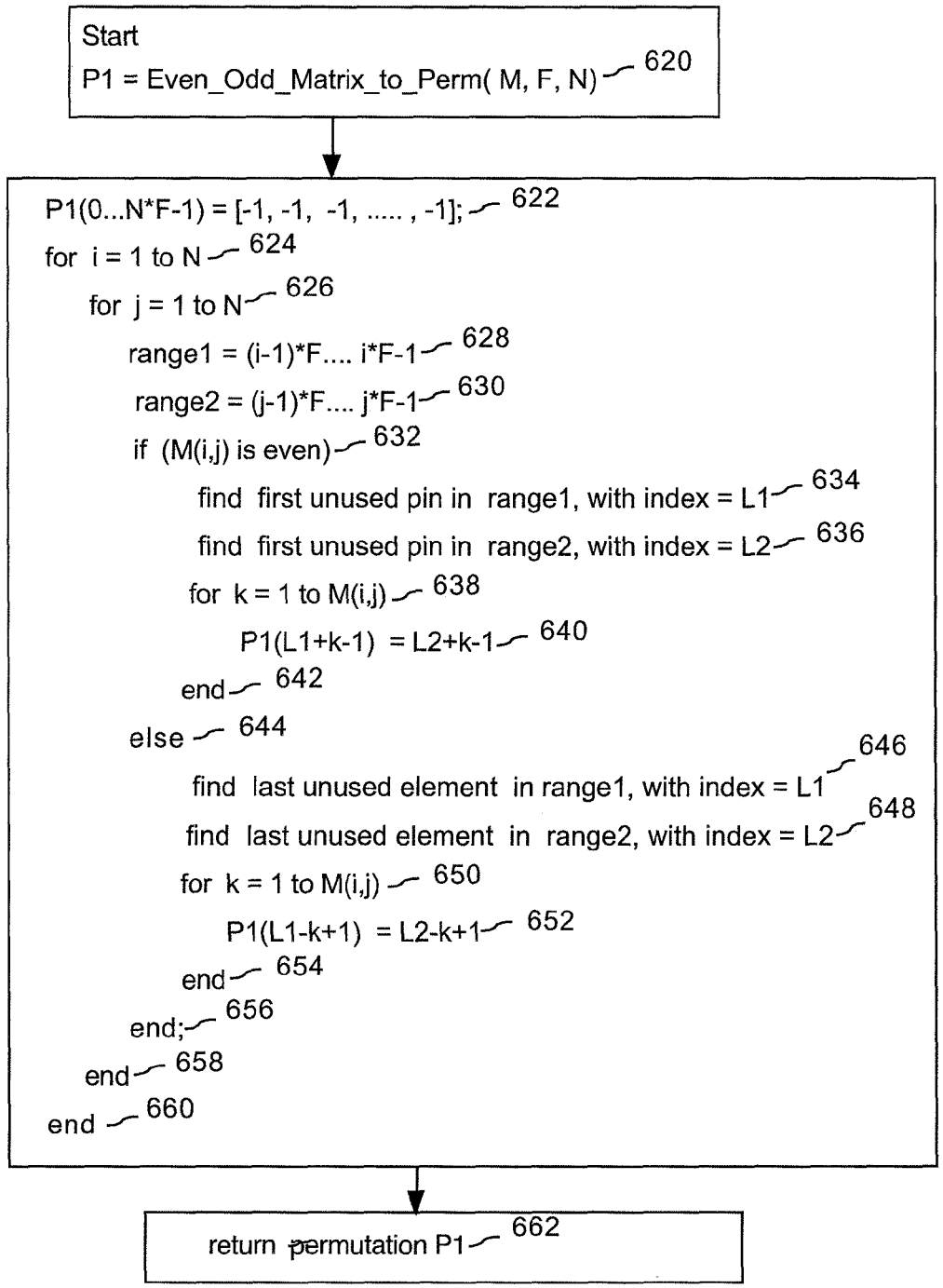
FIG. 17 shows an embodiment of the method 'Even_Odd_Matrix_to_Permutation', a method which transforms a quantized traffic rate matrix into a permutation, used in the method Compute_Frame_Schedule in FIG. 12A.

FIG. 17 illustrates another method called Even_Odd_Matrix_to_Permutation, which will transform an admissible quantized N×N traffic rate matrix M given parameter F into an admissible permutation P1 with NF elements, which can be processed in the method of FIG. 12A. The method is similar to the methods in FIG. 15 and FIG. 16. Line 632 tests to see is element M(i,j) of matrix M is EVEN. If so, in line 634 an input pin with index L1 is selected as the first unused input put in range1. In line 636, an output pin with index L2 is selected as the first unused output pin in range2. In Lines 638, 640 and 642, M(i,j) consecutive elements are written into P1. In line 632, if M(I,j) is Odd then processing proceeds to line 646. In line 646 an input pin with index L1 is selected as the last unused input pin in range1. In line 648, an output pin with index L2 is selected as the last unused output put in range2. In Lines 650, 652 and 654, M(i,j) consecutive elements are written into P1, with decreasing indices. All the Odd match requests will be placed at consecutive elements in P1, and these may be routed together by the methods of FIGS. 13 and 14.

FIG. 18 illustrates tables of results. FIG. 18A reports results on the application of the methods in FIGS. 12, 13, 14 and 15 to a set of 100 randomly selected fully-saturated 8×8 admissible traffic matrices, with frame size F=8. These matrices represent 6,400 flows. A flow is defined as the traffic between one input-port port pair. The 'Inter-Departure-Time' (IDT) of 2 consecutive packets in a flow is a random variable representing the time between the 2 consecutive departures. Every flow has a minimum observed IDT value, a maximum observed IDT value, and the average observed IDT value. In a given traffic rate matrix M, there may be several flows with the same guaranteed rate. The results for all flows with 'k' match requests per frame can be aggregated together into a class 'k'. In the tables in FIG. 18, the minimum, maximum and mean observed values of the IDT for all classes of flows are reported. The method in FIG. 16 uses the Linear Matrix-to-permutation mapping. From FIG. 18A, observe that the average IDT of packets in a flow class equals the Ideal IDT. The minimum and maximum IDTs are also reported.

FIG. 18B reports results on the application of the methods in FIGS. 12, 13, 14 and 16. The method in FIG. 16 uses the Linear Matrix-to-permutation mapping. Observe that the expected IDT of packets in a flow equals the Ideal IDT. The minimum and maximum IDTs are also reported. The Linear method in FIG. 16 reduces the average IDT.

FIG. 18C reports results on the application of the methods in FIGS. 12, 13, 14 and 17. The method in FIG. 17 uses the Even_Odd_Matrix-to-permutation mapping. Observe that the expected IDT of packets in a flow equals the Ideal IDT. The minimum and maximum IDTs are also reported.

FIG. 19A illustrates the 'Service Lead-Lag' of a Frame Schedule using the proposed methods of FIGS. 12, 13, 14, and 16, using one randomly selected 4×4 traffic rate matrix with F=16.

In FIG. 19A, the main diagonal line 700 indicates 'Ideal Service', a case where every cell departs exactly when it should. The lines 702 correspond to individual flows. If a line corresponding to a flow is above the main diagonal, the service is 'leading', ie cells are departing ahead of their ideal departure time. If a line 702 corresponding to a flow is below the main diagonal, the service is 'lagging', ie cells are departing after their ideal departure time. According to FIG. 19A, all flows receive excellent service. Packets depart within a short time of their ideal departure time. The line 704 below the main diagonal illustrates a service lag of 2 IIDTs. The service lag never exceeds 2 IIDTs in FIG. 19A.

FIG. 19B illustrates the 'Service Lead-Lag' using the proposed methods of FIGS. 12, 13, 14, and 16, using 100 randomly selected fully saturated 16×16 traffic rate matrices with F=1024. These 100 matrices represent 25,600 flows to be scheduled through a switch. The main diagonal 702 represents the ideal service. The dotted line 706 above the main diagonal represents a service lead by 4 ideal IDTs. The dotted line 708 below the main diagonal represents a service lag of 4 ideal IDTs. Most cells depart very close to the their departure times, even for large switches (N=16) with large frame sizes (F=1024), operating at 100% with no speedup. The service lead-lag never exceeds 3 ideal IDTs according to FIG. 19B.

In FIG. 19B, the maximum waiting time for any packet is 3 ideal IDTs. This result has important implications. In an IP switch or router, the guaranteed traffic scheduled by the proposed methods receives excellent and fair service. It will not be necessary to buffer a large number of packets or cells for each guaranteed-rate flow, since the departure times are fair and highly predictable. If the arriving traffic coming from a preceding IP router or switch which uses the same scheduling methods, it follows that the arrival times will also be fair and highly predictable. The buffers will be supplied new cells at a fair and stable rate, and the buffers can be serviced at a fair and stable rate. According to FIG. 19, the buffering of a small number of cells per flow, typically 4, should be sufficient to ensure that there is always a packet in the departure buffer of every flow at the scheduled departure time.

End-To-End Delay

FIG. 20 illustrates the simulation results for the observed delays for the transmission of 64-byte cells over an end-to-end path in a packet network, which traverses 10 IP routers. Each router uses the proposed GRD scheduling method in FIG. 12A for scheduling the transmission of cells through the router. Each router has a small queue for cells associated with each input port. Each router has a single cell buffer associated with each output port. A cell arriving at an input port at a IP router waits until it is transmitted from the input port to the output port. Once a cell reaches the output port cell buffer, it is transmitted over a fiber to the next IP router in the path. (The results can be generalized to model variable size IP packets, with a larger packet buffer at each input and output port.)

The end-to-end path reserves 64 time-slots out of a frame of 1024 time-slots, between one input port and one output port, in each IP router along the path. Each IP router has size 8×8, and we assume that each of the other 7 input ports and 7 output ports in each IP router also support Guaranteed Rate traffic at the same rate. Therefore, the GRD traffic carried by these 10 IP routers was quite high (50% utilization) and represented a very heavy loading.

In these simulations, the link rate between IP routers is fixed at 10 Gigabit/second. With a frame size of F=1024, the minimum increment of reservable bandwidth is 10 Megabit/sec. The end-to-end path reserves 64 time-slots out of a frame of size 1024, for a guaranteed data rate of 80 Megabyte/sec. The time-slot duration is 51.2 nanoseconds, and the frame duration is 52.4 milliseconds, corresponding to 1024 time-slots.

In FIG. 20, Table 20A illustrates the average number of cells queued, and the average queueing delay expressed in microseconds, at the input port of each of the 10 IP routers associated with the end-to-end path. Each IP router buffered on average 1.392 cells per flow. With these queue occupancies, cells would arrive and depart at deterministic intervals and rates, the input queue lengths remained stable, and the delay jitter introduced by the IP routers in the backbone network was very small. From Table 20A, it is clear that each IP router buffers on average slightly only more than 1 cell. The average delay along the entire end-to-end path=11.6825 microseconds, corresponding to an average delay per IP router=1.062 microseconds. This average delay corresponds to 20.74 time-slots, indicating that on average every cell waits slightly more than one ideal IDT (16 time-slots) in each IP router. This result is consistent with the results in FIG. 19, which indicate that most cells will receive service within one ideal IDT on average.

FIG. 20B illustrates the distribution for the number of cells stored in the input queue of IP router #5, which is the most heavily loaded queue. This input queue has the largest average occupancy of 2.822 cells, and a maximum occupancy of 4 cells. However, this input queue never stores more than 4 cells. FIG. 20C illustrates the probability density function (PDF) for the inter-arrival time (IAT) of the cells arriving to this input queue. FIG. 20C illustrates that 50% of all arriving packets have an inter-arrival time equal to the ideal IDT, with some packets arriving sooner than they should and some packets arriving later than they should. The maximum IAT in FIG. 20C is one ideal IDT.

FIG. 20D illustrates the distribution for the number of cells stored in the playback buffer. This buffer has an average occupancy of 0.4531 cells, and a maximum occupancy of one cell. The objective of the playback buffer is to deliver packets to the end-user with very low delay jitter, so packets are allowed to depart the playback buffer with an inter-departure time set equal to one ideal IDT. FIG. 20E indicates that all packets arrive to the end-user at their ideal times, and that the delay jitter observed at the receiver is zero. The same simulation was performed on many longer end-to-end paths of IP routers, with different traffic rate matrices, different F and N values, and similar results were observed. The number of queued cells at each IP router needed to provide very low jitter is typically very small.

If the proposed scheduling methods could be employed in all IP routers or switches, then for the majority of flows in a network only a small number of cells, typically about 4, will need to be buffered at each switch or router. The end-to-end delay experienced by a flow will be highly predictable, due to the reduction in the number of buffered packets or cells in the network. Traffic scheduled with the proposed methods will be highly suitable for new and emerging services, such as Telerobotic control, telerobotic surgery and telerobotic mining. Such applications cannot tolerate large delay variations.

Time Complexity

The time complexity of the recursive method 'Find_Schedule_Permutation' shown in FIG. 12 can be estimated. Assume the method requires 50 integer instructions per element of the permutation at each level of recursion (this assumption is likely very pessimistic, and the performance should be much faster with careful code generation). Let the switch of size be N=16, and the frame size F=128. The initial admissible permutation to be partitioned has size N*F=16*128=2^11 elements. The method processes O(NF log(F)) elements, and therefore 2048*7*50=716,800 machine instructions are required for a complete computation of a Frame Schedule. Since the amount of data and the number of instructions are small (2K elements), assume that all instructions and data can reside in a cache, and cache misses are zero. Assume a modern microprocessor capable of 4 GHz operation which executes 4 instructions per cycle, for a peak performance of 16 GHz instructions per second. The time required to compute a frame schedule for this set of switch parameters is 44,800 nanoseconds or 44.8 microseconds. Generally, the traffic rate matrix M changes slowly and therefore the permutation changes relatively slowly. Furthermore, the permuataion can be changed incrementally without much computation (it does not need to be entirely recomputed every time the traffic rate for a flow changes.) In many cases only partial reconfigurations of the frame schedule will be required, and these can be computed considerably faster. In any case, this method is very fast. The execution time of any method can often be increased typically by a factor of 10 to 100 by using multiple-processors or hardware implementation such as Field Programmable Gate Arrays or Application Specific Integrated Circuits. Executions times of the order of tens of microseconds are plausible when using hardware implementions for small values of N and F.

Optimization of the Frame Schedule

The frame schedule determined by the method 'Find_Schedule_Permutation' shown in FIG. 12 can be further processed to reduce the jitter. When the traffic rate matrix to be scheduled only utilizes a fraction of the switch capacity, for example 50%, there will be unused switching capacity in the frame schedule. The unused capacity is denoted by the existence of partial permutations in the Frame Schedule. The partial permutations may leave some input and output ports idle in each partial permutation. A simple method exists to iteratively improve the frame schedule.

FIG. 21 illustrates the method 'Optimize_Frame_Schedule'. The method starts by finding a flow with an undesirably large IDT between two cells labelled c−1 and c, and an undesirably small IDT between two cells c and c+1. The large IDT is the result of service of cell c−1 at a time t1, and service of cell c at a time t2, where (t2−t1) is larger than a threshold based upon the ideal IDT. For example the threshold can equal 2*Ideal IDT. The method can then search all the partial permutations in the Frame Schedule, in between times t1 and t2, searching for a partial permutation where the relevant input and output ports are both idle. Suppose such a partial permutation is found at time t1<t3<t2. In this case, the match scheduled at time t2 can be moved to new time t3<t2. This move will lower the large IDT between the cells c−1 and c, and it will increase the small IDT between the cells c and c+1. By repeated application of this method, the largest IDTs will be decreased and the smallest idts will be increased.

In FIG. 21, line 742 is a loop which visits each input port j. Line 744 is a loop which visits each output port k. Line 746 is a loop which visits each cell except the last in the flow(j,k). Lines 748, 750, and 752 return the time-slots reserved for cells c−1, c and c+1 respectively. Line 754 computes the IDTs for cells c and c+1. Line 756 tests to see if the IDT for cell c is unusually large, ie if the IDT exceeds some constant K1 times the IIDT. Line 756 also tests to see if the IDT for cell c+1 is unusually small, ie if the IDT is less than some constant K2 times the IIDT. If both conditions are met, the reservation time for cell c in the frame schedule can potentially be moved to an earlier time-slot. Line 758 determines the time-slot tm which lies mid-way between t1 and t3. Line 760 is a loop which creates the variable 'delta' which becomes an offset with respect to the time-slot tm. Line 762 generates a candidate time-slot ts, by adding the delta to tm. Line 764 tests to see if input and output ports j and k are idle at this time-slot ts. The notation iFrame(ts,k) is the inverse permutation of the permutation in time-slot ts of the frame schedule. This notation returns the value −1 if no input port selects output port k in the time-slot ts. If both ports are idle, the method proceeds to line 766. Lines 766 and 768 computes the two new IDTs for cells c and c+1, assuming the reservation was moved to the earlier time-slot ts. Line 770 tests to see if the two new IDTs are better than the two existing IDTs, ie if tidt2<idt2 and tidt3>idt3. If the test is affirmative, line 772 establishes a reservation between input port j and output port k at time-slot ts. Line 774 erases the original reservation between input port j and output port k at time-slot t2. Line 776 terminates the inner loop. If the test in line 764 is negative, then processing proceeds at line 782. A new time-slot ts is found by subtracting delta from tm. The lines 764 up to 780 are then repeated, in line 784. This method can lower the maximum service lead or lag by up to 50%, if there are sufficient partial permutations in the frame schedule to allow match reservations to be relocated.

Burst Cell Scheduling

Internet Protocol (IP) packets have variable sizes. Small IP packets such a transmission acknowledgements may contain 64 bytes or less, while large packets such as video frames may contain up to 1500 bytes. A typical cell in an IP router may contain 64 bytes. Therefore, a large IP packet of 1500 bytes may be fragmented into 24 cells for transmission across a switch or router. In some applications it may be desirable to service entire packets quickly. Therefore, the IP router could schedule the transmission of cells which belong to one IP packet through the switch in bursts, where many cells are transferred from an input port to an output port consecutively. In this manner, the IP packet can be reconstructed at the output side of the switch sooner, and transmitted sooner. IP packets may potentially experience smaller waiting times.

FIG. 22 illustrates a method Burst_Schedule to achieve burst switching. The method in FIG. 22 will compute 2 smaller frame schedules, one for burst traffic and one for cells. It will then combine these 2 smaller frame schedules to achieve a longer frame schedule. Consider an N×N switch and a desired frame length F=F1+F2, where F1 and F2 are preselected parameters. The quantized guaranteed rate traffic matrix is denoted M, where element M(j,k) specifies the number of time-slots requested in the frame to support the traffic between input port j and output port k.

Define a burst size B, which indicates the number of cells that may be transferred from one input port to one output port consecutively in a burst. The smaller frame size F1 is selected such that F1<=F/B. The method in FIG. 22 will compute a smaller frame schedule of length F1, and each permutation in this frame schedule will be repeated B times consecutively in the final frame of length F.

Consider an example, where N=8, F=48, B=4, F1=8, F2=1. In general, larger values of F2 will be required to ensure the matrix V is doubly sub-stochastic. Recall the quantized traffic rate matrix in Equation (2), for a 4×4 crossbar switch with a frame size F=32:

$$M = \begin{bmatrix} 12 & 0 & 8 & 12 \\ 4 & 8 & 18 & 2 \\ 0 & 17 & 4 & 11 \\ 16 & 7 & 2 & 7 \end{bmatrix} \quad (15)$$

In FIG. 21, line 822 computes a quantized burst traffic rate matrix U, where every element U(j,k) equals floor (M(j,k)/B). In this example, $$U = \lfloor M/B \rfloor = \begin{bmatrix} 3 & 0 & 2 & 3 \\ 1 & 2 & 4 & 0 \\ 0 & 4 & 1 & 2 \\ 4 & 1 & 0 & 1 \end{bmatrix} \quad (16)$$

The burst matrix U will not carry all the traffic specified in matrix M. The remaining cells to be scheduled are determined from cell traffic rate matrix V. In FIG. 21, line 824 computes V=M−U*B. In this example, $$V = M - B\lfloor M/B \rfloor = \begin{bmatrix} 0 & 0 & 0 & 0 \\ 0 & 0 & 2 & 2 \\ 0 & 1 & 0 & 3 \\ 0 & 3 & 2 & 3 \end{bmatrix} \quad (17)$$

In line 826, the traffic requirements in the matrix U are scheduled for transmission in a frame of length F1 using the method Compute_Frame_Schedule in FIG. 12A, which yields a frame schedule Frame1. To ensure that matrix U is doubly sub-stochastic or stochastic, the parameter F1=8. The resulting frame schedule yields F1=8 permutations. In lines 830-840, each permutation in Frame1 is repeated B times consecutively to yield F1*B permutations, which are inserted into the frame schedule of size F. Line 830 processes every permutation in Frame1. Line 832 is a loop which will make B copies of the permutation with index p. Line 834 determines the time-slot ts in the final frame Frame3, where the copy of this permutation is to be inserted. Line 836 copies this permutation from Frame1 into time-slot ts of Frame3. (The Matlab notation V(1:N) is used, which denotes all elements of the vector V with indices from 1 to N).

In line 828, a second frame schedule Frame2 of length F2<F is computed using the proposed method Compute_Frame_Schedule in FIG. 12A. This frame schedule handles the remaining cells not handled by the burst matrix U. To ensures that matrix V is doubly sub-stochastic or stochastic, the parameter F2=8 in this example.

To achieve the final frame schedule Frame3 of length F, the F2 permutations in Frame2 must be merged with the B*F1 permutations created from Frame1, in any manner. To preserve the bursts, and to allow service to individual cells inbetween the bursts, the F2 permutations can be distributed relatively evenly in between the bursts. In this example, F1=F2=8, so that one permutation from F2 can follow each sequence of B permutations from F1.

Line 842 processes each permutation in Frame2. Line 844 determines the time-slot ts where the next permutation in the subset is to be inserted into the final schedule Frame3. Line 846 copies the permutation with index p in Frame 2 and inserts it into time-slot ts of Frame3.

Figures 23, 24A:
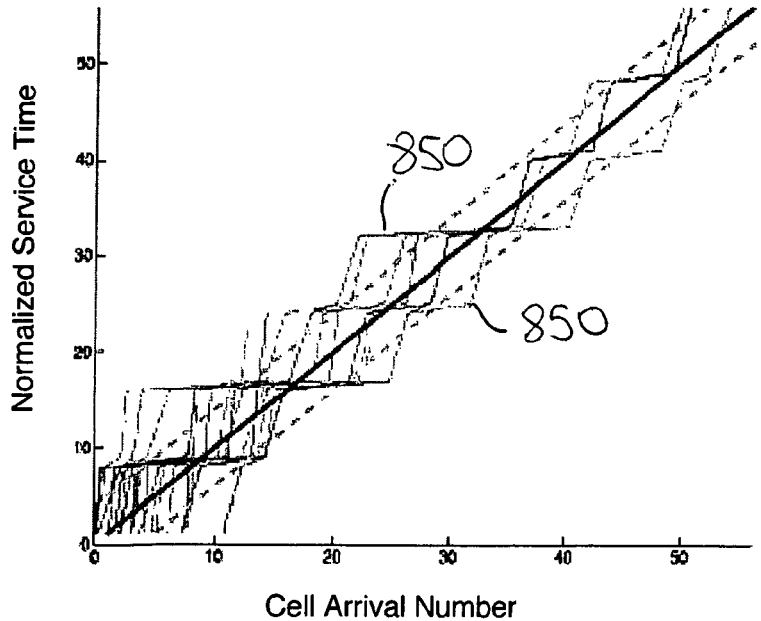
FIG. 23 illustrates the Service Lead-lag of the method Burst_Schedule in FIG. 22.
FIG. 24A illustrates the method 'Find_Schedule_Traffic_Class' to find frame schedules for multiple prioritized traffic classes.

FIG. 23 illustrates the results of the method in FIG. 22. FIG. 23 illustrates the Service Lead-Lag graph, for the parameters N=8, F=48, B=4, F1=8, F2=1. Several discrete steps 850 in the service received by each flow are illustrated. These discrete steps correspond to bursts of service.

Handling Dynamically Changing Best-Effort Traffic

The proposed method Compute_Frame_Schedule in FIG. 12A is computationally very quick. For moderate values of N and F, it can compute a frame schedule in the range of tens or hundreds of microseconds using a single processor, and potentially much faster using multiple processors or dedicated hardware. Therefore, it is desirable to explore techniques where the method can be used to support dynamically changing Best-Effort (BE) traffic. Existing IP routers require dedicated hardware circuitry to compute matchings for BE traffic.

The method Find_Schedule_Traffic_Class is shown in FIG. 24A. In this method, 3 traffic classes are assumed and each IP router requires a quantized traffic rate matrix for each traffic class. The 3 matrices are labeled M1, M2 and M3. Element M1$(j,k)$ denotes the number of time-slots requested between input port j and output port k for the highest priority traffic within each frame. M2 is similarly defined for medium-priority traffic, and M3 is similarly defined for the lowest-priority traffic. The highest priority traffic can be Guaranteed Rate traffic, and the lowest priority traffic can be Best-Effort traffic. The GR traffic can correspond to the Expedited Forwarding (EF) class of traffic in the Differentiated Services IP protocol. Matrix M1 will change slowly with time. The medium priority class can correspond to the Assured Forwarding (AF) class in the Diffserv model.

Element M3$(j,k)$ denotes the number of time-slots requested between input port j and output port k for BE traffic within each frame. Matrix M3 will change relatively frequently with time. Matrix M3 can be updated every several milliseconds. Recall that the same frame schedule is used repeatedly in time, until it is updated. Let a 'Frame Interval' denote the amount of time needed to realize one frame, which equals F times the time-slot duration. A control processor can update the frame schedule at the end of every K frame intervals, for some value K. The control processor can monitor the lengths of the input queues associated with the BE traffic at the IP router at the beginning of every sequence of K frame intervals, and construct the matrix M3 to service these input queues accordingly over the next sequence of K frame intervals. The next frame schedule can be computed while the current frame schedule is being realized.

If the switch is under utilized, the matrix M3 can overestimate the number of time-slots requested between input port j and output port k. An input port with no packets for a selected output port will simply ignore a match in a frame schedule.

Consider a switch with a GR traffic matrix M1, which reserves on average a fraction U of the F time-slots in a frame for each input port and output port. On average, every input port will transmit GR traffic over F*U reserved time-slots, and it will remain idle for F*(1-U) time-slots, and similarly for the output ports. Lower priority traffic can use these idle time-slots.

Let matrix A in line 872 of FIG. 24A denote the sum of matrices M1, M2 and M3. For the traffic to be admissible, matrix A must be doubly sub-stochastic or stochastic, ie the sum of every row of A must be $\leq F$ and the sum of every column of A must be $\leq F$. These constraints will ensure that no input port is overloaded, and that no output port is overloaded.

The method can first determine a frame schedule for traffic matrix A. The frame schedule contains the permutations required between input and output ports needed to support both all the traffic classes. The method Select_Class_Frame_Schedule in FIG. 24B can then process these permutations in the frame schedule, determining which matchings between input and output ports should be used for a given traffic class, and which matchings should be left for lower priority traffic classes to use.

A frame FR contains F full or partial permutations. Let these permutations be labeled FR(1) . . . FR(F). Furthermore, let the j-th element of permutation FR(t), for $0 \leq j < N$ and $1 \leq t <= F$, be denoted FR(t,j). The element FR(t,j) yields the output port that the input port j is matched to at time-slot t. If the input port j is unmatched, this element is -1. Let the inverse permutation of the permutation FR(t) be denoted iFR(t). The inverse permutation IFR(t,k) denotes the input port that selects output port k. If no input port selects output port k, then IFR(t,k) is -1.

Referring to FIG. 24A, line 872 adds the traffic rate matrices M1, M2 and M3 to yield matrix A. Line 874 calls the method Compute_Frame_Schedule in FIG. 12A which returns a Frame schedule denoted Frame_All of length F. Line 876 invokes the method Select_Class_Frame_Schedule of FIG. 24B, passing as input data the high priority GR traffic rate matrix M1 and the frame schedule Frame_All, and parameters N and F. This method returns a frame schedule denoted Frame1 for the high priority GR traffic, and a frame_schedule called Frame_Rem which includes the matches in Frame_All not claimed by the GR traffic. These matches are available for lower priority traffic to use. Line 878 computes the frame schedule Frame2 for use by priority 2 traffic with traffic rate matrix M2, and also returns the frame schedule Frame_Rem which lower priority traffic can use. BE traffic. Since there are only 3 classes of traffic in this example, then the lowest priority BE traffic can use all the remaining matchings in the frame schedule Frame_Rem, as shown in line 880. Line 882 returns the 3 frame schedules Frame1, Frame2 and Frame3. These frame schedules operate concurrently in time. The matches between input and output ports issued to each traffic class are conflict free.

The method in FIG. 24A can be easily extended to handle more traffic classes, rather than just 3 traffic classes. Line 878 can be repeated several times, once for each traffic class, which selects a frame for each class, from the remaining frame schedule.

FIG. 24B illustrates the method Select_Class_Frame_Schedule. Line 902 is an outer loop which visits each input port j. Line 904 is a loop which visits each output port k. Variables j and k denote a flow(j,k) to be processed. Line 906 initializes the last departure time of a cell in the flow(j,k) to be 0. Line 908 is a loop which processes every cell c in flow(j,k). Line 910 initializes the variable 'found' to equal 0, denoting the fact that a match must be found for this cell. Line 912 initializes the variable t to the last departure time plus 1, which is where the searching for a match will start. Line 914 is a while loop which executes until a match and departure time is found for the current cell c. Line 916 tests to see if input port j is matched to output port k at time-slot t, in the frame schedule Frame2. If this test is true, then line 918 computes the IDT that would occur if this time-slot t was reserved for the cell c in flow(j,k), and assigns the value to variable idt1. Line 920 tests to see if the variable idt1 exceeds a threshold equal to a constant, in this case 0.9 times the IIDT. Line 920 also tests to see if the cell c is the first cell in the flow. Line 921 also tests to see if the number of matches remaining in the frame schedule Frame2 from time-slots t to F equals the number of matches required by the flow(j,k). If either condition is met, line 922 establishes a reservation between input port j and output port k at time-slot t in the frame schedule Frame1. Line 924 erases the reservation between input port j and output port k at time-slot t in the frame schedule Frame2, to denote the fact that this matching is no longer available for lower priority classes to use. Line 926 records the last departure time for this cell. Line 928 causes the while loop ending at line 936 to be exitted. When the while loop is exitted, control is resume at line 938 which will cause the next cell to be processed in the next iteration of loop 908. Line 934 is invoked in each iteration of the while loop 914, as long as a reservation has not been found for the cell c. As long as a reservation is not found, the while loop will process consecutive time-slots t in the frame schedule, until a reservation for the cell under consideration is found. Line 940 denotes the end of the loop 904. Loop 908 is repeated until every cell in flow(j,k) is assigned a reservation.

FIG. 25 illustrates the results of the method in FIG. 24. The switch size is 8×8, the frame size is F=1024. Two traffic classes are assumed. The GR traffic has a utilization of U=33%, and the remaining Best-Effort traffic has a utilization of U=67%, for a total switch utilization of 100%. FIG. 25A illustrates the Service Lead-Lag for all high priority GR traffic. The average cell IDT is reduced considerably for GR traffic. The maximum service lead or service lag is approx. 1 IIDT from FIG. 25A. FIG. 25B illustrates the Service Lead-Lag for all low priority BE traffic. The average service lead-lag is increased compared to the GR traffic. The maximum service lead or service lag for best-effort traffic is approx. 2-3 IIDT from FIG. 25B.

The methods in FIGS. 24A and 24B can be used to schedule several classes of traffic. The current IP protocol 'Differentiated Services' or 'DiffServ' supports 3 basic traffic classes, the Expedited Forwarding class, the Assured Forwarding class, and the Best-Effort class. The method in FIG. 23 can handle these 3 traffic classes, offering guaranteed service for every traffic class, and offering minimized delay jitter for the highest priority EF class, a moderate delay jitter for the AF class, and the larger delay jitter for the BE traffic class.

Furthermore, by placing the scheduling of Best-Effort traffic under the control of methods 24A and 24B, the likelihood of Denial of Service attacks on the Internet should be reduced. The control processor which formulates matrix M3 for BE traffic can examine the states of the input queues for BE traffic, and if an unusual spike is observed for a particular output port from several input ports, the requested traffic rates can be denied or reduced. Furthermore, each IP router can monitor the status of its immediate neighboring IP routers and their IP queues, and service local requests for BE traffic according to some criterion which involves the status of its immediate neighbors.

Replacing Crossbar Switch by a 3-Stage Switch

Many switches in IP routers can have large sizes, ie N>=32. In some cases, it may be desirable to replace switch 40 in FIG. 1 by a 3 stage Clos network, as shown in FIG. 3. In this case, the 3 stage Clos network is used as a nonblocking switch, as described in the paper by A. Jajszczky entitled "Nonblocking, Repackable and Rearrangeable Clos Networks: Fifty years of the Theory of Evolution", which was referenced earlier.

The permutations to be realized by the switch in a low-jitter frame schedule have been computed using the method in FIG. 12A. However, these permutations must also be routed through the 3 stage Clos network. According to the prior art, the routing of permutations through a 3 stage Clos network can be difficult and time-consuming.

The proposed topological equivalence between the multi-stage network topology in FIG. 5 and FIG. 6 can also be used to efficiently compute the routes to be taken by permutations in a low-jitter frame schedule through a 3-stage Clos switch architecture in FIG. 3.

Referring to the method of FIG. 12B, in line 356 when the length of a permutation equals the switch 40 size N, processing proceeds to line 366, where a permutation of size N is returned in Frame3. Referring to FIG. 5, the decomposition of the traffic rate matrix M has terminated when the method reaches the middle stage of switches 104 in FIG. 5, which corresponds to the size of switch 40 which is N. In Method 12B, the frame schedule is computed by reading the permutation elements appearing on the input pins of binary stage $\log_2 F+1$, equivalently the elements appearing at the input pins of stage 104 in FIG. 5 or stage 116 in FIG. 6. Each permutation of size N provides the matchings between the input and output ports of an N×N crossbar switch 104 in FIG. 5 or switch 40 in FIG. 1. However, suppose the N×N crossbar switch 40 is constructed by a 3-stage switch, for example using the 3-stage Clos network topology in FIG. 3. The routes of the permutations (equivalently the times-slots of cell reservations in a frame schedule) through the 3-stage Clos switch can also be computed, using the same method in FIG. 12B, by allowing the decomposition of the permutations to proceed until the switches in stage 104 of FIG. 5 equal the size of the switches in the middle stage of the 3 stage Clos network in FIG. 5 used in switch 40.

In the general case of the Clos network, switches in the $1^{st}$ and $3^{rd}$ stages may have size $2^{\lceil n/2 \rceil}$ and switches in the middle stage may have size $2^{\lceil n/2 \rceil}$, where $n=\log_2 N$ For simplicity, assume the N×N crossbar switch 40 is replaced by a 3-Stage CLOS network, where all switches have the same size $2^{n/2}=2^{\lceil n/2 \rceil}=2^{\lceil n/2 \rceil}$. For example, allowable values of N are 4, 16, 64, 256, 1024, etc).

To compute the low-jitter frame schedule corresponding to matrix M, the F permutations to be realized by the N×N 3 stage Clos switch used in switch 40 must be computed by the method in FIG. 12A. In addition, the routing required to realize each permutation through the 3-stage N×N Clos network must be computed. To achieve this goal, the line 356 in the method of FIG. 12B is changed. The new line becomes 356A: if length(P)>R, where $R=2^{n/2}$. As a result of this change, the permutations returned by the method in FIG. 12B will be read from the middle stage of the 3-stage Clos-like network in FIG. 5, which represents the 3 stage Clos network in FIG. 3 which is replacing the crossbar switch 40 in FIG. 1. The value Frame3 returned by method 12B is now a matrix consisting of F times $2^{n/2}$ permutations. Each set of $2^{n/2}$ consecutive permutations in Frame3 forms the permutations to be realized by the middle stage of switches 84 of the Clos network in FIG. 3 replacing switch 40 in FIG. 1. There are $2^{n/2}$ switches in the middle stage.

The change of line 356 above to line 356A has illustrated how to compute the permutation elements arriving at the middle stage switches 84 of the 3 stage Clos network in FIG. 3, in a low-jitter frame. However, the states of the first stage of switches 82 and the third stage of switches 86 of the Clos network in FIG. 3 are still unknown. A method is proposed in FIG. 26 to recover the states of the first and third stages of switches. Referring to FIG. 5, observe that the permutation elements appearing at the input pins of the middle stage 104 come from the output pins of the first stage 102. Therefore, it follows that the permutation elements appearing at the output pins of the first stage of switches 102 in FIG. 5 can be determined by applying an inverse perfect shuffle permutation to the permutation of elements appearing at the input pins of stage 104, which is computed by the method FIG. 12B when line 356 is changed. Similarly, the permutation elements appearing at the input pins of the third stage 106 in FIG. 5 can be obtained by applying an inverse perfect shuffle permutation to the values appearing at the output pins of the middle stage of switches 102.

Figure 26:
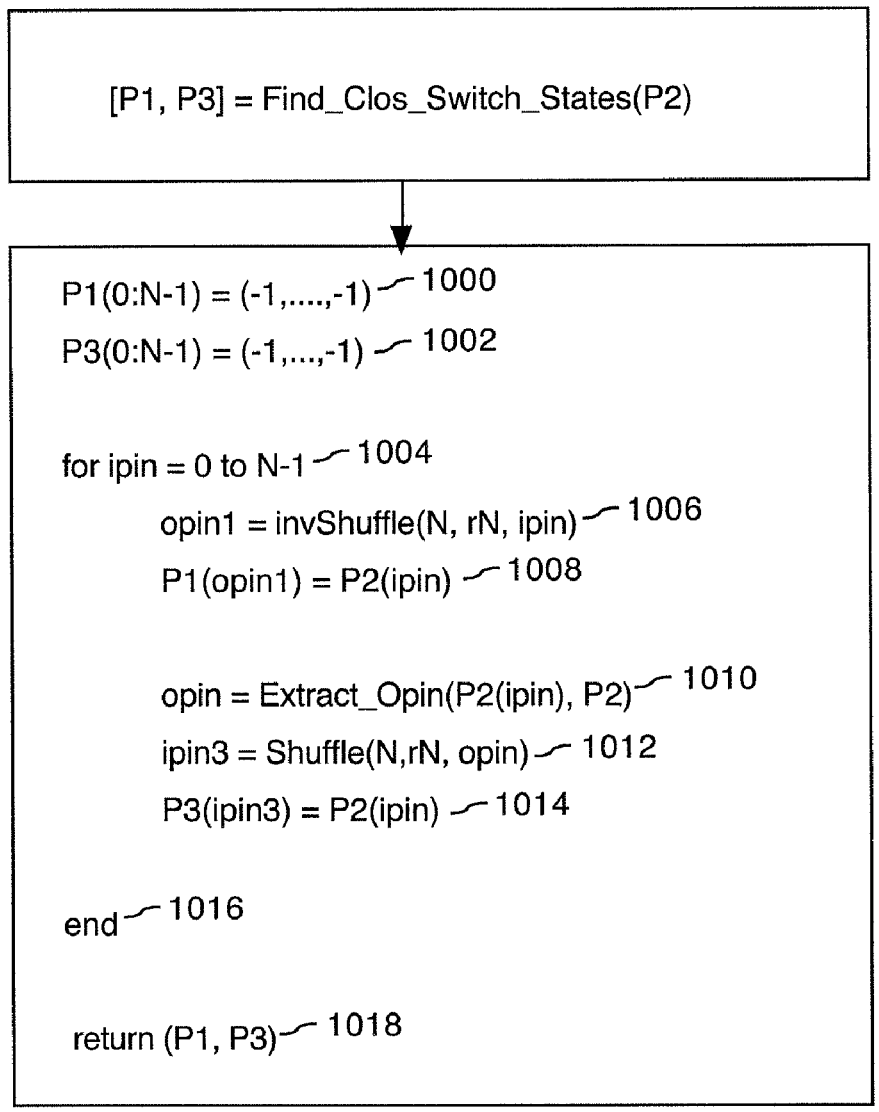
FIG. 26 illustrates a method 'Find_Clos_Switch_States', which can be used to route permutations through a 3-stage Clos switch.

The method Find_Clos_Switch_States is shown in FIG. 26. The method accepts a permutation P2 appearing at the inputs to the middle stage of switches 84 in an N×N Clos network in FIG. 3, and computes the permutations appearing at the output pins of the first stage 82, and the permutations appearing at the input pins to the third stage 86. This data is sufficient to compute all the switch states. Lines 1000 and 1002 initialize permutations P1 and P3 to −1's. P1 will contain the permutation appearing at the output pins of the first stage, and P3 will contain the permutation appearing at the input pins of the third stage. Line 1004 is a loop which visits every input pin in the middle stage. Line 1006 performs an inverse perfect shuffle permutation of N elements, using radix root N. This line accepts an input pin number in the middle stage 84, and returns the output pin of the first stage 82 which leads to this input pin. Line 1008 copies the permutation element at the input pin of the middle stage, back into the output pin of the first stage. Line 1010 determines the output pin of the switch in the middle stage 84 in FIG. 3, that the permutation element at the input pin 'ipin' will map onto. In FIG. 3, each switch in the middle stage 84 receives at most one permutation element destined for each switch in the last stage 86. Otherwise, the permutation could not be routed, a contradiction. Therefore, the mapping of a permutation element at an input pin onto an output pin in the middle stage is unique and is easily found. Line 1012 performs an inverse perfect shuffle permutation of the output pin opin, yielding the input pin in the third stage 86 that will receive this permutation element. Line 1014 copies the permutation element to the P3. Line 1018 returns the permutations P1 and P3. The initial permutation to be routed provides the permutation elements appearing at the input pins to the first stage of switches. The permutation P1 yields the locations of these permutation elements at the output pins of the first stage. Therefore, the states of the first stage of switches are uniquely determined by these 2 permutations. Similarly, the permutation P3 yields the permutation elements appearing at the input pins to the third stage of switches. The destination value in each permutation element yields the desired output pin of the third stage 86. Therefore, the states of the switches in the third stage are uniquely determined by the permutation P3 and the values of its elements.

Switch Speedup

The scheduling method in FIG. 12A can be applied to crossbar switches or other switches with various degrees of speedup. Speedup can typically be achieved with 2 methods. In one method, the designer physically adds more hardware and parallelism to the switch to achieve the speedup. Call this method the hardware speedup method. In the second method, a switch can be operated with a faster internal clock. Call this method the temporal speedup method.

In a switch with a discrete hardware speedup of K, where K is an integer >1, an input port can transmit up to K cells per time-slot and an output port can receive up to K packets per time-slot. For a speedup of K, a frame Schedule of size F must specify FK permutations, since each time-slot can service K permutations. The same proposed GRD methods can be used to compute larger frame schedules, which can be used in switches with hardware speedup.

Consider a switch with a temporal speedup of K, where K is a real number greater than 1. The cells arrive from the external world according to a time-slot of duration T1 nanoseconds. The cells are transmitted in the crossbar switch according to a faster time-slot with duration T2 nanoseconds, where T1/T2=K. In a Frame of size F1 time-slots according to the external clock, where each time-slot has duration T1, the switch can service F2 permutations, where each permutation has duration T2<T1, and where F2>F1.

The GRD scheduling method can be used with a temporal speedup. For example, the designer may append 32 extra time-slots to a frame schedule with F=128, to achieve a frame schedule with size 128+32=160. The 160 time-slots of the crossbar switch must be realized in the same time the external 128 time-slots are realized, for an effective speedup of 160/128=1.25.

Arbitrary Frame Sizes

The proposed GRD methods can be used to generate schedules with an arbitrary number of time slots. For example, to generate a schedule with 100 time slots, the method Partition_Matrix in FIG. 2 can be configured to partition a traffic rate matrix into 3 matrices, with desired frame sizes 64, 32 and 4. These matrices can then be decomposed, and the frame schedules can be merged. To minimize the delay jitter, the frame scheduled should be interleaved.

Improved Execution Time of Suboptimal Greedy Method

The method in FIG. 7 can be configured to have an improved run-time. Observe that the method Find_Schedule_matrix in FIG. 7 partitions matrix M into two matrices Ma and Mb and recursively processes these matrices. Most elements in matrices Ma and Mb will be identical. The method of FIG. 7 can improved so that common elements in the matrices Ma and Mb are processed just once, rather twice, and that the uncommon elements in these matrices can be processed. The result is improved execution time.

Broadcasting and Multicasting

Broadcasting and multicasting are easily supported. Each input port 44 with label j in switch 40 of FIG. 1 with a cell to be multicast to two output ports 46 with labels k1 and k2, can simply generate 2 match requests in the traffic rate matrix, one at element M(j,k1) and another at element M(j,k2). These cell reservations will be scheduled as usual. These cell transmissions will occur at two different time-slots, rather than at a single time-slot. Similarly, a cell could be multicast to D output ports 46, by creating D cell reservation requests in D elements of matrix M.

Scheduling of General Resources

The method Compute_Frame_Schedule of FIG. 12A can be applied to schedule general resources between multiple producers and multiple consumers of resources, with low jitter and wwith no speedup. The resources need not be constrained to be packets or cells of information.

Delay Bound

Figure 27:
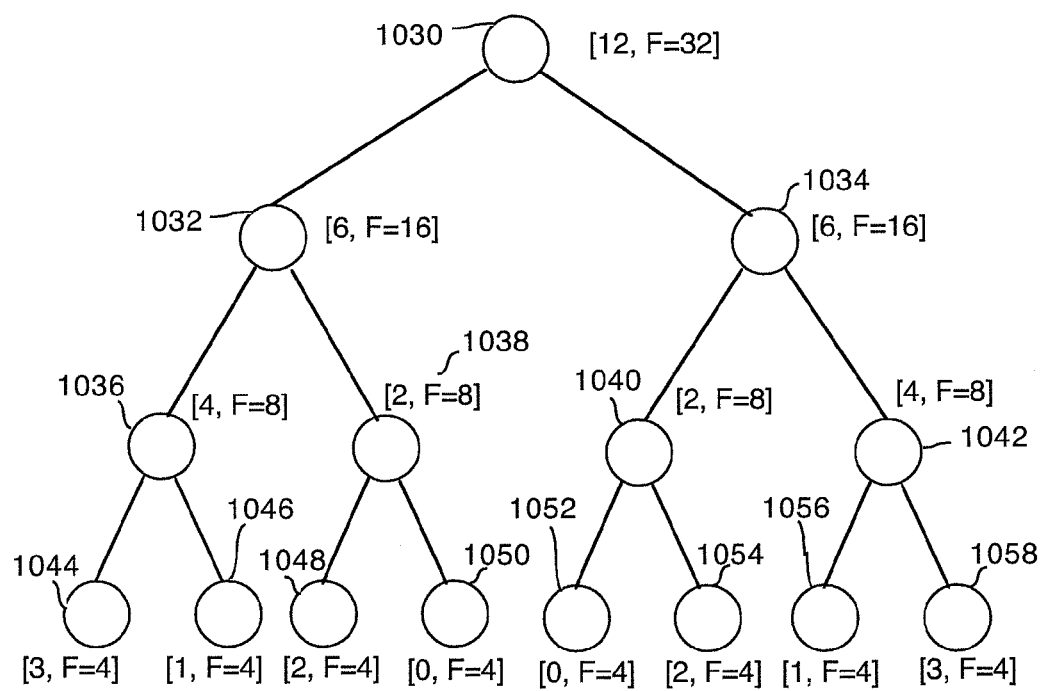
FIG. 27 illustrates a graphic means to determine the worst-case delay jitter.

FIG. 27 illustrates the determination of the worst-case service lead-lag, and the worst-case IDT calculation. The use of the perfect shuffle permutation results in a relatively fair partitioning of one permutation into 2 permutations. However, the partitioning is not perfectly fair. In the worst case partitioning of a permutation representing a frame of size F, 2n consecutive permutation elements associated with one flow can be partitioned with n−1 elements going to one permutation (representing a subframe of size F/2), and n+1 elements going to the other permutation. In FIG. 27, the root node 1020 represents a permutation with 12 matches associated with one flow in a frame of 32 time-slots. These are split fairly in node 1030, with 6 matches going to each subframe of 16 time-slots 1032 and 1034. Each of these permutations will contain 6 consecutive permutation elements associated with a flow(j,k) in a subframe. In the worst case, these are split with 4 matches going to the outer subframes 1036 and 1042, and with 2 matches going to the inner subframes 1038 and 1040. The worst case occurs when the 2 matches in subframes 1038 and 1040 are partitioned in opposite directions, leaving the innermost subframes 1050 and 1052 with no match requests. However, the neighboring subframes 1048 and 1054 will each have 2 match requests, in subframes of size 4. Each leaf of the binary tree represents a subframe of 4 time-slots which contains on average between 1 and 2 match requests, since we cannot partition 2 consecutive matches with any finer resolution. Therefore, each leaf represents an interval of time corresponding to between 1 and 2 IIDTs. The worst case idle period for this partitioning is half a leaf associated with subframe 1048, one leaf associated with subframe 1050, one leaf associated with subframe 1052, and half a leaf associated with subframe 1054, for a total of 3 leaves. In the worst-case each leaf represents up to 2 IIDTs, and therefore the maximum idle period is 6 IIDTs. This idle period does not represent the worst case service lead or lag. In the worst case idle period shown in FIG. 27, it is preceded by a service lead. Leaves 1044, 1046 and 1048 contain more matches than they should, 6 matches for 8 time-slots, since an optimal partitioning would allocate 4*12/32=1.5 matches per leaf on average, equivalent to 3 matches in 8 time-slots. Similarly, leaves 1054, 1056 and 1058 contain more matches than they should. The maximum service lead or lag is one half of the worst-case idle period, equivalent to 3 IIDTs.

SUMMARY

While the exemplary embodiments of the present invention are described with respect to various equations and figures, the present invention is not limited to the form of these equations or figures. One skilled in the art may modify these equations or figures by scaling, or may form different approximate solutions to the methods described herein employing any of a number of techniques well known in the art.

The various methods could be implemented using data processing logic in a Application Specific Integrated Circuit, a Field Programmable Logic Device, a Field programmable Gate Array, or any other hardware based data processing means.

As would be apparent to one skilled in the art, the various functions of switching may be implemented with circuit elements or may also be implemented in the digital domain as processing steps in a software program. Such software may be employed in, for example, a digital signal processor, micro-controller or general-purpose computer.

The present invention can be embodied in the form of methods and apparatuses for practicing those methods. The present invention can also be embodied in the form of program code embodied in tangible media, such as floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits.

It will be further understood that various changes in the details, materials, and arrangements of the parts which have been described and illustrated in order to explain the nature of this invention may be made by those skilled in the art without departing from the principle and scope of the invention as expressed in the following claims.

What is claimed is:

1. A method of scheduling connections between input ports and output ports of a switch with low jitter, said method comprising:

(a) receiving a traffic rate matrix for the one or more connections, wherein each element of the traffic rate matrix defines a bandwidth value for the connections to be established between an input port and an output port of the switch during a scheduling period, and where the sum of all the elements of the traffic rate matrix is less than or equal to Q, and where the sum of each row j is R(j) and where the sum of each column k is C(k);

(b) applying a recursive function, which accepts the traffic rate matrix as its input and recursively generates therefrom K new traffic rate matrices wherein K is an integer greater than one and wherein each of the K new traffic matrices has a sum of elements substantially equal to the Q/K, and the sum of each row j is substantially equal to R(j)/K, and the sum of each column k is substantially equal to C(k)/K, so that the sum of the K new traffic rate matrices substantially equals to the traffic rate matrix, wherein said recursive function forms from an input matrix a plurality of matrices whose sum substantially equals the input matrix;

(c) decomposing each of said K new traffic rate matrices into a sequence of one or more partial or full permutations, each of said permutation representing connections between the input ports and output ports of the switch, wherein the set of permutations for each one of said K new traffic rate matrices provides each pair of input and output ports with substantially their requested bandwidth value as specified in that one of said new traffic rate matrices;

(d) using the permutations resulting from the decomposing to schedule connections in the switch corresponding to the traffic rate matrix.

2. The method of claim 1, wherein said applying a recursive function to generate K new traffic rate matrices uses a greedy method.

3. The method of claim 1, wherein the decomposition of at least one of said K new traffic rate matrices into a sequence of permutations uses a greedy method.

4. The method of claim 1, wherein the method is implemented by a processor associated with a switch of a packet network.

5. The method of claim 1, wherein said applying a recursive function to generate K new traffic rate matrices involves the use of iteration.

6. The method of claim 1, wherein the partial or full permutations are represented as vectors.

7. The method of claim 1, wherein the partial or full permutations are represented as binary matrices, where the matrix elements are either 0 or 1.

8. A method of scheduling connections between the input ports and output ports of a switch with N input ports with low jitter, in a scheduling period comprising F time-slots, said method comprising:
(a) receiving an integer traffic rate matrix M representing the number of connections to be made between each input port and each output port of the switch during the scheduling period;
(b) transforming the rate matrix into a one dimensional connection vector having $Q \leqq NF$ elements, the connection vector representing connections to be made between the input ports and the output ports in F time slots, in order to satisfy the traffic rate matrix;
(c) generating from the one dimensional connection vector, K smaller connection vectors each with substantially Q/K elements, wherein each of the new smaller connection vectors represents connections to be made between the input ports and output ports of the switch within substantially F/K time-slots, and wherein substantially all of the connections of the one dimensional connection vector are represented in the K smaller connection vectors, and wherein connections between a particular one of the input ports, and a particular one of the output ports are distributed relatively equally across the K smaller connection vectors;
(d) generating K frame schedules each for substantially F/K time-slots for the switch from the K smaller connection vectors, with one frame schedule generated from each smaller connection vector, wherein each frame schedule for substantially F/K time-slots comprises substantially F/K permutations, wherein each of the permutations specifies connections to be realized by the switch in one time-slot, with any of the input ports connected with at most one of the output ports and any of the output ports connected with at most one input port, wherein in each of the K frame schedules, the totality of connections specified in the connection vector from which the frame schedule was generated are realized in substantially F/K time-slots;
(e) combining the K resulting frame schedules, to yield a frame schedule for the scheduling period satisfying the traffic rate matrix.

9. The method of claim 8, wherein the forming of the vector with Q elements involves routing the connection vector through a multistage rearrangeable network where the number of stages is greater than 3.

10. The method of claim 8, wherein the forming of the vector of Q elements into K new vectors each with substantially Q/K elements involves routing the connection vector through a multistage rearrangeable network comprising 2×2 switches.

11. The method of claim 8, wherein the generating comprises involves routing the connection vector through a multistage rearrangeable network comprising the generalized perfect shuffle permutation.

12. The method of claim 8, wherein the transforming generates an element for each of said connections to be made;
and wherein elements corresponding to connections between the same input port j and output port k are located within the connection vector in substantially consecutive locations.

13. The method of claim 8, further comprising operating the switch to transmit data through connections based on the frame schedule.

14. The method of claim 8, wherein the method is implemented by a processor associated with a switch of a packet network.

15. The method of claim 8, further comprising operating the switch to transmit data through connections based on the frame schedule.

16. The method of claim 8, further comprising operating the switch to transmit data through connections based on the permutations.

17. The method of claim 8, wherein the permutations are represented as vectors.

18. The method of claim 8, wherein the permutations are represented as binary matrices, where the matrix elements are either 0 or 1.

19. A method of scheduling connections between the input ports and output ports of a switch with N input ports with low jitter, in a scheduling period comprising F time-slots, said method comprising:
(a) receiving a specification of a large scheduling problem for the scheduling period comprising F time-slots, said specification comprising a collection of integers, each integer representing the number of connections to be made between a pair comprising one input port and one output port of the switch during the scheduling period;
(b) generating from the specification of the large scheduling problem the specifications of K new small scheduling problems, each of said specifications of said K new small scheduling problems comprising a collection of integers, each integer representing the number of connections to be made between a pair comprising one input port and one output port of the switch in substantially F/K time slots, and wherein the number of connections between a pair comprising one input port and one output port in the specification of the large scheduling problem are distributed relatively equally across the specifications of the K new small scheduling problems, in order to satisfy the specification of the large scheduling problem;
(c) generating K frame schedules each for substantially F/K time-slots for the switch from the K specifications of small scheduling problems, with one frame schedule generated from and associated with each specification of a small scheduling problem, wherein each frame schedule for substantially F/K time-slots comprises substantially F/K bipartite graph matchings, wherein each of the bipartite graph matchings specifies connections between the input ports and output ports of the switch to be realized in one time-slot, and wherein for each of the K frame schedules the totality of connections specified in the specification of the small scheduling problem associated with the frame schedule are realized in substantially F/K time-slots;

(d) combining the K resulting frame schedules, to yield a frame schedule for the large scheduling problem satisfying the specification of the large scheduling problem.

20. The method of claim 19, wherein the method is implemented by a processor associated with a switch of a packet network.

21. A method of scheduling connections between input ports and output ports of a switch with N input ports with C prioritized traffic classes in a scheduling period comprising F time-slots with low jitter, wherein C>1, said method comprising:

(a) receiving C traffic rate matrices each specifying the number of connections to be made between an input port and an output port of the switch for a given traffic class during the scheduling period;

(b) computing from the C traffic rate matrices an aggregate traffic rate matrix for the connections of all of said C traffic classes, wherein each element of the aggregated matrix denotes the number of connections to be made between an input port and an output port of the switch in all traffic classes during the scheduling period;

(c) processing the aggregate traffic rate matrix and computing a first aggregate frame schedule for the aggregate traffic rate matrix, said first aggregate frame schedule comprising a sequence of substantially F partial or full permutations, wherein each of the permutations specifies connections to be realized between the input ports and the output ports of the switch in one time-slot, to satisfy the requirements of the aggregate traffic rate matrix, said connections made so that the time between successive connections between any one input port and any one output port are substantially equal to provide low jitter for all of said traffic classes;

(d) establishing a highest priority frame schedule with low jitter for the highest priority traffic class of said C traffic classes, by selecting connections from the aggregate rate schedule that satisfy the requirements of the traffic rate matrix of said highest priority traffic class and that substantially minimize jitter for said highest priority traffic class of said C traffic classes; and (e) establishing lower priority frame schedules for the remaining lower priority traffic classes of said C traffic classes, by selecting for each priority traffic class connections which are unused by higher priority traffic classes from the aggregate rate schedule that satisfy the requirements of the traffic rate matrix of said priority traffic class and that substantially minimize the jitter of said lower priority traffic class of said C traffic classes, given the limited choices of connections from the aggregate rate schedule.

22. The method of claim 21, which uses the method of claim 1 to determine a frame schedule.

23. A method of routing connections between N input ports and N output ports of a 3 stage Clos network with crossbar switches of size A×A in the first stage, crossbar switches of size B×B in the middle stage, and crossbar switches of size C×C in the third stage, said method comprising:

(a) receiving a permutation vector P representing the one or more connections, wherein each element P(i) of the permutation vector P denotes a connection to be made between an input port i and an output port j=P(i) of the 3 stage Clos network during one time-slot;

(b) generating a routing model of the 3 stage Clos network comprising a multistage rearrangeable network with greater than 3 stages of crossbar switches of size K×K for relatively small integers K, said routing model achieved by replacing each A×A crossbar switch of the 3-stage Clos network by a corresponding A×A multistage network comprising multiple stages of K×K crossbar switches with a unique path between each input port and output port of the A×A network, and by replacing each C×C crossbar switch of the 3-stage. Clos network by a corresponding C×C multistage network comprising multiple stages of K×K crossbar switches with a unique path between each input port and output port of the C×C network, so that the conflict-free routing of any connection through the input ports and output ports of the stages of A×A, B×B and C×C crossbar switches in the 3-Stage Clos network has a corresponding conflict-free routing through the corresponding input ports and output ports of the stages of corresponding A×A and C×C multistage networks and the corresponding B×B crossbar switches in the routing model comprising a multistage rearrangeable network;

(c) routing each connection specified in the permutation vector P through said multistage rearrangeable network comprising greater than 3 stages of K×K crossbar switches in a conflict-free manner;

(d) establishing the connections appearing at the input ports and output ports of any of the A×A or B×B or C×C crossbar switches in the 3-stage Clos network, from the connections appearing at the corresponding input ports or output ports of the corresponding A×A or C×C networks or the B×B crossbar switches in said multistage rearrangeable network.

24. The method of claim 23, wherein the multistage rearrangeable network comprises 2×2 switches.

25. The method of claim 23, wherein the permutation vector represents a partial permutation.

26. A method of scheduling connections between the input ports and output ports of a switch with N input ports with low jitter, in a scheduling
period comprising F time-slots, said method comprising:

(a) receiving a specification of a large scheduling problem for the scheduling period comprising F time-slots, said specification comprising a collection of bandwidth values, each bandwidth value representing an amount of data which can be transferred between a pair comprising one input port and one output port of the switch during the scheduling period;

(b) generating from the specification of the large scheduling problem the specifications of K new small scheduling problems, each of said specifications of said K new small scheduling problems comprising a collection of bandwidth values, each bandwidth value representing an amount of data which can be transferred between a pair comprising one input port and one output port of the switch in substantially F/K time slots, and wherein the bandwidth value between a pair comprising one input port and one output port in the specification of the large scheduling problem is distributed relatively equally across the specifications of the K new small scheduling problems, in order to satisfy the specification of the large scheduling problem;

(c) generating K frame schedules each for substantially F/K time-slots for the switch from the K specifications of small scheduling problems, with one frame schedule generated from and associated with each specification of a small scheduling problem, wherein each frame schedule for substantially F/K time-slots comprises substantially F/K bipartite graph matchings, wherein each of the bipartite graph matchings specifies connections between the input ports and output ports of the switch to be realized in one time-slot, each connection representing an amount of data which can be transferred in one time-slot, and wherein for each of the K frame schedules the bandwidth values specified in the specification of the small scheduling problem associated with the frame schedule are realized in substantially F/K time-slots;

(d) combining the K resulting frame schedules, to yield a frame schedule for the large scheduling problem satisfying the specification of the large scheduling problem.

* * * * *